US009552764B2

(12) United States Patent
Toyomura et al.

(10) Patent No.: US 9,552,764 B2
(45) Date of Patent: Jan. 24, 2017

(54) DISPLAY DEVICE, PIXEL CIRCUIT, ELECTRONIC APPARATUS, AND METHOD OF DRIVING DISPLAY DEVICE

(75) Inventors: Naobumi Toyomura, Kanagawa (JP); Junichi Yamashita, Tokyo (JP); Katsuhide Uchino, Kanagawa (JP)

(73) Assignee: JOLED Inc., Tokyo (JP)

( * ) Notice: Subject to any disclaimer, the term of this patent is extended or adjusted under 35 U.S.C. 154(b) by 526 days.

(21) Appl. No.: 13/481,443

(22) Filed: May 25, 2012

(65) Prior Publication Data

US 2012/0313922 A1 Dec. 13, 2012

(30) Foreign Application Priority Data

Jun. 8, 2011 (JP) ................................ 2011-128239

(51) Int. Cl.
*G06F 3/038* (2013.01)
*G09G 3/32* (2016.01)

(52) U.S. Cl.
CPC .... *G09G 3/3225* (2013.01); *G09G 2320/0233* (2013.01); *G09G 2320/045* (2013.01)

(58) Field of Classification Search
None
See application file for complete search history.

(56) References Cited

U.S. PATENT DOCUMENTS 5,946,244 A * 8/1999 Manning ....................... 365/194
2003/0160746 A1* 8/2003 Yamazaki et al. .............. 345/82
2005/0205880 A1* 9/2005 Anzai .................. G09G 3/3266 257/83
2006/0066349 A1* 3/2006 Murakami ...................... 326/81
2009/0315918 A1* 12/2009 Minami et al. ............... 345/690
2011/0128056 A1* 6/2011 An ............................... 327/158

FOREIGN PATENT DOCUMENTS

| | | |
|---|---|---|
| CN | 1655218 | 8/2005 |
| CN | 1705972 | 12/2005 |
| CN | 101978415 | 2/2011 |
| JP | 2005-134459 | 5/2005 |
| JP | 4240059 | 1/2009 |
| JP | 4240068 | 1/2009 |

OTHER PUBLICATIONS

Official Action (with translated Search Report) for Chinese Patent Application No. 201210175337.7 dated Jun. 12, 2015, 12 pages.

* cited by examiner

*Primary Examiner* — Kent Chang
*Assistant Examiner* — Benjamin Morales Fernandez
(74) *Attorney, Agent, or Firm* — Sheridan Ross P.C.

(57) ABSTRACT

A display device includes a display portion, a hold capacitor, a write transistor writing a drive voltage corresponding to a video signal to the hold capacitor, a drive transistor driving the display portion in accordance with the drive voltage written to the hold capacitor, and a pulse width adjusting portion adjusting a width of a pulse signal causing a drive pulse used to drive at least one of the write transistor and the drive transistor so as to correspond to an environmental change.

20 Claims, 14 Drawing Sheets

EXAMPLE OF TIMING IN CASE OF WRITE DRIVE PULSE WS

EXAMPLE OF CONFIGURATION IN CASE OF WRITE DRIVE PULSE WS

EXAMPLE OF CONFIGURATION IN CASE OF WRITE DRIVE PULSE WS

DISPLAY DEVICE, PIXEL CIRCUIT, ELECTRONIC APPARATUS, AND METHOD OF DRIVING DISPLAY DEVICE

BACKGROUND

The present disclosure relates to a display device, a pixel circuit used in the display device, an electronic apparatus including the display device, and a method of driving the display device.

At present, a display device including a pixel circuit (referred to as "a pixel" as well) having a display element (referred to as "an electrooptic element" as well), and an electronic apparatus including the display device are generally utilized. There is known a display device which uses an electrooptic element in which a luminance is changed depending on a voltage applied thereto or a current caused to flow therethrough as a display element in a pixel. For example, the electrooptic element in which the luminance is changed depending on the voltage applied thereto is typified by a liquid crystal display element. On the other hand, the electrooptic element in which the luminance is changed depending on the current caused to flow therethrough is typified by an Organic Electro Luminescence element (Organic EL element or Organic Light Emitting Diode (OLED)) (hereinafter referred to as "an organic EL element"). An organic EL display device using the latter organic EL element is a so-called self-emission type display device using the electrooptic element, as a self-emission element, as the display element in the pixel.

Now, in the display device using the display element, both of a passive matrix system and an active matrix system can be adopted as a system for driving the display device. However, the display device utilizing the passive matrix system involves a problem that it may be difficult to realize the large and fine-definition display device although a structure is simple.

For this reason, in recent years, the active matrix system for controlling a pixel signal supplied to a display element which is provided inside a pixel by using a transistor such as an active element which is also provided inside the pixel, for example, an insulated gate field-effect transistor (in general, a Thin Film Transistor (TFT)) as a switching transistor has been actively developed.

In the existing display devices each utilizing the active matrix system, threshold voltages and mobilities of transistors for driving respective display elements are dispersed due to a process change. In addition, the characteristics of the display element are changed with time. Such a dispersion of the characteristics of the drive transistors, and such a change in the characteristics of the elements, such as the display elements, composing the pixel circuit exert an influence on the emission luminance. That is to sway, if image signals having the same level are supplied to all of the pixels, respectively, all of the pixels emit lights with the same luminance and thus the uniformity of the picture ought to be obtained. However, the dispersion of the characteristics of the drive transistors, and the change in the characteristics of the display elements impair the uniformity of the picture. In order to cope with such a situation, the technique for correcting the display nonuniformity due to the dispersion of the characteristics of the elements, such as the transistors and the display elements, composing the pixel circuit within each of the pixel circuits in order to uniformly control the emission luminance over the entire picture of the display device, for example, is proposed in Japanese Patent No. 4240059 or Japanese Patent No. 4240068.

Here, the characteristics of the elements composing the pixel circuit are influenced by the environmental characteristics. However, the technique disposed in Japanese Patent No. 4240059 or Japanese Patent No. 4240068 does not disclose a method of coping with the influence of the environmental characteristics.

The present disclosure has been made in order to solve the problems described above, and it is therefore desirable to provide a display device in which a display nonuniformity phenomenon due to a dispersion of characteristics of elements composing a pixel circuit can be suppressed independently of an environmental change, a pixel circuit used in the display device, an electronic apparatus including the display device, and a method of driving the display device.

In order to attain the desire described above, according to an embodiment of the present disclosure, there is provided a display device including: a display portion; a hold capacitor; a write transistor writing a drive voltage corresponding to a video signal to the hold capacitor; a drive transistor driving the display portion in accordance with the drive voltage written to the hold capacitor; and a pulse width adjusting portion adjusting a width of a pulse signal causing a drive pulse used to drive at least one of the write transistor and the drive transistor so as to correspond to an environmental change.

According to another embodiment of the present disclosure, there is provided a pixel circuit including: a display portion; a hold capacitor; a write transistor writing a drive voltage corresponding to a video signal to the hold capacitor; and a drive transistor driving the display portion in accordance with the drive voltage written to the hold capacitor. A pulse width of a drive pulse used in at least one of the write transistor and the drive transistor is adjustably formed so as to correspond to an environment dependency.

According to still another embodiment of the present disclosure, there is provided an electronic apparatus including: a pixel portion in which display elements each including a display portion, a hold capacitor, a write transistor writing a drive voltage corresponding to a video signal to the hold capacitor, and a drive transistor driving the display portion in accordance with the drive voltage written to the hold capacitor are disposed; a signal generating portion generating a video signal which is to be supplied to the pixel portion; drive lines disposed in the pixel portion and supplying drive pulses in order to drive at least ones of the write transistors and the drive transistors disposed in a predetermined direction; a selecting portion selecting the drive lines; a pulse width adjusting portion adjusting a width of a pulse signal causing the drive pulse used to drive at least one of the write transistor and the drive transistor so as to correspond to an environmental change; and a pulse generating portion generating the pulse signal causing the drive pulse in accordance with a pulse signal outputting the pulse width adjusting portion. The selecting portion supplies the drive pulses to the drive lines, respectively, in accordance with the pulse signal generated in the pulse generating portion.

According to yet another embodiment of the present disclosure, there is provided a method of driving a display device including a pixel portion in which display elements each having a display portion, a hold capacitor, a write transistor writing a drive voltage corresponding to a video signal to the hold capacitor, and a drive transistor driving the display portion in accordance with the drive voltage written to the hold capacitor are disposed. A width of a pulse signal causing a drive pulse used to drive at least one of the write transistor and the drive transistor is adjusted so as to correspond to an environmental change.

In short, in the technique disclosed in this specification, the width of the pulse signal causing the drive pulse used to drive at least one of the write transistor and the drive transistor is adjusted so as to correspond to the environmental change. The drive pulse can be generated in accordance with the pulse signal whose pulse width is automatically adjusted so as to correspond to the environmental change in such a way that the environment dependency of the characteristics of the elements composing the pixel circuit is canceled. Even when the characteristics of the elements composing the pixel circuit are influenced by the environmental characteristics, so that the optimal correction period of time is changed so as to correspond to the environmental change, the drive pulse can be generated in accordance with the pulse signal whose pulse width regulating the processing period of time is automatically adjusted so as to correspond to the environmental change. As a result, the display nonuniformity phenomenon due to the dispersion of the characteristics of the elements composing the pixel circuit can be suppressed independently of the environmental change.

As set forth hereinabove, according to the present disclosure, the display nonuniformity phenomenon due to the dispersion of the characteristics of the elements composing the pixel circuit can be suppressed independently of the environmental change.

DETAILED DESCRIPTION OF THE PREFERRED EMBODIMENTS

Figure 1:
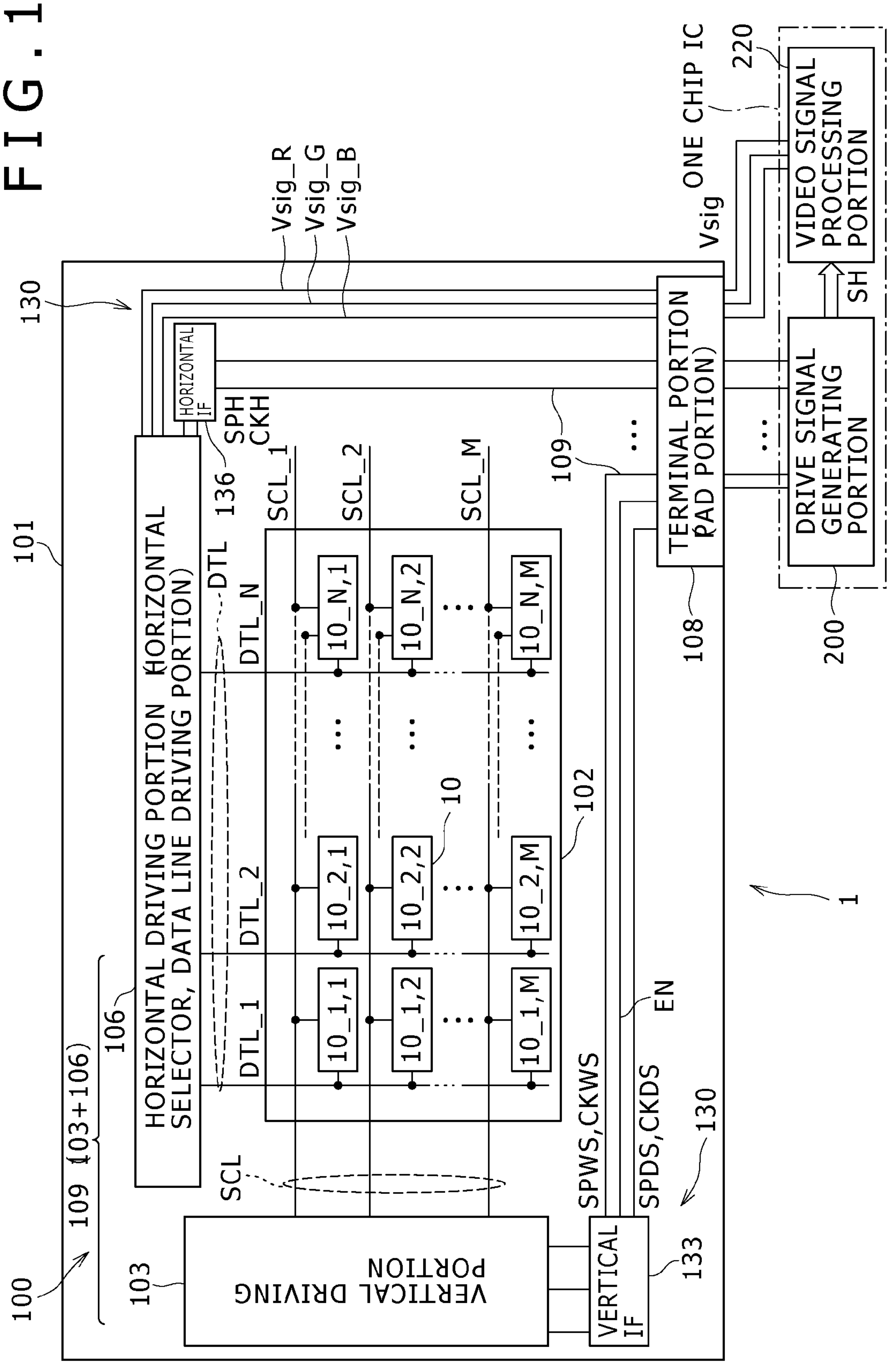
FIG. 1 is a block diagram showing a schematic configuration of an active matrix type display device as a display device according to a first embodiment of the present disclosure.

Embodiments of the present disclosure will be described in detail hereinafter with reference to the accompanying drawings. When functional elements are distinguished from one another with respect to forms, the functional elements are distinguished by adding thereto the alphabet or "_n" (n: numerical character), or suffixes of a combination thereof. On the other hand, when the functional elements are described without necessity for being especially distinguished from one another, such suffixes are omitted for the description. This is also applied to the accompanying drawings.

It is noted that the description will be given below in accordance with the following order:

1. Whole Outline;
2. Outline of Display Device;

2-1. Display Device (First Embodiment)

2-2. Light Emitting Element (Pixel Circuit) (Second Embodiment)

2-3. Method of Driving Light Emitting Portion: Basis (Third Embodiment)

3. Electronic Apparatus (Fourth Embodiment);
4. Concrete Examples;
4-1. Example 1 (Pixel Circuit): Adjustment of Correction Period of Time Corresponding to Environment Dependency of Element Characteristics
4-2. Example 2 (Method of Driving Circuit): Example 1+Countermeasure for Display Nonuniformity Phenomenon Due to Dispersion of Shapes of Drive Pulses (Switch Selection for Same Pulse Signal)
4-3. Example 3 (Method of Driving Circuit): Example 1+Countermeasure for Display Nonuniformity Phenomenon Due to Dispersion of Shapes of Drive Pulses (Pulse Signal Generated in Pulse Generating Portion is Shifted)
5. Examples of Application; and
5-1. Example 1 of Application
5-2. Example 2 of Application
5-3. Example 3 of Application
5-4. Example 4 of Application
5-5. Example 5 of Application
6. Constitutions of the Present Disclosure.

1. Whole Outline

In constitutions of embodiments of the present disclosure, a pixel circuit, a display device or an electronic apparatus includes a display portion, a hold capacitor, a write transistor, and a drive transistor. In this case, the write transistor serves to write a drive voltage corresponding to a video signal to the hold capacitor. Also, the drive transistor serves to drive the display portion in accordance with the drive voltage written to the hold capacitor. In addition thereto, the pixel circuit, the display device or the electronic apparatus further includes a pulse width adjusting portion for adjusting a width of a pulse signal causing a drive pulse used to drive at least one of the write transistor and the drive transistor so as to correspond to an environmental change. With the pixel circuit, the display device, the electronic apparatus, and a method of driving the display device (or the pixel circuit), since the drive pulse can be generated in accordance with the pulse signal whose pulse width is adjusted, the processing corresponding to the environment dependency can be executed. As a result, the processing independent of the environmental change can be executed. For this reason, even when the characteristics of the elements composing the pixel circuit are influenced by the environmental characteristics, it is possible to suppress the display nonuniformity phenomenon due to the dispersion of the characteristics of the elements composing the pixel circuit.

Preferably, all it takes is that the pixel circuit, the display device or the electronic apparatus includes a pixel portion in which the pixel circuits each including the display portion, the hold capacitor, the write transistor, and the drive transistor are disposed in a predetermined direction. Drive lines through which the drive pulses are supplied to at least ones of the write transistors and the drive transistors disposed in a predetermined direction, respectively, are disposed in the pixel portion. Preferably, in the constitutions of the embodiments of the present disclosure, all it takes is that the pixel circuit, the display device, or the electronic apparatus further includes a selecting portion, and a pulse generating portion. In this case, the selecting portion serves to select the drive lines. Also, the pulse generating portion serves to generate the pulse signal causing the drive pulse in accordance with a pulse signal outputted from the pulse width adjusting portion. The selecting portion supplies the drive pulses to the drive lines, respectively, in accordance with a pulse signal generated by a pulse generating portion.

Preferably, it is only necessary to dispose the pulse width adjusting portion in the vicinity of either the write transistor or the drive transistor. Or, preferably, it is only necessary to dispose the pulse width adjusting portion in the vicinity of the pixel portion in a portion which is located outside the pixel portion. The reason for this is because the pulse width adjustment is made to correspond to the environmental change characteristics of the elements composing the pixel portion as much as possible.

Preferably, all it takes is that the pulse width adjusting portion includes a delay portion, and a gate circuit portion. In this case, the delay portion serves to delay the pulse signal inputted thereto. Also, the gate circuit portion serves to generate a pulse signal in accordance with both of the pulse signal inputted to the delay portion, and a pulse signal outputted from the delay portion. This configuration is such that the pulse width is adjusted by utilizing the pulse delay. All it takes is that the delay portion is configured so as to offer a delay amount corresponding to the environmental change characteristics of the elements (for example, the drive transistor) composing the pixel circuit. For example, preferably, the delay portion is configured so as to include one step or plural steps of logic gates such as buffers or inverters. It is only necessary to set the number of stages in consideration of both of the environmental change characteristics of the elements composing the pixel circuit, and the pulse width necessary for setting of a processing period of time. In this case, all it takes is that the configuration of the transistor circuit composing each of the logic gates themselves is devised in such a way that the pulse width is automatically adjusted so as to cancel the environmental change characteristics of the elements composing the pixel circuit.

The selecting portion can adopt a configuration of including the pulse generating portion provided every drive line. In a word, this configuration is such that the pulse generating portion is provided every drive line.

Preferably, all it takes is that the selecting portion adopts the configuration of including the pulse generating portions the number of which is smaller than that of driving lines, and supplying the drive pulses to the plural drive lines, respectively, in accordance with the pulse signal generated by the pulse generating portion.

Since the drive portion supplies the drive pulses to the plural drive lines, respectively, in accordance with the pulse signal generated in the pulse generating portion, the number of pulse generating portions may be smaller than the total number of driving lines. In this case, one pulse generating portion can be provided for all of the drive lines. Or, partial drive lines of all of the drive lines are set as one unit, and the pulse generating portion can also be provided every one unit.

Although with regard to a portion of disposition of the pulse generating portion, the pulse generating portion can be disposed most outside the scanning lines, preferably, it is only necessary to dispose the pulse generating portion in an intermediate portion in a direction of disposition of the scanning lines. The reason for this is because a disadvantage due to a difference in a delay amount of pulse signal outputted from the pulse generating portion can be reduced. By the way, when the pulse generating portion is provided every one unit of the partial drive lines of all of the drive lines, it is only necessary to dispose the pulse generating portion in the intermediate portion in the direction of the disposition of the drive lines every one unit.

The pulse generating portion can be provided inside the pixel portion or can also be provided outside the pixel portion. When the pulse generating portion is provided outside the pixel portion, there is offered an advantage that the selecting portion (scanning portion) and the pulse generating portion can be formed integrally with each other. This configuration is suitable for the case where the pixel portion and the selecting portion (scanning portion) are provided separately from each other.

In the constitutions of the embodiments of the present disclosure, the display device or the electronic apparatus can adopt a configuration of further including a switching portion having a switch circuit every drive line. In this case, the switch circuit serves to fetch in the pulse signal generated by the pulse generating portion in accordance with the selection for the drive lines by the selecting portion to supply the pulse signal thus fetched therein to the drive line thus selected. It is only necessary for the switch circuit to utilize a transfer gate structure in a CMOS (Complementary Metal Oxide Semiconductor) switch or the like. In this case, with regard to drive pulses which are to be inputted to the pixel circuit, after the pulse signals have been generated collectively either inside or outside a panel, the resulting pulse signals are extracted by the CMOS switches to be supplied to the scanning lines, respectively. Because of "generated collectively either inside or outside a panel," it is only necessary for the pulse generating portion to generate the pulse signals at the same timing for the drive lines. If the pulse generating portion generates the pulse signals at different timings for the drive lines, then, it may be necessary for the switch circuit to take measures such as a pulse shift mechanism or the like. The switch circuit either can be provided inside the pixel portion or can also be provided outside the pixel portion. When the switch circuit is provided outside the pixel portion, there is offered an advantage that the selecting portion (scanning portion) and the switch circuit (and also the pulse generating portion) can be formed integrally with each other. This configuration is suitable for the case where the pixel portion and the selecting portion (scanning portion) are provided separately from each other.

In the constitutions of the embodiments of the present disclosure, the display device or the electronic apparatus can also adopt a configuration in which the selecting portion includes a shift register portion for shifting the pulse signals generated in the pulse generating portion in increments of the pulse signals for one unit period of time to supply the pulse signals thus shifted to the drive lines, respectively. As a result, not only when a series of processing is completed for a period of time for one unit, but also when a series of processing is executed over a period of time for plural units, it is possible to relax the extent to that the shapes (the width, the change characteristics, and the like) of the drive pulses are dispersed every row or every column. Thus, it is possible to improve the phenomenon in which the dispersion of periods of time for processing due to the dispersion of the shapes of the drive pulses resulting from the dispersion of the characteristics of the transistors composing the logic circuit appears in the form of luminance nonuniformity (color nonuniformity in the case of color display).

The drive pulse, for example, is used in processing as well for supplying a current to the hold capacitor through the drive transistor while the video signal is supplied to one terminal of the hold capacitor through the write transistor. This processing, that is, the processing for supplying the current to the hold capacitor through the drive transistor while the video signal is supplied to one terminal of the hold capacitor through the write transistor is used in mobility correcting stepping for correcting a mobility of the drive transistor.

The drive pulse is also used for correcting the dispersion of the threshold voltages of the drive transistors. The using of the drive pulses may also be used together with the mobility correction described above.

With regard to a device configuration, there may be adopted a configuration of including a pixel portion in which the display portions are disposed either in a line or in a two-dimensional matrix.

A light emitting element (display element) including a self-emission type light emitting portion such as an organic electro luminescence light emitting portion, an inorganic electro luminescence light emitting portion, an LED light emitting portion or a semiconductor laser light emitting portion, for example, can be used as the display portion. In particular, it is only necessary to use the organic electro luminescence light emitting portion as the display portion.

2. Outline of Display Device

In the following description, for facilitating understanding of a correspondence relationship, a resistance value, a capacitance (electrostatic capacitance), and the like of members composing a circuit are designated by the same reference symbols as those added to these members, respectively.

[Basis]

Firstly, a description will be given with respect to an outline of a display device including a light emitting element. In a description of a circuit configuration which will be described below, the wording "electrically connected" is simply described as "connected." Also, the wording "electrically connected" is by no means limited to the wording "directly connected" unless there is a particular demonstration, and thus includes the wording "connected" through any other suitable transistor (typified by a switching transistor) or any other suitable electric element (which may be a passive element in addition to an active element).

The display device includes plural pixel circuits (or simply referred to as "a pixel" in some cases). Each of the pixel circuits includes a display element (electrooptic element) having a light emitting portion, and a driving circuit for driving the light emitting portion. A light emitting element including a self-emission type light emitting portion such as an organic electro luminescence light emitting portion, an inorganic electro luminescence light emitting portion, an LED light emitting portion or a semiconductor laser light emitting portion, for example, can be used as the display portion. It is noted that although a constant current drive type is adopted as a system for driving the light emitting portion of the display element, in principle, the system concerned is by no means limited to the constant current drive type, and thus may also adopt a constant voltage drive type.

In the case which will be described below, a description will be given with respect to the case of the display device including an organic electro luminescence light emitting portion as the light emitting element. More specifically, the light emitting element is the organic electro luminescence element (organic EL element) having a structure in which the driving circuit, and the organic electro luminescence light emitting portion (ELP: light emitting portion) connected to the driving circuit are laminated on top of each other.

Although various kinds of circuits are known as the driving circuit for driving the light emitting portion ELP, the pixel circuit can adopt a configuration of including a drive circuit of a 5Tr/1C type, a 4Tr/1C type, a 3Tr/1C type, a 2Tr/1C type or the like. Here, α in a term of "αTr/1C type" means the number of transistors, and "1C" means that a capacitance portion includes one hold capacitor $C_{cs}$ (capacitor). Although preferably, all of the transistors composing the driving circuit are suitably composed of n-channel transistors, the present disclosure is by no means limited thereto, and thus a part of the transistors composing the driving circuit may also be composed of a p-channel transistor in some cases. It is noted that it is also possible to adopt a structure in which the transistors are formed on a semiconductor substrate or the like. A structure of each of the transistors composing the driving circuit is especially by no means limited, and it is possible to use an insulated gate field-effect transistor (in general, a Thin Film Transistor (TFT)) typified by a MOSFET (Metal Oxide Semiconductor Field-Effect Transistor). In addition thereto, each of the transistors composing the driving circuit may be any of an enhance type or a depletion type, or may also be any of a single-gate type or a dual-gate type.

In any of the structures described above, basically, the display device includes a light emitting portion ELP, a drive transistor $TR_D$, a write transistor $TR_W$ (referred to as "a sampling transistor" as well), a vertical scanning portion including at least a write scanning portion, a horizontal driving portion having a function of a signal outputting portion, and a hold capacitor $C_{cs}$ as minimum constituent elements similarly to the case of the 2Tr/1C type drive configuration. Each of the scanning portions is an example of a selecting portion for selecting drive lines (scanning lines). Preferably, in order to configure a bootstrap circuit, the hold capacitor $C_{cs}$ is connected between a control input terminal (gate terminal) of the drive transistor $TR_D$, and one (typically, a source electrode terminal) of main electrode terminals (source and drain regions). In the drive transistor $TR_D$, one of the main electrode terminals thereof is connected to the light emitting portion ELP, and the other of the main electrode terminals thereof is connected to a power source line PWL. A power source voltage (either a steady voltage or a pulse-like voltage) is supplied from a power source circuit, a scanning circuit for the power source voltage or the like to the power source line PWL.

The horizontal driving portion supplies a video signal $V_{sig}$ used to control a luminance in the light emitting portion ELP or a broad video signal $V_s$ representing a reference electric potential(s) (not necessarily corresponds (correspond) to one kind) used for threshold voltage correction or the like to a video signal line DTL (referred to as "a data line" as well). In the write transistor $TR_W$, one of main electrode terminals thereof is connected to the video signal line DTL, and the other of the main electrode terminals thereof is connected to the control input terminal of the drive transistor $TR_D$. The write scanning portion supplies a control pulse (a write drive pulse WS) in accordance with which the write transistor $TR_W$ is controlled so as to be turned ON or OFF to the control input terminal of the write transistor $TR_W$ through a write scanning line WSL. A connection point among the other of the main electrode terminals of the write transistor $TR_W$, the control input terminal of the drive transistor $TR_D$, and one terminal of the hold capacitor $C_{cs}$ is referred to as "a first node $ND_1$." Also, a connection point between one of the main electrode terminals of the drive transistor $TR_D$, and the other terminal of the hold capacitor $C_{cs}$ is referred to as "a second node $ND_2$." Each of the scanning lines is an example of a drive line through which the drive pulse is supplied to the transistor composing the pixel circuit.

2-1. Display Device

First Embodiment

Configuration

Figure 2:
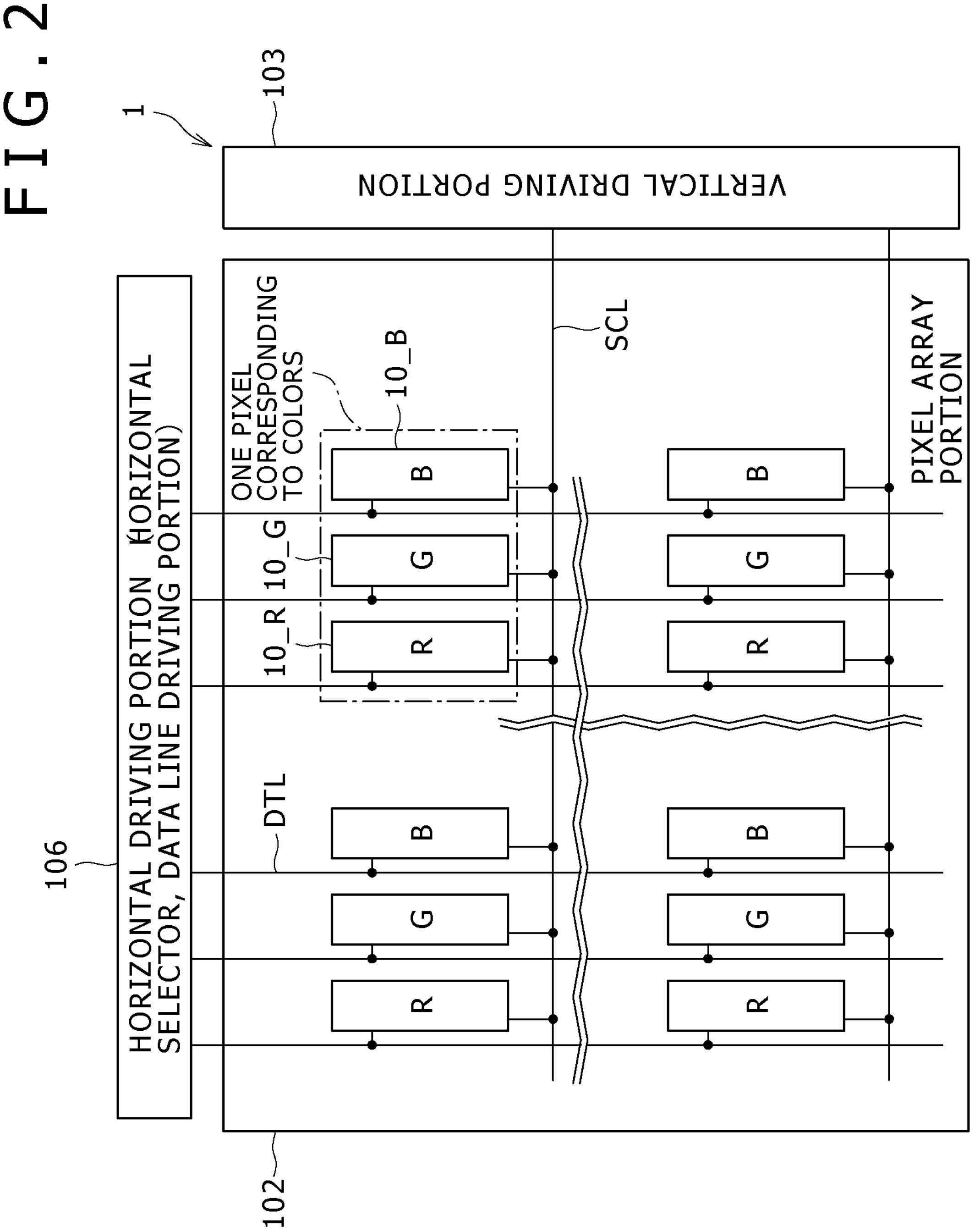
FIG. 2 is a block diagram showing a schematic configuration of an active matrix type display device compatible with color image display as a display device according to a modification of the first embodiment of the present disclosure.

FIGS. 1 and 2 are respectively block diagrams showing schematic configurations of an active matrix type display device according to a first embodiment of the present disclosure, and a modified change of the first embodiment of the present disclosure. Specifically, FIG. 1 is a block diagram showing a schematic configuration of the general active matrix type display device as the display device according to the first embodiment of the present disclosure. Also, FIG. 2 is a block diagram showing a schematic configuration of the active matrix type display device compatible with color image display according to the modification of the first embodiment of the present disclosure.

As shown in FIG. 1, the display device 1 includes a display panel portion 100, a drive signal generating portion (so-called timing generator) 200, and a video signal processing portion 220. In this case, pixel circuits 10 (referred to as "pixels" as well) including organic EL elements (not shown) as plural display elements, respectively, are disposed so as to compose an effective image area at a horizontal to vertical ratio as an aspect ratio of X:Y (for example, 9:16) in the display panel portion 100. Also, the drive signal generating portion 200 as an example of a panel control portion generates various kinds of pulse signals in accordance with which the display panel portion 100 is driven and controlled. Both of the drive signal generating portion 200 and the video signal processing portion 220 are built in one-chip Integrated Circuit (IC), and are disposed outside the display panel portion 100 in this case.

It is noted that a product form is by no means limited to the case where the display device is provided as the display device 1 having a module (composite components or parts) form including all of the display panel portion 100, the drive signal generating portion 200, and the video signal processing portion 220 as shown in FIG. 1. For example, only the display panel portion 100 may be provided as the display device 1. In addition, the display device 1 includes a display device as well having a module shape having a structure of being encapsulated. For example, a display module which is formed in such a way that a counter portion such as a transparent glass is stuck to the pixel array portion 102 corresponds to such a display device. A color filter, a protective film, a light blocking film, and the like may be provided on the transparent counter portion. The display module may also be provided with a circuit portion, a Flexible Printed Circuit (FPC) board or the like for input/output of a video signal $V_{sig}$ and various kinds of drive pulses from the outside to the pixel array portion 102.

Such a display device 1 can be utilized in display portions, of various kinds of electronic apparatuses in all of the fields, in each of which a video signal inputted to the electronic apparatus, or a video signal generated in the electronic apparatus is displayed in the form of either a still image or a moving image (video image). In this case, the various kinds of electronic apparatuses, for example, include a portable type music player utilizing a recording medium such as a semiconductor memory, a mini-disc (MD) or a cassette tape, a digital camera, a notebook-size personal computer, mobile terminal equipment such as a mobile phone, a video camera, and the like.

In the display panel portion 100, a pixel array portion 102, a vertical driving portion 103, a horizontal driving portion 106 (referred to as "a horizontal selector or a data line driving portion" as well), an interface portion 130 (IF), a terminal portion 108 (pad portion) for connection to the outside, and the like are formed integrally with one another on a substrate 101. In this case, pixel circuits 10 are disposed in a matrix of M in row×N in column in the pixel array portion 102. The vertical driving portion 103 scans the pixel circuits 10 in a vertical direction. The horizontal driving portion 106 scans the pixel circuits 10 in a horizontal direction. Also, the driving portions (the vertical driving portion 103 and the horizontal driving portion 106) and an external circuit interface with each other through the interface portion 130 (IF). That is to say, a configuration is adopted such that peripheral driving circuits such as the vertical driving portion 103, the horizontal driving portion 106, and the interface portion 130 are formed on the same substrate 101 as that of the pixel array portion 102. The light emitting element (the pixel element 10) which is located in an m-th row (m=1, 2, 3, . . . , M) and in an n-th column (n=1, 2, 3, . . . , N) is designated by reference symbols 10_*n, m* in FIG. 1.

The interface portion 130 includes a vertical IF portion 133 and a horizontal IF portion 136. In this case, the vertical driving portion 103 and the external circuit interface with each other through the vertical IF portion 133. Also, the horizontal driving portion 106 and the external circuit interface with each other through the horizontal IF portion 136.

The vertical driving portion 103 and the horizontal driving portion 106 compose a control portion 109 for controlling an operation for writing a signal electric potential to the hold capacitor, a threshold voltage correcting operation, a mobility correcting portion, and a bootstrap operation. A drive control circuit for controlling an operation for driving the pixel circuits 10 of the pixel array portion 102 is composed, including the control portion 109 and the interface portion 130 (including the vertical IF portion 133 and the horizontal IF portion 136).

When the 2Tr/1C type drive configuration is adopted, the vertical driving portion 103 includes a write scanning portion (a write scanner WS; Write Scan), and a drive scanning portion (a drive scanner DS; Drive Scan) which functions as a power source scanner having a power source supplying ability. The pixel array portion 102, as an example, is driven from either one side or both sides of a horizontal direction shown in the figure by the vertical driving portion 103. Also, the pixel array portion 102 is driven from either one side or both sides of a vertical direction shown in the figure by the horizontal driving portion 106.

Various kinds of pulse signals are supplied from the drive signal generating portion 200 disposed outside the display device 1 to the terminal portion 108. Likewise, the video signal $V_{sig}$ is supplied from the video signal processing portion 220 to the terminal portion 108. In the case of the display device 1 compatible with the color display, a video signal $V_{sig\_R}$, a video signal $V_{sig\_G}$, and a video signal $V_{sig\_B}$ corresponding to the colors (the three primary colors: Red (R); Green (G); and Blue (B) in this case), respectively, are supplied from the video signal processing portion 220 to the terminal portion 108.

As an example, necessary pulse signals such as shift start pulses SP (two kinds of shift start pulses SPDS and SPWS are shown in the figure) and vertical scanning clocks CK (two kinds of vertical scanning clocks CKDS and CKWS are shown in the figure) as an example of scanning start pulses in the vertical direction, vertical scanning clocks xCK (two kinds of vertical scanning clocks xCKDS and xCKWS are shown in the figure) which are obtained through phase inversion as may be necessary, and an enable pulse used to instruct to output a pulse at a specific timing are supplied as pulse signals for vertical driving to the terminal portion 108. In addition, necessary pulse signals such as a horizontal start pulse SPH and a horizontal scanning clock CKH as an example of scanning start pules in the horizontal direction, a horizontal scanning clock xCKH which is obtained through the phase inversion as may be necessary, and an enable pulse used to instruct to output a pulse at a specific timing are supplied as pulse signals for horizontal driving to the terminal portion 108.

Terminals of the terminal portion 108 are connected to the vertical driving portion 103 and the horizontal driving portion 106 through wirings 109. For example, after the pulses supplied to the terminal portion 108 have been internally adjusted in voltage levels thereof in a level shifter portion (not shown) as may be necessary, the resulting pulses are supplied to the portions of the vertical driving portion 103, and the horizontal driving portion 106.

Although an illustration is omitted here (details will be described later), the pixel array portion 102 is configured in such a way that the pixel circuits 10 provided with the pixel transistors for the organic EL elements as the display elements are two-dimensionally disposed in a matrix, the vertical scanning lines SCL are wired so as to correspond to the rows for the pixel disposition, respectively, and the video signal lines DTL are wired so as to correspond to the columns for the pixel disposition, respectively. In a word, the pixel circuits 10 are connected to the vertical driving portion 103 through the vertical scanning lines SCL, and are also connected to the horizontal driving portion 106 through the video signal lines DTL. Specifically, for the pixel circuits 10 disposed in a matrix, the vertical scanning lines SCL_1 to SCL_n for n rows which are driven in accordance with the drive pulses by the vertical driving portion 103 are wired so as to correspond to the pixel rows, respectively. The vertical driving portion 103 is composed of a combination of logic gates (including a latch, a shift register, and the like as well), and selects the pixel circuits 10 of the pixel array portion 102 in rows. That is to say, the vertical driving portion 103 successively selects the pixel circuits 10 through the vertical scanning lines SCL in accordance with the pulse signals of the vertical drive system supplied from the drive signal generating portion 200. The horizontal driving portion 106 is composed of a combination of logic gates (including a latch, a shift register, and the like as well), and selects the pixel circuits 10 of the pixel array portion 102 in columns. That is to say, the horizontal driving portion 106 samples a predetermined electric potential (for example, a video signal $V_{sig}$ level) within the video signal $V_s$ through the video signal lines DTL for the pixel circuits 10 thus selected and writes the predetermined electric potential thus sampled to each of the hold capacitors $C_{cs}$ in accordance with the pulse signals of the horizontal drive system supplied from the drive signal generating portion 200.

The display device 1 of the first embodiment can carry out line-sequential drive or point-sequential drive. Thus, both of a write scanning portion 104 and a drive scanning portion 105 of the vertical driving portion 103 scan the pixel array portion 102 in the line-sequential manner (in a word, in rows), and the horizontal driving portion 106 either simultaneously writes the video signals for one horizontal line (in the case of the line-sequential) or writes the video signals in pixels (in the case of the point-sequential) to the pixel array portion 102 synchronously with the scanning operation.

For the purpose of making a response to the color image display, for example, as shown in FIG. 2, a pixel circuit $10_{\_R}$, a pixel circuit $10_{\_G}$, and a pixel circuit $10_{\_B}$ are provided as sub-pixels corresponding to colors (the three primary colors: Red (R); Green (G); and Blue (B) in this case), respectively, in a longitudinal stripe in a predetermined disposition order in the pixel array portion 102. One pixel compatible with the color image display is composed of one set of sub-pixels corresponding to the colors, respectively. Although in this case, a layout having the stripe structure in which the sub-pixels corresponding to the colors, respectively, are disposed in the longitudinal stripe is shown as an example of a layout of the sub-pixels, the layout of the sub-pixels is by no means limited to such a disposition example. For example, a form may also be adopted in which the sub-pixels are shifted in a vertical direction.

Note that, referring to FIGS. 1 and 2, a configuration is adopted in which the vertical driving portion 103 (specifically, the constituent elements thereof) is disposed on only one side of the pixel array portion 102. However, it is possible to adopt a configuration in which the constituent elements of the vertical driving portion 103 are disposed on the right-hand and left-hand sides, respectively, so as to sandwich the pixel array portion 102 between them. In addition, it is also possible to adopt a configuration in which ones and the others of the constituent elements of the vertical driving portions 103 are disposed on the right-hand and left-hand sides, respectively, separately from each other. Likewise, referring to FIGS. 1 and 2, a configuration is shown in which the horizontal driving portion 106 is disposed on only one side of the pixel array portion 102. However, it is also possible to adopt a configuration in which the horizontal driving portion 106 are disposed on upper and lower sides, respectively, so as to sandwich the pixel array portion 102. In this case, a configuration is adopted in which the pulse signals such as the vertical shift start pulse, the vertical scanning clock, the horizontal start pulse, and the horizontal scanning clock are all inputted from the outside of the display panel portion 100. However, the drive signal generating portion 200 for generating these various timing pulses can also be mounted on the display panel portion 100.

The configuration shown in the figure is merely one form of the display device, and thus any other suitable form can be adopted in terms of a product form. That is to say, for the display device, all it takes is that the entire display device is configured so as to include the pixel array portion in which the elements composing the pixel circuits 10 are disposed in a matrix, the control portion having the scanning portion connected to the scanning lines for driving of the pixels as the main portion, the drive signal generating portion for generating the various kinds of signals in accordance with which the control portion is operated, and the video signal processing portion. In terms of the product form, in addition to the form as shown in the figure in which the display panel portion in which the pixel array portion and the control portion are mounted on the same substrate (for example, a glass substrate), and the drive signal generating portion and the video signal processing portion are provided separately from each other (referred to as "an on-panel-disposition configuration"), it is also possible to adopt a form in which the pixel array portion is mounted on the display panel portion, and the peripheral circuits such as the control portion, the drive signal generating portion, and the video signal processing portion are mounted on a board (for example, a flexible board) separate from that substrate of the display panel portion (referred to as "a peripheral circuit panel-outside-disposition configuration"). In addition, in the case of the on-panel-disposition configuration in which the display panel portion is configured by mounting both of the pixel array portion and the control portion on the same substrate, it is also possible to adopt a form in which the transistors for the control portion (and also the drive signal generating portion and the video signal processing portion as may be necessary) are simultaneously formed in a process for forming the TFTs of the pixel array portion (referred to as "a transistor integration configuration"), and a form in which a semiconductor chip for the control portion (and also the drive signal generating portion and the video signal processing portion as may be necessary) is directly mounted on the substrate on which the pixel array portion is mounted by utilizing a Chip On Glass (COG) mounting technique (referred to as "a COG mounting configuration"). Or, only the display panel portion (including at least the pixel array portion) can be provided as a display device.

In the first embodiment of the present disclosure, the display device 1 includes a pulse width adjusting portion (not shown) for adjusting the width of the pulse signal causing the drive pulse used to drive at least one of the write transistor $TR_W$ and the drive transistor $TR_D$ so as to correspond to an environmental change.

2-2. Light Emitting Element: Pixel Circuit

Second Embodiment

Figure 3:
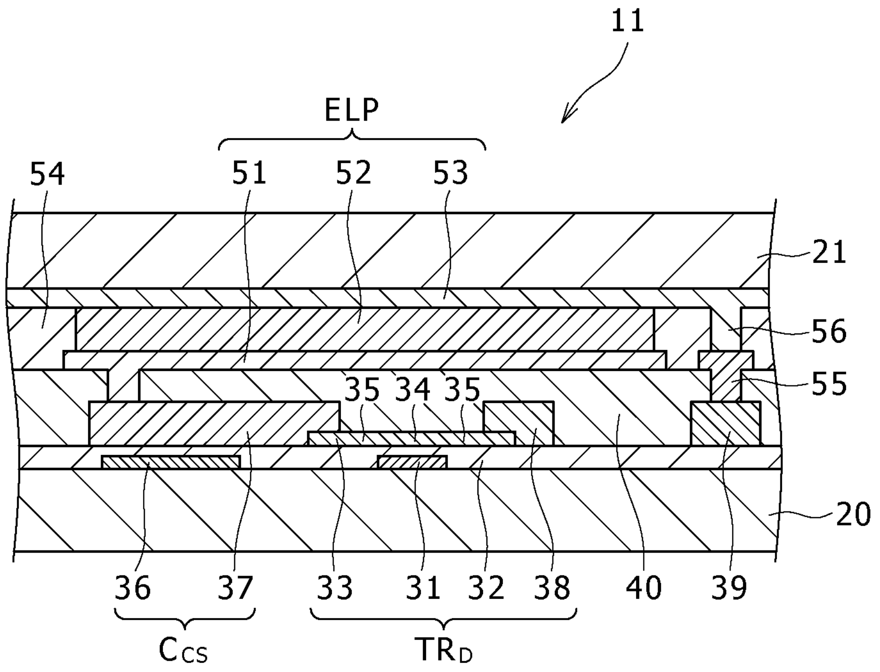
FIG. 3 is a partial cross sectional view showing a structure of a light emitting element (substantially, a pixel circuit) according to a second embodiment of the present disclosure.

FIG. 3 is a partial cross sectional view explaining a structure of a light emitting element 11 (substantially, the pixel circuit 10) including a driving circuit. Here, FIG. 3 is a schematic partial cross sectional view of a part of the light emitting element 11 (the pixel circuit 10). In FIG. 3, it is supposed that an insulated gate field-effect transistor is a thin film transistor (TFT). Although not illustrated in FIG. 3, either a so-called back gate thin film transistor or a MOS transistor may also be used.

Transistors and a capacitance portion (a hold capacitor $C_{cs}$) composing the driving circuit for the light emitting element 11 are formed on a supporting body 20. Also, a light emitting portion ELP, for example, is formed above the transistors and the hold capacitor $C_{cs}$ composing the drive circuit through an interlayer insulating layer 40. One of source and drain regions of a drive transistor $TR_D$ is connected to an anode electrode included in the light emitting portion ELP through a contact hole. In FIG. 3, only the drive transistor $TR_D$ is illustrated. A write transistor $TR_W$ and other transistors stay in hiding and are invisible. The light emitting portion ELP, for example, has the well-known constitution and structure of including an anode electrode, a hole transport layer, a light emitting layer, an electron transport layer, a cathode electrode, and the like.

Specifically, the drive transistor $TR_D$ is composed of a gate electrode 31, a gate insulating layer 32, a semiconductor layer 33, source and drain regions 35 provided in the semiconductor layer 33, and a channel formation region 34 to which a portion of the semiconductor layer 33 between the source and drain regions 35 corresponds. The hold capacitor $C_{cs}$ is composed of the other electrode 36, a dielectric layer composed of an extension portion of the gate insulating layer 32, and one electrode 37 (corresponding to a second node $ND_2$). The gate electrode 31, a part of the gate insulating layer 32, and the other electrode 36 composing the hold capacitor $C_{cs}$ are all formed on the supporting body 20. One of the source and drain regions 35 of the drive transistor $TR_D$ is connected to a wiring 38, and the other of the source and drain regions 35 of the drive transistor $TR_D$ is connected to the electrode 37. The drive transistor $TR_D$, the hold capacitor $C_{cs}$, and the like are all covered with an interlayer insulating layer 40. Also, the light emitting portion ELP composed of the anode electrode 51, the hole transport layer, the light emitting layer, the electron transport layer, and the cathode electrode 53 is provided on the interlayer insulating layer 40. In FIG. 3, the hole transport layer, the light emitting layer, and the electron transport layer are illustrated as one layer 52. A second interlayer insulating layer 54 is provided on a portion of the interlayer insulating layer 40 on which no light emitting portion ELP is provided. Also, a transparent substrate 21 is disposed on the second interlayer insulating layer 54 and the cathode electrode 53. Thus, a light emitted from the light emitting layer is transmitted through the substrate 21 to be emitted to the outside. One electrode 37 and the anode electrode 51 are connected to each other through a contact hole provided in the interlayer insulating layer 40. The cathode electrode 53 is connected to a wiring 39 provided on the extension portion of the gate insulating layer 32 through a contact hole 56 and a contact hole 55 which are provided in the second interlayer insulating layer 54 and the interlayer insulating layer 40, respectively.

In the second embodiment of the present disclosure, the pulse width of the drive pulse used in at least one of the write transistor $TR_W$ and the drive transistor $TR_D$ is adjustably formed so as to correspond to environment dependency.

2-3. Method of Driving Light Emitting Portion: Basis

Third Embodiment

A method of driving the light emitting portion will be described hereinafter. The method of driving the light emitting portion is substantially a method of driving the display device 1 according to the first embodiment of the present disclosure. For facilitating understanding, the description is given on the assumption that each of the transistors composing the pixel circuit 10 is composed of an n-channel transistor. In addition, it is supposed that an anode terminal of the light emitting portion ELP is connected to a second node $ND_2$, and a cathode terminal thereof is connected to a cathode wiring cath (an electric potential thereof is supposed to be a cathode electric potential $V_{cath}$). In addition, a light emission state (luminance) in the light emitting portion ELP is controlled in accordance with a magnitude of a value of a drain current $I_{ds}$. In the light emission state in the light emitting elements, of the two main electrode terminals (source and drain regions) of the drive transistor $TR_D$, one main electrode terminal (an anode side of the light emitting portion ELP) acts as a source terminal (source region), and the other main electrode terminal acts as a drain terminal (drain region). Then, it is supposed that the display device is a display device compatible with the color image display, and is composed of the pixel circuits 10 which are disposed in a two-dimensional matrix of (N/3)×M. Also, it is supposed that one pixel circuit composing one unit of the color image display is composed of three sub-pixel circuits: a red color light emitting pixel circuit $\mathbf{10}_{\_R}$ for emitting a red color light; a green color light emitting pixel circuit $\mathbf{10}_{\_G}$ for emitting a green color light; and a blue color light emitting pixel circuit $\mathbf{10}_{\_B}$ for emitting a blue color light. Also, it is supposed that the light emitting elements composing each of the pixel circuits 10 are driven in the line-sequential manner, and a display frame rate is FR (time/sec). That is to say, the light emitting elements composing (N/3) pixel circuits 10 disposed in a m-th row (m=1, 2, 3, . . . , M), more specifically, N pixel circuits 10 are driven at the same time. In other words, in the light emitting elements composing one row, a timing of an emission/non-emission thereof is controlled in increments of a row to which these light emitting elements belong. It is noted that processing for writing the video signals to the pixel circuits 10 composing one row, respectively, either may be processing for simultaneously writing the video signals to all of the pixel circuits 10, respectively (referred to as "simultaneous write processing" as well), or may be processing for successively writing the video signal every pixel circuit 10 (referred to "successive write processing" as well). It is only necessary to suitably select which of two types of processing is adopted depending on the configuration of the drive circuit.

Here, a description will be given with respect to a driving operation for the light emitting element (the pixel circuit 10) located in an m-th row and in an n-th column (n=1, 2, 3, . . . N). By the way, the light emitting element located in the m-th row and in the n-th column is referred to as either the (n, m)-th light emitting element or the (n, m)-th light emitting pixel circuit. Various kinds of processing (such as threshold voltage correcting processing, write processing, and mobility correcting step) are executed until end of a horizontal scanning period of time (an m-th horizontal scanning period of time) for the light emitting elements disposed in the m-th row. It is noted that the write processing and the mobility correcting step have to be executed within the m-th horizontal scanning period of time. On the other hand, the threshold voltage correcting processing and pre-processing following the threshold voltage correcting processing can be executed prior to the m-th horizontal scanning period of time depending on the kind of the drive circuit.

After end of all of the various kinds of processing described above, the light emitting portions composing the light emitting elements disposed in the m-th row are caused to emit lights, respectively. It is noted that after end of all of the various kinds of processing, the light emitting portions may be immediately caused to emit the lights, respectively, or the light emitting portions may be caused to emit the lights, respectively, after a lapse of a predetermined period of time (for example, the horizontal scanning period of time for the predetermined number of rows). It is only necessary to suitably set "a predetermined period of time" depending on the specification of the display device, the configuration of the pixel circuit 10 (in a word, the drive circuit), and the like. In the following description, for the sake of convenience of the description, it is supposed that after end of all of the various kinds of processing, the light emitting portions are immediately caused to emit the lights, respectively. The light emission of the light emitting portions composing the light emitting elements disposed in the m-th row is continuously carried out until right before of start of the horizontal scanning period of time for the light emitting elements disposed in an (m+m')-th row. "m'" may be determined depending on the design and specification of the display device. That is to say, the light emission of the light emitting portions composing the light emitting elements disposed in the m-th row of a certain display frame is continuously carried out until an (m+m'−1)-th horizontal scanning period of time.

On the other hand, as a rule, the light emitting portions composing the light emitting elements disposed in the m-th row maintain a non-light emission state until end of the write processing and the mobility correcting step within a period of time ranging from start of an (m+m')-th horizontal scanning period of time to the m-th horizontal scanning period of time in a next display frame. The provision of the period of time for the non-light emission state (referred to as "an non-emission period of time" as well) results in that the residual image blurring following the active matrix driving is reduced, and thus the moving image quality can be more satisfactory. However, the light emission state/non-light emission state of each of the pixel circuits 10 (light emitting elements) is by no means limited to the state which has been described so far. A time length of the horizontal scanning period of time is a time length shorter than (1/FR)×(1/M) sec. When a value of (m+m') exceeds M, the horizontal scanning period of time for a value exceeding the value of (m+m') is processed in a next display frame.

The wording "the transistor is held in an ON state (in a conduction state)" means a state in which the channel is formed between the main electrode terminals (the source and drain regions), and it is no object whether or not a current is caused to flow from one main electrode terminal to the other main electrode terminal. On the other hand, the wording "the transistor is held in an OFF state (in a non-conduction state)" means that no channel is formed between the main electrode terminals. The wording "a main electrode terminal of a certain transistor is connected to a main electrode terminal of another transistor" implies a form in which a source/drain region of a certain transistor and a source/drain region of another transistor occupy the same region. In addition thereto, the source/drain region can be not only made a conductive material such as poly silicon or amorphous silicon containing therein an impurity, but also composed of a layer made of a metal, an alloy, a conductive particle, a lamination structure thereof, or a layer made of an organic material (conductive polymer). In a timing chart used in the following description, a length (time length) of an axis of abscissa representing each of periods of time is merely schematic, and thus does not represent a rate of time lengths of the periods of time.

A method of driving the pixel circuit 10 includes a preprocessing step, a threshold voltage correcting processing step, a video signal writing processing step, a mobility correcting step, and a light emission step. The preprocessing step, the threshold voltage correcting processing step, the video signal writing processing step, and the mobility correcting step are collectively referred to as "a non-light emission step" as well. The video signal writing step and the mobility correcting step are executed at the same time depending on the configuration of the pixel circuit 10 in some cases. Hereinafter, these steps will be outlined.

In this connection, in the light emission state of the light emitting element, the drive transistor $TR_D$ is driven so as to cause a drain current $I_{ds}$ to flow in accordance with Expression (1):

$$I_{ds}=k\times\mu\times(V_{gs}-V_{th})^2 \quad (1)$$

where μ is an effective mobility, $V_{gs}$ is an electric potential difference (gate-to-source voltage) between an electric potential (a gate electric potential $V_g$) at a control electrode terminal and an electric potential (a source electric potential $V_s$) at a source terminal, $V_{th}$ is a threshold voltage, and k is a coefficient. In this case, the constant k is given by Expression (2):

$$k(1/2)\times(W/L)\times C_{ox} \quad (2)$$

where W is a channel width, L is a channel length, and $C_{ox}$ ((a relative permittivity of a gate insulating layer)×(a permittivity of a vacuum)/(a thickness of the gate insulating layer)) is an equivalent capacitance. In addition, the drain current $I_{ds}$ is caused to flow through the light emitting portion ELP, whereby the light emitting portion ELP emits a light. Moreover, the light emission state (luminance) in the light emitting portion ELP is controlled in accordance with the magnitude of a value of the drain current $I_{ds}$. In the light emission state of the light emitting element, of two main electrode terminals (source and drain regions) of the drive transistor $TR_D$, one main electrode terminal (an anode terminal side of the light emitting portion ELP) acts as a source terminal (source region), and the other main electrode terminal acts as a drain terminal (drain region). For the sake of convenience of the description, in the following description, one main electrode terminal of the drive transistor $TR_D$ is simply referred to as "a source terminal" and the other main electrode terminal is simply referred to as "a drain terminal" in some cases.

In the following description, unless otherwise stated, it is supposed that an electrostatic capacitance $C_{el}$ of a parasitic capacitance of the light emitting portion ELP is a sufficiently larger value than that of each of an electrostatic capacitance $C_{cs}$ of a hold capacitor $C_{cs}$, and an electrostatic capacitance $C_{gs}$ between a gate electrode terminal and a source electrode terminal as an example of a parasitic capacitance of the drive transistor $TR_D$. Thus, a change in the electric potential (the source electric potential $V_s$) of the source region (the second node $ND_2$) of the drive transistor $TR_D$ based on a change in the electric potential (the gate electric potential $V_g$) at the gate terminal of the drive transistor $TR_D$ is not taken into consideration.

[Preprocessing Step]

A first node initialization voltage ($V_{ofs}$) is applied to the first node $ND_1$, and a second node initialization voltage ($V_{ini}$) is applied to the second node $ND_2$ in such a way that a difference in electric potential between the first node $ND_1$ and the second node $ND_2$ exceeds the threshold voltage $V_{th}$ of the drive transistor $TR_D$, and a difference in electric potential between the second node $ND_2$ and the cathode electrode included in the light emitting portion ELP does not exceed a threshold voltage $V_{thEL}$ of the light emitting portion ELP. For example, the video signal $V_{sig}$ in accordance with which the luminance of the light emitting portion ELP is controlled is set to the range of 0 to 10 V, a power source voltage $V_{cc}$ is set to 20 V, the threshold voltage $V_{th}$ of the drive transistor $TR_D$ is set to 3 V, a cathode electric potential $V_{cath}$ is set to 0 V, and the threshold voltage $V_{thEL}$ of the light emitting portion ELP is set to 3 V. In this case, the electric potential $V_{ofs}$ used to initialize the electric potential at the control input terminal of the drive transistor $TR_D$ (the gate electric potential $V_g$, in a word, the electric potential at the first node $ND_1$) is set to 0 V, and the electric potential $V_{in}$ used to initialize the electric potential at the source terminal of the drive transistor $TR_D$ (the source electric potential $V_s$, in a word, the electric potential at the second node $ND_2$) is set to −10 V.

[Threshold Voltage Correcting Processing Step]

In a state in which the electric potential at the first node $ND_1$ is held, the drain current $I_{ds}$ is caused to flow through the drive transistor $TR_D$, whereby the electric potential at the second node $ND_2$ is changed from the electric potential at the first node $ND_1$ toward an electric potential obtained by subtracting the threshold voltage $V_{th}$ of the drive transistor $TR_D$ from the electric potential at the first node $ND_1$. In this case, a voltage (for example, a power source voltage in the phase of the light emission) exceeding a voltage obtained by adding the threshold voltage $V_{th}$ of the drive transistor $TR_D$ to the electric potential at the second node $ND_2$ after end of the preprocessing step is applied to the other main electrode terminal (on a side opposite to the second node $ND_2$) of the two main electrode terminals of the drive transistor $TR_D$. In this threshold voltage correcting processing step, the extent to that a difference in electric potential between the first node $ND_1$ and the second node $ND_2$ (in other words, the gate-to-source voltage $V_{gs}$ of the drive transistor $TR_D$) comes close to the threshold voltage $V_{th}$ of the drive transistor $TR_D$ is dependent on a time for the threshold voltage correcting processing. Therefore, for example, when a sufficiently long time for the threshold voltage correcting processing is ensured, the electric potential at the second node $ND_2$ reaches an electric potential obtained by subtracting the threshold voltage $V_{th}$ of the drive transistor $TR_D$ from the electric potential at the first node $ND_1$. As a result, the drive transistor $TR_D$ becomes an OFF state. On the other hand, for example, when the time for the threshold voltage correcting processing is forced to be set short, the difference in electric potential between the first node $ND_1$ and the second node $ND_2$ is larger than the threshold voltage $V_{th}$ of the drive transistor $TR_D$. As a result, the drive transistor $TR_D$ does not become the OFF state in some cases. As a result of execution of the threshold voltage correcting processing, the drive transistor $TR_D$ needs not to be necessarily become the OFF state. It is noted that in the threshold voltage correcting processing step, preferably, the electric potential is selected and decided so as to fulfill Expression (3), thereby preventing the light emitting portion ELP from emitting the light.

$$(V_{ofs}-V_{th})<(V_{thEL}+V_{cath}) \tag{3}$$

[Video Signal Writing Processing Step]

The video signal $V_{sig}$ is applied from the video signal line DTL to the first node $ND_1$ through the write transistor $TR_W$ which has been turned ON in accordance with the write drive pulse WS supplied from the write scanning line WSL, thereby causing the electric potential at the first node $ND_1$ to rise up to the video signal $V_{sig}$. The electric charges generated based on an electric potential change ($\Delta V_{ini}=V_{sig}-V_{ofs}$) at the first node $ND_1$ are allocated to the hold capacitor $C_{cs}$, the parasitic capacitance $C_{el}$ of the light emitting portion ELP, and the parasitic capacitance (such as a gate-to-source capacitance $C_{gs}$) of the drive transistor $TR_D$. When the electrostatic capacitance $C_{el}$ is sufficiently larger value than that of each of the electrostatic capacitance $C_{cs}$ and the electrostatic capacitance $C_{gs}$ of the gate-to-source capacitance $C_{gs}$, the change in the electric potential at the second node $ND_2$ based on the electric potential change ($V_{sig}-V_{ofs}$) is small. In general, the electrostatic capacitance $C_{el}$ of the parasitic capacitance $C_{el}$ of the light emitting portion ELP is larger than each of the electrostatic capacitance $C_{cs}$ of the hold capacitor $C_{cs}$, and the electrostatic capacitance $C_{gs}$ of the gate-to-source capacitance $C_{gs}$. In view of this point, except for the case where there is a special necessity, the change in the electric potential at the second node $ND_2$ caused by the change in the electric potential at the first node $ND_1$ is not taken into consideration. In this case, the gate-to-source voltage $V_{gs}$ can be expressed by Expression (4):

$$V_g=V_{sig}$$

$$V_s\approx V_{ofs}-V_{th}$$

$$V_{gs}\approx V_{sig}-(V_{ofs}-V_{th}) \tag{4}$$

[Mobility Correcting Step]

A current is supplied to the hold capacitor $C_{cs}$ through the drive transistor $TR_D$ while the video signal $V_{sig}$ is supplied to one terminal of the hold capacitor $C_{cs}$ through the write transistor $TR_W$ (in a word, the drive voltage corresponding to the video signal $V_{sig}$ is written to the hold capacitor $C_{cs}$). For example, in a state in which the video signal $V_{sig}$ is supplied from the video signal line DTL to the first node $ND_1$ through the write transistor $TR_W$ which has been turned ON in accordance with the write drive pulse WS supplied from the write scanning line WSL, the current is supplied to the drive transistor $TR_D$ to cause the drain current $I_{ds}$ to flow, thereby changing the electric potential at the second node $ND_2$. Then, after a lapse of a predetermined period of time, the write transistor $TR_W$ is turned OFF. Let $\Delta V$ (=an electric potential correction value, or an amount of negative feedback) be a change in the electric potential at the second node $ND_2$ at this time. A predetermined period of time for execution of the mobility correcting step has to be previously decided as a design value during the design of the display device. It is noted that in this case, preferably, a mobility correction period of time is determined so as to fulfill Expression (5). By adopting such a procedure, the light emitting portion ELP is prevented from emitting the light for the mobility correction period of time.

$$(V_{ofs}-V_{th}+\Delta V)<(V_{thEL}+V_{cath}) \tag{5}$$

When a value of the mobility $\mu$ of the drive transistor $TR_D$ is large, the electric potential correction value $\Delta V$ becomes large. On the other hand, when the value of the mobility $\mu$ of the drive transistor $TR_D$ is small, the electric potential correction value $\Delta V$ becomes small. The gate-to-source voltage $V_{gs}$ (in a word, the difference in electric potential between the first node $ND_1$ and the second node $ND_2$) of the drive transistor $TR_D$ at this time can be expressed by Expression (6):

$$V_{gs}\approx V_{sig}-(V_{ofs}-V_{th})-\Delta V \tag{6}$$

Although the gate-to-source voltage $V_{gs}$ regulates the luminance in the phase of the light emission, the electric potential correction value $\Delta V$ is proportional to the drain current $I_{ds}$ of the drive transistor $TR_D$, and also the drain current $I_{ds}$ is proportional to the mobility a of the drive transistor $TR_D$. As a result, since the electric potential correction value $\Delta V$ becomes larger as the mobility $\mu$ is larger, it is possible to remove the dispersion of the mobiloities $\mu$ in the pixel circuits 10.

[Light Emission Step]

The write transistor $TR_W$ is turned OFF in accordance with the write drive pulse WS supplied from the write scanning line WSL to cause the first node $ND_1$ to be a floating state. Also, the electric power is supplied from the power source to the drive transistor $TR_D$ to cause the drain current $I_{ds}$ corresponding to the gate-to-source voltage $V_{gs}$ (the difference in electric potential between the first node $ND_1$ and the second node $ND_2$) of the drive transistor $TR_D$ to flow through the light emitting portion ELP through the drive transistor $TR_D$, whereby the light emitting portion ELP is driven to emit the light.

[Different Points Due to Configuration of Drive Circuit]

Here, different points among the typical 5Tr/1C type drive configuration, 4Tr/1C type drive configuration, 3Tr/1C type drive configuration, and 2Tr/1C type drive configuration are as follows. In the case of the 5Tr/1C type drive configuration, a first transistor $TR_1$ (light emission control transistor), a second transistor $TR_2$, and a third transistor $TR_3$ are provided. In this case, the first transistor $TR_1$ is connected between the main electrode terminal, on the power source side, of the drive transistor $TR_D$, and the power source circuit (power source portion). The second transistor $TR_2$ applies the second node initialization voltage. Also, the third transistor $TR_3$ applies the first node initialization voltage. Each of the first transistor $TR_1$, the second transistor $TR_2$, and the third transistor $TR_3$ is a switching transistor. The first transistor $TR_1$ is held in the ON state for the light emission period of time, and is then turned OFF to enter the non-light emission period of time. Also, the first transistor $TR_1$ is turned ON once for the subsequent threshold voltage correction period of time, and is also held in the ON state in and after the mobility correction period of time (a next light emission period of time as well). The second transistor $TR_2$ is held in the ON state only for the second node initialization period of time, and is held in the OFF state for any of periods of time other than the second node initialization period of time. The third transistor $TR_3$ is held in the ON state only for the period of time from the first node initialization period of time to the threshold voltage correction period of time, and is held in the OFF state for any of the periods of time other than that period of time. The write transistor $TR_W$ is held in the ON state for the period of time from a video signal writing processing period of time to the mobility correcting step period of time, and is held in the OFF state for any of the periods of time other than that period of time.

In the case of the 4Tr/1C type drive configuration, the third transistor $TR_3$ which supplies the first node initialization voltage is removed from the 5Tr/1C type drive configuration. Also, the first node initialization voltage is supplied with the video signal $V_{sig}$ from the video signal line DTL in a time division manner. The write transistor $TR_W$ is held in the ON state for the first node initialization period of time as well in order to supply the first node initialization voltage from the video signal line DTL to the first node for the first node initialization period of time. Typically, the write transistor $TR_W$ is held in the ON state for the period of time from the first node initialization period of time to the mobility correcting step period of time, and is held in the OFF state for any of the periods of time other than that period of time.

In the case of the 3Tr/1C type drive configuration, both of the second transistor $TR_2$, and the third transistor $TR_3$ are removed from the 5TR/1C type drive configuration. Also, the first node initialization voltage and the second node initialization voltage are supplied with the video signal $V_{sig}$ from the video signal line DTL in the time division manner. For the electric potential of the video signal DTL, in order that the electric potential at the second node $ND_2$ may be set to the second node initialization voltage for the second node initialization period of time, and the electric potential at the first node $ND_1$ may be set to the first node initialization voltage for the subsequent first node initialization period of time, a voltage $V_{ofs\_H}$ corresponding to the second node initialization voltage is supplied and a first node initialization voltage $V_{ofs\_L}$ (=$V_{ofs}$) is then obtained. Also, the write transistor $TR_W$ is held in the ON state for both of the first node initialization period of time and the second node initialization period of time as well in correspondence thereto. Typically, the write transistor $TR_W$ is held in the ON state for the period of time from the second node initialization period of time to the mobility correcting step period of time, and is held in the OFF state for any of the periods of time other than that period of time.

In this connection, in the case of the 3Tr/1C type drive configuration, the electric potential at the second node $ND_2$ is changed by utilizing the video signal line DTL. For this reason, the electrostatic capacitance $C_{cs}$ of the hold capacitor $C_{cs}$ is set to a larger value than that of each of the drive circuits (for example, the electrostatic capacitance $C_{cs}$ is set to about ¼ to about ⅓ of the electrostatic capacitance $C_{el}$) in terms of the design. Therefore, a point that the degree of the change in the electric potential at the second node $ND_2$ caused by the change in the electric potential at the first node $ND_1$ is large is taken into consideration.

In the case of the 2Tr/1C type drive configuration, the first transistor $TR_1$, the second transistor $TR_2$, and the third transistor $TR_3$ are all removed from the 5TR/1C type drive configuration. Also, the first node initialization voltage is supplied with the video signal $V_{sig}$ from the video signal line DTL in the time division manner. Also, the main electrode terminal, on the power source side, of the drive transistor $TR_D$ is pulse-driven by using both of the first electric potential $V_{cc\_H}$ (=$V_{cc}$ in the case of the 5Tr/1C type drive configuration) and the second electric potential $V_{cc\_L}$ (=$V_{ini}$ in the case of the 5Tr/1C type drive configuration), thereby giving the second node initialization voltage. The electric potential at the main electrode terminal, on the power source side, of the drive transistor $TR_D$ is set to the first electric potential $V_{cc\_H}$ for the light emission period of time, and is then set to the second electric potential $V_{cc\_L}$, so that the light emitting portion ELP enters the non-light emission period of time. Also, the electric potential at the main electrode terminal, on the power source side, of the drive transistor $TR_D$ is set to the first electric potential $V_{cc\_H}$ in and after the subsequent threshold correction period of time (for the next light emission period of time as well). The write transistor $TR_W$ is held in the ON state for the first node initialization period of time as well in order to supply the first node initialization voltage from the video signal line DTL to the first node $ND_1$ for the first node initialization period of time. Typically, the write transistor $TR_W$ is held in the ON state for the period of time from the first node initialization period of time to the mobility correcting step period of time, and is held in the OFF state for any of the periods of time other than that period of time.

It is noted that although in this case, the description has been given with respect to the case where with regard to the description of the characteristics of the drive transistors, the correction processing is executed for both of the threshold voltage and the mobility, alternatively, the correction processing may also be executed for only one of the threshold voltage and the mobility.

In the third embodiment of the present disclosure, a width of the pulse signal causing the drive pulse used to drive at least one of the write transistor $TR_W$ and the drive transistor $TR_D$ is adjusted so as to correspond to an environmental change.

3. Electronic Apparatus

Fourth Embodiment

An electronic apparatus according to a fourth embodiment of the present disclosure includes the pixel array portion 102 in which the pixel circuits 10 each including the display portion, the hold capacitor $C_{cs}$, the write transistor $TR_W$ for writing the drive voltage corresponding to the video signal $V_{sig}$ to the hold capacitor $C_{cs}$, and the drive transistor $TR_D$ for driving the display portion in accordance with the drive voltage written to the hold capacitor $C_{cs}$ are disposed, and the signal generating portion for generating the video signal $V_{sig}$ which is to be supplied to the pixel portion. Also, the electronic apparatus of the fourth embodiment includes the drive lines, the selecting portion for selecting the drive lines, the pulse width adjusting portion, and the pulse generating portion. In this case, the drive lines are disposed in the pixel array portion 102 and supply the drive pulses in order to drive at least ones of the write transistors $TR_W$ and the drive transistors $TR_D$ disposed in the predetermined direction. The pulse width adjusting portion adjusts the width of the pulse signal causing the drive pulse used to drive at least one of the write transistor and the drive transistor so as to correspond to the environmental change. Also, the pulse generating portion generates the pulse signal causing the drive pulse in accordance with the pulse signal outputting the pulse width adjusting portion. In addition thereto, the selecting portion supplies the drive pulses to the drive lines, respectively, in accordance with the pulse signal generated in the pulse generating portion.

Although the present disclosure has been described so far based on the preferred embodiments, the present disclosure is by no means limited to the preferred embodiments. The various kinds of configurations and structures composing the display device, the display element (pixel circuit), the driving circuit, and the electronic apparatus which have been described in the embodiments, and the steps in the method of driving the emitting portion are all merely exemplified, and thus can be suitably changed.

In addition, in each of the operations with the 5Tr/1C type drive configuration, the 4Tr/1C type drive configuration, and the 3Tr/1C type drive configuration, the writing processing step and the mobility correcting step may be separately executed or, or the mobility correcting step may also be executed together with the writing processing step. Specifically, it is only necessary that in a state in which the first transistor $TR_1$ (light emission controlling transistor) is held in the ON state, the video signal $V_{sig}$ is applied from the data line DTL to the first node $ND_1$ through the write transistor $TR_W$.

4. Concrete Examples

Hereinafter, a description will be given with respect to Concrete Examples of the technique of the embodiments in which a display nonuniformity phenomenon due to the dispersion of the characteristics of the elements composing the pixel circuit is suppressed independently of the environmental change. It is noted that in the display device using the active matrix type organic EL panel, for example, the various kinds of gate signals (control pulses) which are to be supplied to the control input terminals of the transistors by the vertical scanning portion disposed either on both sides of the panel or on one side of the panel are generated, and are then applied to the pixel circuit 10. In addition thereto, in the display device using such an organic EL panel, for reduction of the number of elements, and the high-definition promotion, the 2Tr/1C type pixel circuit 10 is used in some cases. In view of this point, in the following description, Concrete Examples each of which is applied to the 2Tr/1C type drive configuration will now be typically described.

4-1. Example 1

Figure 4:
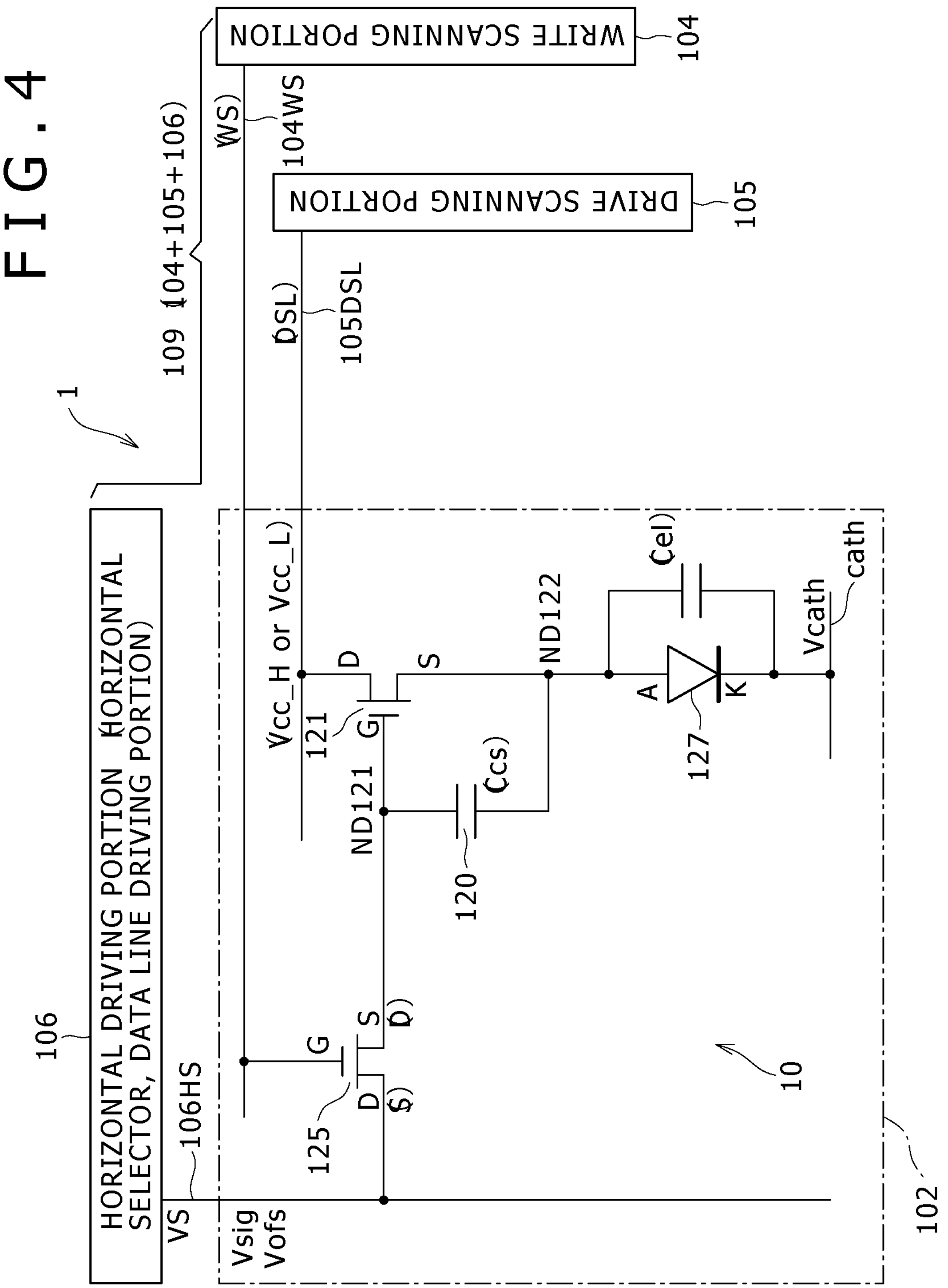
FIG. 4 is a circuit diagram, partly in block, showing a configuration of one form of a pixel circuit in a display device according to Example 1 of the first embodiment of the present disclosure.
Figure 5:
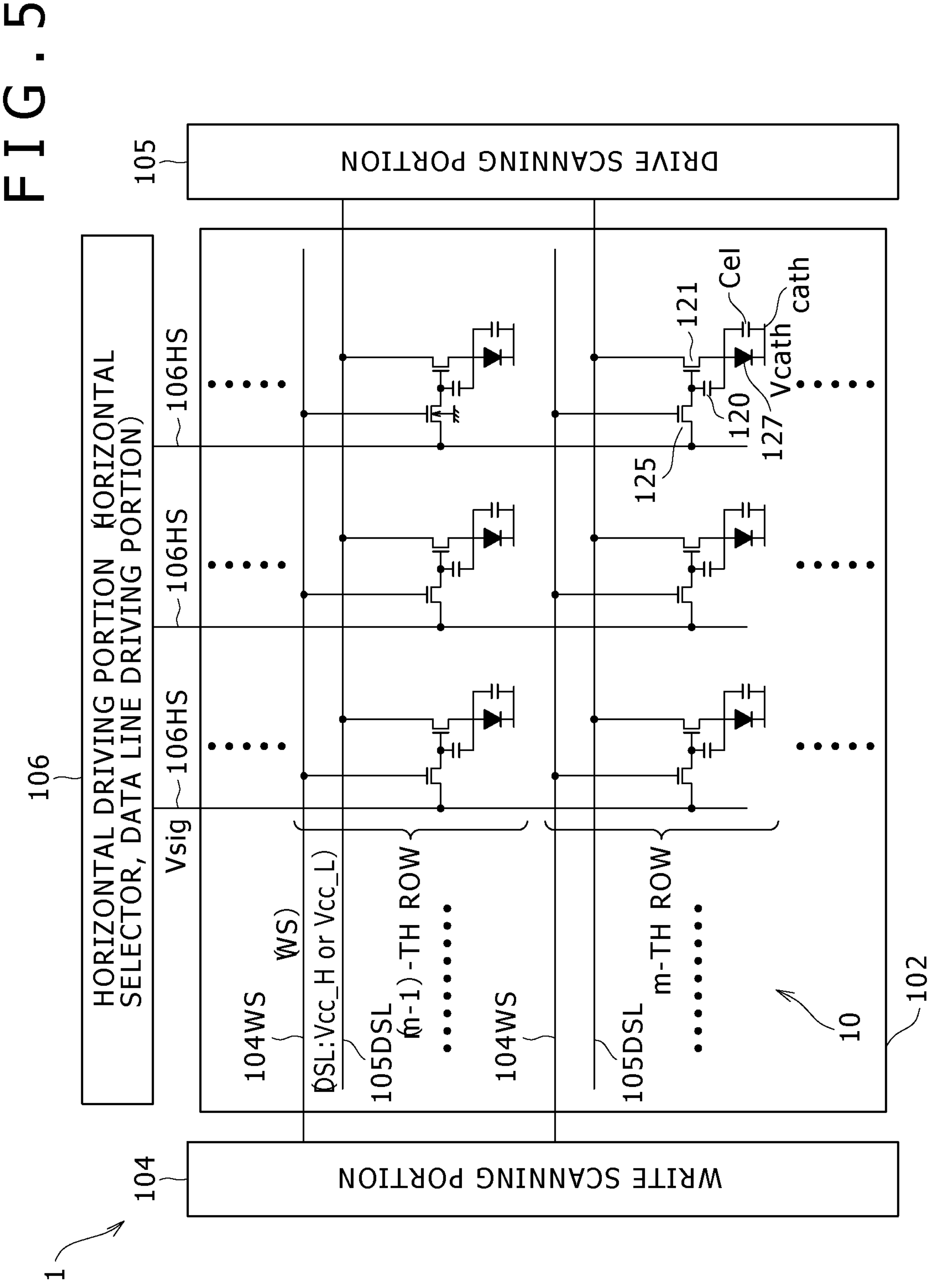
FIG. 5 is a circuit diagram, partly in block, showing a configuration of an entire outline of the display device, including the pixel circuit, according to Example 1 of the first embodiment of the present disclosure.

(Pixel Circuit): Adjustment of Correction Period of Time Corresponding to Environment Dependency of Element Characteristics FIGS. 4 and 5 are respectively diagrams showing one form of the pixel circuit 10, and one form of the display device 1 including the pixel circuit 10. Specifically, FIG. 4 is a circuit diagram showing a basic configuration (for one pixel) of the pixel circuit 10, and FIG. 5 is a circuit diagram showing a concrete configuration (of the entire display device 1). It is noted that both of the vertical driving portion 103 and the horizontal driving portion 106 which are provided in peripheral portions of the pixel circuits 10 on the substrate 101 of the display panel portion 100 are also illustrated together therewith.

In the display device 1, an electrooptic element (an organic EL element 127 is used as the light emitting portion ELP in this case) within the pixel circuit 10 is caused to emit a light in accordance with the video signal $V_{sig}$ (specifically, a signal amplitude $\Delta V_{in}$). For this reason, the display device 1 includes at least a drive transistor 121 (the drive transistor $TR_D$), a hold capacitor 120 (the hold capacitor $C_{cs}$), the organic EL element 127 (the light emitting portion ELP), and a sampling transistor 125 (the write transistor $TR_W$) in the pixel circuit 10 disposed in a matrix in the pixel array portion 102. In this case, the drive transistor 121 generates a drive current. The hold capacitor 120 is connected between a control input terminal (typically, a gate electrode terminal) and an output terminal (typically, a source electrode terminal) of the drive transistor 121. The organic EL element 127 is an example of the electrooptic element and is connected to the output terminal of the drive transistor 121. Also, the sampling transistor 125 writes information on the signal amplitude $\Delta V_{in}$ to the hold capacitor 120. In the pixel circuit 10, the drive current $I_{ds}$ based on the information held in the hold capacitor 120 is generated by the drive transistor 121 to be caused to flow the organic EL element 127 as the example of the electrooptic element, thereby causing the organic EL element 127 to emit a light.

Since the sampling transistor 125 writes the information on the signal amplitude $\Delta V_{in}$ to the hold capacitor 120, the sampling transistor 125 fetches a signal electric potential ($V_{ofs}+\Delta V_{in}$) in an input terminal thereof (either one of a source electrode terminal or drain electrode terminal thereof), and writes the information on the signal amplitude $\Delta V_{in}$ to the hold capacitor 120 connected to an output terminal (the other of the source electrode terminal or drain electrode terminal thereof). Of course, the output terminal of the sampling transistor 125 is connected to the control input terminal as well of the drive transistor 121.

Note that, a most basic configuration is shown as a connection configuration of the pixel circuit 10 shown here. Thus, all it takes is that the pixel circuit 10 is one including at least the constituent elements described above. Thus, the pixel circuit 10 may include constituent elements (in a word, other constituent elements) other than those constituent elements. In addition, the wording “connection” is by no means limited to direct connection, but may also be connection made through any other suitable constituent element(s). For example, a change such as interposition of a switching transistor or a functional portion having a certain function may also be further added to interconnection in some cases as may be necessary. Typically, a switching transistor for dynamically controlling a display period of time (in other words, a non-light emission period of time) may be disposed either between the output terminal of the drive transistor 121 and the electrooptic element (the organic EL element 127), or between the power source supply terminal (typically, the drain electrode terminal) of the drive transistor 121, and a power source line PWL (a power source supply line 105DSL in this case) as a wiring for the power source supply in some cases. Even in the case of the pixel circuits of such modified changes, any of such modified changes is the pixel circuit 10 which realizes the display device according to the first embodiment of the present disclosure as long as it can realize the constitution and operation which will be described in Example 1 (or any other suitable Example).

In addition, for example, a control portion 109 including a write scanning portion 104 and a drive scanning portion 105 is provided in the peripheral portion for driving the pixel circuit 10. In this case, the write scanning portion 104 scans the pixel circuits 10 in the line-sequential manner by successively controlling the sampling transistors 125 with the horizontal cycle, thereby writing the information on the signal amplitude $\Delta V_{in}$ of the video signal $V_{sig}$ to the hold capacitors 120 for one row. Also, the drive scanning portion 105 outputs a scanning drive pulse (a power source drive pulse DSL) for control for the power source supply whose electric power is applied to the power source supply terminals of the drive transistors 121 for one row in accordance with the line-sequential scanning in the write scanning portion 104. In addition, the control portion 109 is provided with a horizontal driving portion 106. In this case, the horizontal driving portion 106 carries out the control in such a way that the video signal $V_{sig}$ which is switched between the reference electric potential ($V_{ofs}$) and the signal electric potential ($V_{ofs}+\Delta V_{in}$) with each of the horizontal cycles in accordance with the line-sequential scanning in the write scanning portion 104 is supplied to the sampling transistor 125.

Preferably, it is only necessary that the control portion 109 carries out the control so as to perform a bootstrap operation in which the sampling transistor 125 is caused to become a non-conduction stare at a time point at which the information on the signal amplitude $\Delta V_{in}$ is written to the hold capacitor 120 to stop the supply of the video signal $V_{sig}$ to the control input terminal of the drive transistor 121, and thus the electric potential at the control input terminal is changed in conjunction with the change in the electric potential at the output terminal of the drive transistor 121. Preferably, the control portion 109 carries out the bootstrap operation even at an initial stage of start of the light emission after completion of the sampling operation. That is to say, after the sampling transistor 125 has been caused to become the conduction state in a state in which the signal electric potential ($V_{ofs}+\Delta V_{in}$) has being supplied to the sampling transistor 125, the sampling transistor 125 is caused to become the non-conduction state, whereby a difference in electric potential between the control input terminal and the output terminal of the drive transistor 121 is made to be maintained constant.

In addition, preferably, the control portion 109 controls the bootstrap operation in such a way that a temporal change correcting operation of the electrooptic element (the organic EL element 127) is realized for the light emission period of time. For this reason, all it takes is that the control portion 109 continuously holds the sampling transistor 125 in the non-conduction state for a period of time for which the drive current $I_{ds}$ based on the information held in the hold capacitor 120 is caused to flow through the electrooptic element (the organic EL element 127), whereby the difference in electric potential between the control input terminal and the output terminal of the drive transistor 121 can be maintained constant, thereby realizing the temporal change correcting operation of the electric element. Even when current-voltage characteristics of the organic EL element 127 is changed with time due to the bootstrap operation of the hold capacitor 120 in the phase of the light emission, the voltage difference in electric potential between the control input terminal and the output terminal of the drive transistor 121 is held constant by the hold capacitor 120 carrying out the bootstrap operation, whereby the constant emission luminance is held on a constant basis. In addition, preferably, the control portion 109 carries out the control in such a way that the sampling transistor 125 is caused to conduct in a time zone for which the reference electric potential (=the first node initialization voltage $V_{ofs}$) is supplied to the input terminal (typically, the source electrode terminal) of the sampling transistor 125, thereby carrying out a threshold voltage correcting operation for holding the voltage corresponding to the threshold voltage $V_{th}$ of the drive transistor 121 in the hold capacitor 120.

All it takes is that the threshold voltage correcting operation is repetitively carried out with plural horizontal cycles preceding the operation for writing the information on the signal amplitude $\Delta V_{in}$ to the hold capacitor 120 as may be necessary. Here, the wording "as may be necessary" means the case where for the threshold voltage correction period of time within one horizontal cycle, it may be impossible to sufficiently hold the voltage corresponding to the threshold voltage of the drive transistor 121 in the hold capacitor 120. The threshold voltage correcting operation is carried out plural times, whereby the voltage corresponding to the threshold voltage $V_{th}$ of the drive transistor 121 is reliably held in the hold capacitor 120. Processing for carrying out the threshold voltage correction plural times is referred to as "division threshold voltage correction" as well.

In addition, more preferably, the control portion 109 carries out the control in such a way that in a time zone for which the reference electric potential ($V_{ofs}$) is supplied to the input terminal of the sampling transistor 125, the sampling transistor 125 is caused to conduct prior to the threshold correcting operation, thereby carrying out preparation operations (such as a discharging operation and an initialization operation) for the threshold voltage correction. The electric potentials at the control input terminal and the output terminal of the drive transistor 121 are initialized before the threshold voltage correction is carried out. More specifically, by connecting the hold capacitor 120 between the control input terminal and the output terminal of the drive transistor 121, the difference in electric potential between the both terminals of the hold capacitor 120 is set so as to become equal to or larger than the threshold voltage $V_{th}$.

Note that, all it takes is that in carrying out the threshold voltage correction with the 2TR/1C type drive configuration, a drive scanning portion 105 is provided in each pixel circuit 10 for one row in accordance with the line-sequential scanning in the write scanning portion 104 in the control portion 109, and the control portion 109 carries out the control in such a way that in a time zone for which a voltage corresponding to a first electric potential $V_{cc\_H}$ is supplied to the power source supply terminal of the drive transistor 121, and the signal electric potential ($V_{ofs}+\Delta V_{in}$) is supplied to the sampling transistor 125, the sampling transistor 125 is caused to conduct, thereby carrying out the threshold voltage correcting operation. In this case, the drive scanning portion 105 switches the first electric potential $V_{cc\_H}$ used to cause the drive current $I_{ds}$ to flow through the electrooptic element (the organic EL element 127), and a second electric potential $V_{cc\_L}$ over to each other to output either the first electric potential $V_{cc\_H}$ or the second electric potential $V_{cc\_L}$ thus switched. In addition, all it takes is that in carrying out the preparation operation for the threshold voltage correction with the 2Tr/1C type drive configuration, in a time zone for which a voltage corresponding to the second electric potential $V_{cc\_L}$ (=the second node initialization voltage $V_{ini}$) is supplied to the power source supply terminal of the drive transistor 121, and the reference electric potential ($V_{ofs}$) is supplied to the sampling transistor 125, the sampling transistor 125 is caused to conduct, and thus the electric potential at the control input terminal (in a word, the first node $ND_1$) of the drive transistor 121 is initialized to the reference electric potential ($V_{ofs}$), and the electric potential at the output terminal (in a word, the second node $ND_2$) is initialized to the second electric potential $V_{cc\_L}$.

More preferably, the control portion 109 carries out the control in such a way that after completion of the threshold voltage correcting operation, when in a time zone for which the voltage corresponding to the first electric potential $V_{cc\_H}$ is supplied to the drive transistor 121, and the signal electric potential ($V_{ofs}+\Delta V_{in}$) is supplied to the sampling transistor 125, the sampling transistor 125 is caused to conduct to write the information on the signal amplitude $\Delta V_{in}$ to the hold capacitor 120, information for the correction for the mobility μ of the drive transistor 121 is added to the information which is to be written to the hold capacitor 120. In this case, all it takes is that in a predetermined position within a time zone for which the signal electric potential ($V_{ofs}+\Delta V_{th}$) is supplied to the sampling transistor 125, only for a period of time shorter than the time zone, the sampling transistor 125 is caused to conduct. Hereinafter, an example of the pixel circuit 10 with the 2Tr/1C type drive configuration will be concretely described.

In the pixel circuit 10, basically, the drive transistor is composed of an n-channel thin film field-effect transistor. In addition, the feature of the pixel circuit 10 is that there is adopted a drive system in which the pixel circuit 10 includes a circuit for suppressing a change in the drive current $I_{ds}$ supplied to the organic EL element due to the temporal deterioration of the organic EL element, that is, a drive signal fixing circuit (part 1) for maintaining the drive current $I_{ds}$ constant by correcting change in current-voltage characteristics of the organic EL element as an example of the electrooptic element, and thus the drive current $I_{ds}$ is maintained constant by realizing a threshold voltage correcting function and a mobility correcting function of preventing the change in the drive current $I_{ds}$ due to the change in the characteristics (such as the dispersion of the threshold voltages and the dispersion of the mobilities) of the drive transistor.

With regard to a method of suppressing an influence exerted on the drive current $I_{ds}$ due to the change in the characteristics (such as the dispersion and the change in the threshold voltage, the mobility, and the like) of the drive transistor 121, the drive timings for the transistors (the drive transistor 121 and the sampling transistor 125) are devised while the drive current with the 2Tr/1C type drive configuration is directly adopted as the drive signal fixing circuit (part 1), thereby coping with the dispersion and the change in the threshold voltage, the mobility, and the like. Since the pixel circuit 10 has the 2Tr/1C type drive configuration and thus the number of elements and the number of wirings are each small, the high definition promotion is possible. In addition thereto, since the sampling can be carried out without the deterioration of the video signal $V_{sig}$, it is possible to obtain the excellent image quality.

In addition, the pixel circuit 10 has the feature in the connection form of the hold capacitor 120, and composes the bootstrap circuit, as an example of a drive signal fixing circuit (part 2), as a circuit for preventing the change in the drive current $I_{ds}$ due to the temporal deterioration of the organic EL element 127. The features of the pixel circuit 10 is to include the drive signal fixing circuit (part 2) which realizes the bootstrap function of fixing the drive current $I_{ds}$ (preventing the change in the drive current $I_{ds}$) even when there is the temporal change in the current-voltage characteristics of the organic EL element.

Field-effect transistors (FETs) are used as the transistors, including the drive transistor. In this case, with regard to the drive transistor, a gate electrode terminal is treated as a control input terminal, one of a source electrode terminal and a drain electrode terminal (the source electrode terminal in this case) is treated as an output terminal, and the other (the drain electrode terminal in this case) is treated as a power source supply terminal.

Specifically, as shown in FIGS. 4 and 5, the pixel circuit 10 includes an n-channel drive transistor 121, an n-channel sampling transistor 125, and an organic EL element 127 as an example of the electrooptic element which emits a light by causing a current to flow therethrough. In general, since the organic EL element 127 has a rectification property, the organic EL element 127 is represented by a symbol of a diode. It is noted that a parasitic capacitance $C_{el}$ exists in the organic EL element 127. In FIGS. 4 and 5, the parasitic capacitance $C_{el}$ is shown in parallel with the organic EL element 127 (represented by the symbol of the diode).

With regard to the drive transistor 121, a drain terminal D thereof is connected to a power source supply line 105DSL through which either the first electric potential $V_{cc\_H}$ or the second electric potential $V_{cc\_L}$ is supplied, and a source terminal S thereof is connected to an anode terminal A of the organic EL element 127 (a connection point thereof is the second node $ND_2$ and is represented as a node ND122). Also, a cathode terminal K of the organic EL element 127 is connected to a cathode wiring cath (an electric potential thereof is a cathode electric potential $V_{cath}$, for example, GND) through which the reference electric potential is supplied and which is common to all of the pixel circuits 10. It is noted that the cathode wiring cath may be composed of only a single layer wiring (upper layer wiring) therefor, or for example, an auxiliary wiring for the cathode wiring may be provided in the anode layer in which a wiring for an anode is formed, thereby reducing a resistance value of the cathode wiring. The auxiliary wiring is wired in a lattice-like shape, in a column-like shape or in a row-like shape within the pixel array portion 102 (display area), and has the same electric potential as that of the upper layer wiring, that is, a fixed electric potential.

With regard to the sampling transistor 125, a gate terminal G thereof is connected to a write scanning line 104WS extending from a write scanning portion 104, a drain terminal D thereof is connected to a video signal 106HS (a video signal line DTL), and a source terminal S thereof is connected to a gate terminal G of the drive transistor 121 (a connection point thereof is the first node $ND_1$ and is represented as a node ND121). A write drive pulse WS set at an active H level is supplied from the write scanning portion 104 to the gate terminal G of the sampling transistor 125. The sampling transistor 125 may adopt a connection form in which the source terminal S and the drain terminal D are reversed.

The drain terminal D of the drive transistor 121 is connected to a power source supply line 105DSL extending from the drive scanning portion 105 functioning as a power source scanner. The feature of the power source supply line 105DSL is that the power source supply line 105DSL itself has an ability to supply an electric power from a power source to the drive transistor 121. The drive scanning portion 105 switches the first electric potential $V_{cc\_H}$, on the high voltage side, corresponding to the power source voltage, and the second electric potential $V_{cc\_L}$ (referred to as either an initialization voltage or an initial voltage as well), on the low voltage side, which is utilized for the preparation operation preceding the threshold correction and which corresponds to the power source voltage over to each other to supply one of the first electric potential $V_{cc\_H}$ and the second electric potential $V_{cc\_L}$ thus switched to the drain terminal D of the drive transistor 121.

The drain terminal D side (power source circuit side) of the drive transistor 121 is driven by using the power source drive pulse DSL taking two values of the first electric potential $V_{cc\_H}$ and the second electric potential $V_{cc\_L}$, thereby making it possible to carry out the preparation operation preceding the threshold correction. The second electric potential $V_{cc\_L}$ is set to an electric potential sufficiently lower than the reference electric potential ($V_{ofs}$) of the video signal $V_{sig}$ in the video signal line 106HS. Specifically, the second electric potential $V_{cc\_L}$ on the low electric potential side of the power source supply line 105DSL is set in such a way that a gate-to-source voltage $V_{gs}$ (a difference between a gate electric potential $V_g$ and a source electrode potential $V_s$) of the drive transistor 121 becomes larger than the threshold voltage $V_{th}$ of the drive transistor 121. It is noted that the reference electric potential ($V_{ofs}$) is not only utilized for the initialization operation preceding the threshold correcting operation, but also utilized for previously precharging the video signal line 106HS.

In such a pixel circuit 10, when the organic EL element 127 is driven, the first electric potential $V_{cc\_H}$ is supplied to the drain terminal D of the drive transistor 121, and the source terminal S of the drive transistor 121 is connected to the anode terminal A side of the organic EL element 127, thereby forming a source follower circuit as a whole.

When such a pixel circuit 10 is adopted, the 2TR/1C type drive configuration is adopted in which in addition to the drive transistor 121, one switching transistor (the sampling transistor 125) is used for the scanning. Also, the influence exerted on the drive current $I_{ds}$ due to the temporal change of the organic EL element 127, and the change in characteristics (such as the dispersion and the change in the threshold voltage, the mobility, and the like) of the drive transistor 121 is prevented by the setting of the ON/OFF timings for the power source drive pulse DSL and the write drive pulse WS in accordance with which the switching transistors are controlled.

[Operation of Pixel Circuit]

Figure 6:
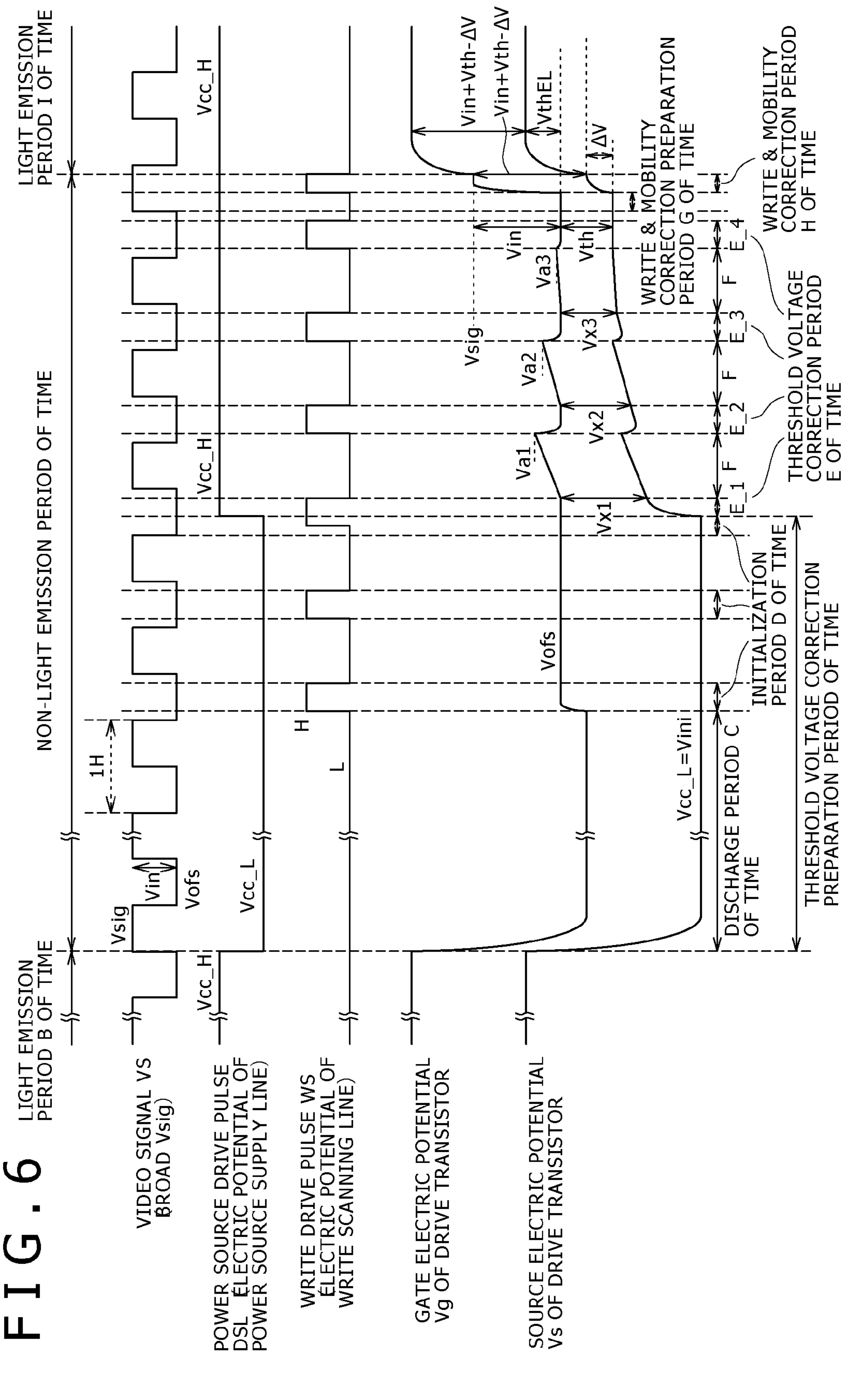
FIG. 6 is a timing chart explaining a method of driving the pixel circuit of the display device according to a third embodiment of the present disclosure.

FIG. 6 is a timing chart (ideal state) explaining an operation of the pixel circuit 10 when the information on the signal amplitude $V_{in}$ is written to the hold capacitor 120 in the line-sequential manner as an example of the drive timing for the pixel circuit 10. FIGS. 7A to 7G are respectively circuit diagrams explaining equivalent circuits and operation states in a main period of time in the timing chart shown in FIG. 6. In FIG. 6, a change in the electric potential of the write scanning line 104WS, a change in the electric potential of the power source supply line 105DSL, and a change in the electric potential of the video signal line 106HS are shown with a time axis as being common. Changes in the gate electric potential $V_g$ and the source electric potential $V_s$ of the drive transistor 121 are also shown in parallel with these electric potential changes. Basically, the same driving operation is carried out with a delay of only one horizontal scanning period of time every one row of the write scanning line 104WS and the power source supply line 105DSL.

The value of the current caused to flow through the organic EL element 127 is controlled in accordance with the timings of the pulses like the signals shown in FIG. 6. In the example of the timings shown in FIG. 6, after the quenching and the initialization of the node ND122 have been carried out by setting the power source drive pulse DSL to the second electric potential $V_{cc\_L}$, while the first node initialization voltage $V_{ofs}$ is supplied to the video signal line 106HS, the sampling transistor 125 is turned ON to initialize the node ND121, and in this state, the power source drive pulse DSL is set to the first electric potential $V_{cc\_H}$, thereby carrying out the threshold voltage correction. After that, the sampling transistor 125 is turned OFF, thereby applying the video signal $V_{sig}$ to the video signal line 106HS. In this state, the sampling transistor 125 is turned ON, thereby carrying out the mobility correction concurrently with writing of the signal. After the signal has been written, the emission is started at the time when the sampling transistor 125 is turned OFF. In such a manner, for the mobility correction, the threshold voltage correction, and the like, the driving operation is controlled by using a phase difference between the pulses.

Hereinafter, the operation will be described in detail by paying attention to the threshold voltage correction and the mobility correction. In the pixel circuit 10, with regard to the drive timing, firstly, the sampling transistor 125 is caused to conduct in accordance with the write drive pulse WS supplied thereto from the write scanning line 104WS, and samples the video signal $V_{sig}$ supplied thereto from the video signal line 106HS to hold the video signal $V_{sig}$ thus supplied in the hold capacitor 120. Firstly, in the following description, for the purpose of facilitating the description and understanding, unless otherwise stated, under the condition in which the write gain is assumed to be 1 (ideal value), the description is given in such a way that the information on the signal amplitude $V_{in}$ is simply described as, for example, being written, held or sampled in the hold capacitor 120. When the write gain is smaller than 1, the information on the signal amplitude $V_{in}$ itself is not held in the hold capacitor 120, but the information which is obtained through gain-fold corresponding to the magnitude of the signal amplitude $V_{in}$ is held in the hold capacitor 120.

With regard to the driving timing for the pixel circuit 10, when the information on the signal amplitude $V_{in}$ of the video signal $V_{sig}$ is written to the hold capacitor 120, from a viewpoint of the line-sequential scanning, the line-sequential driving for simultaneously transmitting the video signals for one row to the video signal lines 106HS belonging to the respective columns is carried out. In particular, in the basis way of thinking when both of the threshold voltage correction and the mobility correction are carried out at the drive timing in the pixel circuit 10 with the 2Tr/1C type drive configuration, firstly, it is supposed that the video signal $V_{sig}$ has both of the reference electric potential ($V_{ofs}$) and the signal electric potential ($V_{ofs}+V_{in}$) for 1 H period of time in the time division manner. Specifically, a period of time for which the video signal $V_{sig}$ is held at the reference electric potential ($V_{ofs}$) as an invalid period of time is set as a first-half portion of one horizontal period of time. Also, a period of time for which the video signal $V_{sig}$ is held at the signal electric potential ($V_{sig}=V_{ofs}+V_{in}$) as a valid period of time is set as a second-half portion of one horizontal period of time. When one horizontal period of time is divided into the first-half portion and the second-half portion, typically, one horizontal period of time is divided into about half period of time each. However, such a division manner is not essential to the present disclosure. That is to say, the second-half portion may be made longer than the first-half portion. Or, contrary to this, the second-half portion may be made shorter than the first-half portion.

We shall use the write drive pulse WS, used for the signal wiring, for both of the threshold voltage correction and the mobility correction as well. Thus, the write drive pulse WS is made active twice for 1 H period of time to turn ON the sampling transistor 125. Also, the threshold voltage correction is carried out at the first ON-timing, and both of the signal voltage writing and the mobility correction are simultaneously carried out at the second ON-timing. After that, the drive transistor 121 receives the supply of the current from the power source supply line 105DSL held at the first electric potential (high electric potential side), and then causes the drive current $I_{ds}$ to flow through the organic EL element 127 in accordance with the signal electric potential (the electric potential corresponding to the electric potential for the valid period of time of the video signal $V_{sig}$) held in the hold capacitor 120. It is noted that instead of making the write drive pulse WS active twice for 1 H period of time, the electric potential of the video signal line 106HS may be set to the signal electric potential ($=V_{ofs}+V_{in}$) in accordance with which the luminance in the organic EL element 127 is controlled while the sampling transistor 125 is held in the ON state.

Figure 7A:
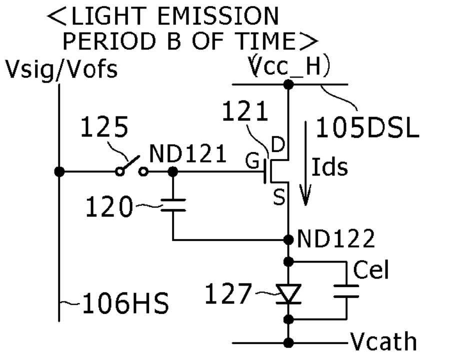
FIGS. 7A to 7G are respectively circuit diagrams explaining equivalent circuits and operation states thereof in main periods of time of the timing chart shown in FIG. 6.
Figure 7B:
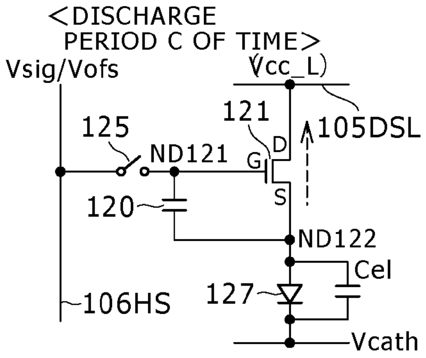
Figure 7C:
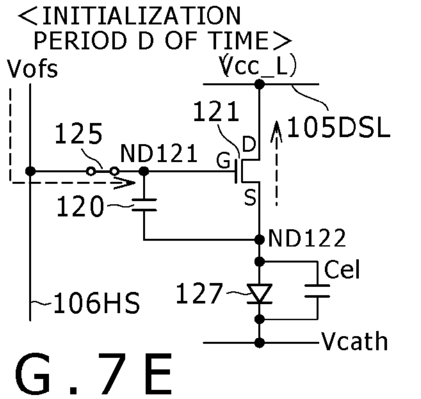

For example, in the light emission state of the organic EL element 127, the electric potential of the power source supply line 105DSL is held at the first electric potential $V_{cc\_H}$, and the sampling transistor 125 is held in the OFF state (refer to FIG. 7A). At this time, since the drive transistor 121 is designed so as to be operated in a saturated region, the drive current $I_{ds}$ caused to flow through the organic EL element 127 becomes equal to the value represented by Expression (1) determined depending on the gate-to-source voltage $V_{gs}$ of the drive transistor 121 (the voltage developed across the node ND121 and the node ND122). After that, in a time zone for which the electric potential of the power source supply line 105DSL is held at the first electric potential $V_{cc\_H}$, and the electric potential of the video signal line 106HS is held at the reference electric potential ($V_{ofs}$) of the video signal $V_{sig}$ within the invalid period of time, the vertical drive portion 103 outputs the write drive pulse WS as a control signal in accordance with which the sampling transistor 125 is caused to conduct, and holds the voltage corresponding to the threshold voltage $V_{th}$ of the drive transistor 121 in the hold capacitor 120 (refer to FIG. 7D). This operation realizes the threshold voltage correcting function. The influence of the threshold voltage $V_{th}$ of the drive transistor 121 which is dispersed every pixel circuit 10 can be canceled by the threshold voltage correcting function.

It is only necessary for the vertical driving portion 103 to repetitively carry out the threshold correcting operation for plural horizontal periods of time preceding the sampling of the signal amplitude $V_{in}$, thereby reliably holding the voltage corresponding to the threshold voltage $V_{th}$ of the drive transistor 121 in the hold capacitor 120. A sufficiently long write time is ensured by carrying out the threshold voltage correcting operation plural times. As a result, the voltage corresponding to the threshold voltage $V_{th}$ of the drive transistor 121 can be previously, reliably held in the hold capacitor 120.

The voltage corresponding to the threshold voltage $V_{th}$ held in the hold capacitor 120 is used to cancel the dispersion of the threshold voltages $V_{th}$ of the drive transistors 121. Therefore, even when the threshold voltages $V_{th}$ of the drive transistors 121 is dispersed in the respective pixel circuits 10, since the dispersion of the threshold voltages $V_{th}$ can be perfectly canceled in the pixel circuits 10, the uniformity of the image, that is, the uniformity of the emission luminance over the entire picture of the display device is enhanced. In particular, it is possible to prevent the luminance nonuniformity which is apt to appear when the signal electric potential corresponds to the low gradation.

Preferably, prior to the threshold voltage correcting operation, in a time zone for which the electric potential of the power source supply line 105DSL is held at the second electric potential $V_{cc\_L}$, and the electric potential of the video signal line 106HS is held at the reference electric potential ($V_{ofs}$) of the video signal $V_{sig}$ within the invalid period of time, the vertical drive portion 103 makes the write drive pulse WS active (the H level in this case) to cause the sampling transistor 125 to conduct. After that, the vertical drive portion 103 sets the electric potential of the power source supply line 105DSL to the first electric potential $V_{cc\_H}$ while the write drive pulse WS is held at the active H level.

As a result, after the source electric potential $V_s$ at the source terminal S of the drive transistor 121 has been set to the second electric potential $V_{cc\_L}$ sufficiently lower than the reference electric potential ($V_{ofs}$) (a discharge period C of time=a second node initialization period of time) (refer to FIG. 7B), and the gate electric potential $V_g$ at the gate terminal G of the drive transistor 121 has been set to the reference electric potential ($V_{ofs}$) (an initialization period D of time=a first node initialization period of time) (refer to FIG. 7C), the threshold voltage correcting operation is started (a threshold voltage correction period E of time). By carrying out such an operation for resetting the gate electric potential and the source electric potential (initialization operation), it is possible to reliably carry out the threshold voltage correcting operation after the initialization operation. A combination of the discharge period C of time and the initialization period D of time is referred to as "a threshold voltage correction preparation period of time as well (=a preprocessing period of time) for which both of the gate electric potential $V_g$ and source electric potential $V_s$ of the drive transistor 121 are initialized. In this connection, in the case illustrated, the initializing operation (the initialization period D of time) for the node ND121 as the first node is repetitively carried out three times. Thus, a period of time from start of the discharge period C of time to end of the final initialization period D of time becomes the threshold voltage correction preparation period of time.

For the threshold voltage correction period E of time, the electric potential of the power source supply line 105DSL transits from the second electric potential $V_{cc\_L}$ on the low electric potential side to the first electric potential $V_{cc\_H}$ on the high electric potential side, whereby the source electric potential $V_s$ of the drive transistor 121 starts to rise. That is to say, the gate electric potential $V_g$ at the gate terminal G of the drive transistor 121 is held at the reference electric potential ($V_{ofs}$) of the video signal $V_{sig}$. Thus, the drain current $I_{ds}$ is attempting to flow until the source electric potential $V_s$ at the source terminal S of the drive transistor 121 rises to cut off the drive transistor 121. When the drive transistor 121 is cut off, the source electric potential $V_s$ at the source terminals of the drive transistor 121 becomes equal to "$V_{ofs}-V_{th}$." For the threshold voltage correction period E of time, in order that the drain current $I_{ds}$ may be exclusively caused to flow through the hold capacitor 120 side (in a phase of $C_{cs} \ll C_{el}$) and may be prohibited from being caused to flow through the organic EL element 127 side, an electric potential $V_{cath}$ of a grounding wiring cath common to all of the pixels is set in such a way that the organic EL element 127 is cut off.

The equivalent circuit of the organic EL element 127 is represented as a parallel circuit of a diode and the parasitic capacitance $C_{el}$. Therefore, the drain current $I_{ds}$ of the drive transistor 121 is used to charge both of the hold capacitor 120 and the parasitic capacitance $C_{el}$ as long as an electric potential relationship of "$V_{el} \leq V_{cath}\ V_{thEL}$" holds, in a word, as long as a leakage current of the organic EL element 127 is considerably smaller than a current caused to flow through the drive transistor 121. As a result, a voltage $V_{el}$ at the anode terminal A of the organic EL element 127, in a word, an electric potential at the node ND122 rises with time. Also, at the time when an electric potential difference between the electric potential at the node ND122 (the source electric potential $V_s$) and the voltage at the node ND121 (the gate electric potential $V_g$) has been just equal to the threshold voltage $V_{th}$, the drive transistor 121 is switched from the ON state over to the OFF state, and thus the drain current $I_{ds}$ is prohibited from being caused to flow. As a result, the threshold voltage correction period E of time is ended. In a word, after a lapse of a given time, the gate-to-source voltage $V_{gs}$ of the drive transistor 121 takes a value of the threshold voltage $V_{th}$.

Here, although the threshold voltage correcting operation can also be carried out only once, this is not essential to the present disclosure. One horizontal period of time is set as a processing cycle, and the threshold voltage correcting operation may also be repetitively carried out plural times (four times in FIG. 6). For example, actually, the voltage corresponding to the threshold voltage $V_{th}$ is written to the hold capacitor 120 connected between the gate terminal G and the source terminal S of the drive transistor 121. However, the threshold voltage correction period E of time ranges from the timing at which the write drive pulse WS is set at the active H level to the timing at which the write drive pulse WS is returned back to the inactive L level. Thus, when this period of time is not sufficiently ensured, the threshold voltage correcting operation is ended in and after this period of time. For the purpose of solving this problem, it is only necessary to repetitively carry out the threshold voltage correcting operation plural times.

The reason why when the threshold voltage correcting operation is carried out plural times, one horizontal period of time becomes the processing cycle for the threshold voltage correcting operation is because the initializing operation for supplying the reference electric potential ($V_{ofs}$) through the video signal line 106HS in the first-half portion of one horizontal period of time to set the source electric potential $V_s$ to the second electric potential $V_{cc\_L}$ is carried out prior to the threshold voltage correcting operation. Necessarily, the threshold voltage correction period E of time becomes shorter than one horizontal period of time. Therefore, there may be caused the case where the accurate voltage corresponding to the threshold voltage $V_{th}$ is too large to be held in the hold capacitor 120 for the short threshold voltage correcting operation E for one time due to the magnitude relationship between the electrostatic capacitance $C_{cs}$ of the hold capacitor 120 and the second electric potential $V_{cc\_L}$ and other main cases. The reason why the threshold voltage correcting operation is preferably carried out plural times is because it is necessary to cope with this situation. That is to say, preferably, the threshold voltage correcting operation is repetitively carried out for plural horizontal period of time preceding the sampling (signal writing) of the signal amplitude $V_{in}$ to the hold capacitor 120, whereby the voltage corresponding to the threshold voltage $V_{th}$ of the drive transistor 121 is reliably held in the hold capacitor 120.

Figure 7D:
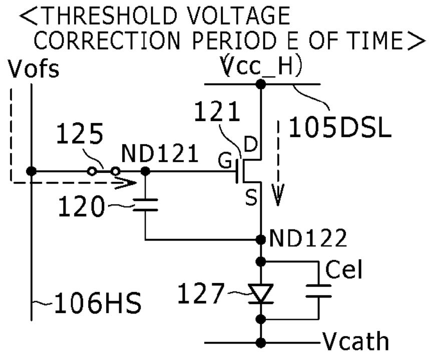
Figure 7E:
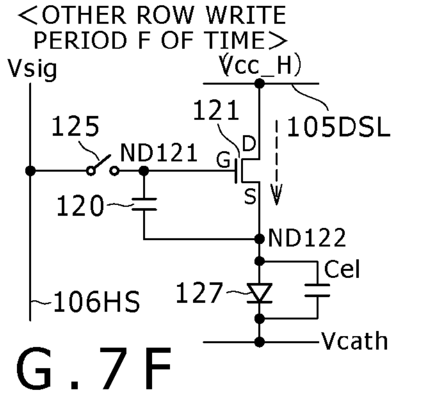
Figure 7F:
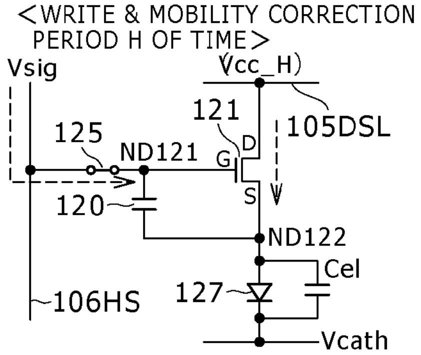
Figure 7G:
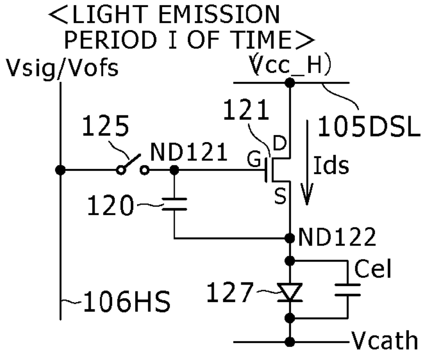

For example, when the gate-to-source voltage $V_{gs}$ becomes equal to a voltage $V_{x1}$ ($>V_{th}$), in a word, when the source electric potential $V_s$ of the drive transistor 121 is switched from the second electric potential $V_{cc\_L}$ on the low electric potential side to "$V_{ofs}-V_{x1}$," a first threshold voltage correction period E_1 of time is ended (refer to FIG. 7D). For this reason, at a time point at which the first threshold voltage correction period E_1 of time has been completed, the voltage $V_{x1}$ is written to the hold capacitor 120.

Next, the drive scanning portion 105 switches the write drive pulse WS from the active H level to the inactive L level for the second-half portion of the horizontal period of time. In addition, the horizontal driving portion 106 switches the electric potential of the video signal line 106HS from the reference electric potential ($V_{ofs}$) to the electric potential of the video signal $V_{sig}$ ($=V_{ofs}+V_{in}$) (refer to FIG. 7F). As a result, the electric potential of the video signal line HS is changed to the electric potential of the video signal $V_{sig}$, while the electric potential of (the write drive pulse WS) the write scanning line 104WS becomes the low L level.

At this time, the sampling transistor 125 is held in the non-conduction (OFF) state, and the drain current $I_{ds}$ corresponding to the voltage $V_{x1}$ held in the hold capacitor 120 in and before that non-conduction state is caused to flow through the organic EL element 127, whereby the source electrode potential $V_s$ slightly rises. When let $V_{a1}$ be the electric potential thus risen, the source electric potential $V_s$ becomes equal to "$V_{ofs}-V_{x1}+V_{a1}$." In addition, the hold capacitor 120 is connected between the gate terminal G and the source terminal S of the drive transistor 121, and the gate electric potential $V_g$ is changed in conjunction with the change in the source electric potential $V_s$ of the drive transistor 121 due to the effect by the hold capacitor 120, whereby the gate electrode potential $V_g$ becomes equal to "$V_{ofs}+V_{a1}$."

For a next second threshold voltage correction period E_2 of time, the pixel circuit 10 is operated in the same manner as that for the first threshold voltage correction period E_1 of time. Specifically, firstly, the gate electric potential $V_g$ at the gate terminal G of the drive transistor 121 is held at the reference electric potential ($V_{ofs}$) of the video signal $V_{sig}$, and the gate electric potential $V_g$ is instantaneously switched from the last "$V_g$=the reference electric potential ($V_{ofs}$)+$V_{a1}$" over to the reference electric potential ($V_{ofs}$). The hold capacitor 120 is connected between the gate terminal G and the source terminal S of the drive transistor 121, and the source electric potential $V_s$ is changed in conjunction with the change in the gate electric potential $V_g$ of the drive transistor 121 due to the effect by the hold capacitor 120, whereby the source electric potential $V_s$ is reduced from "$V_{ofs}-V_{x1}+V_{a1}$" by Val, and thus becomes equal to "$V_{ofs}-V_{x1}$." After that, the drain current $I_{ds}$ is attempting to flow until the source electric potential $V_s$ at the source terminal S of the drive transistor 121 rises to cut off the drive transistor 121. However, when the gate-to-source voltage $V_{gs}$ becomes equal to a voltage $V_{x2}$ ($>V_{th}$), in a word, when the source electric potential $V_s$ at the source terminal S of the drive transistor 121 becomes equal to "$V_{ofs}-V_{x2}$," the second threshold voltage correction period E_2 of time is ended. Thus, at a time point at which the second threshold voltage correction period E_2 of time has been completed, the voltage $V_{x2}$ is written to the hold capacitor 120. Just before a next third threshold voltage correction period E_3 of time, the drain current $I_{ds}$ corresponding to the voltage $V_{x2}$ held in the hold capacitor 120 is caused to flow through the organic EL element 127, whereby the source electric potential $V_s$ becomes equal to "$V_{ofs}-V_{x2}+V_{a2}$," and the gate electric potential $V_g$ becomes equal to "$V_{ofs}+V_{a2}$."

Likewise, when the gate-to-source voltage $V_{gs}$ becomes equal to a voltage $V_{x3}$ ($>V_{th}$), in a word, when the source electric potential $V_s$ at the source terminal S of the drive transistor 121 becomes equal to "$V_{ofs}-V_{x3}$," the third threshold voltage correction period E_3 of time is ended. Thus, at a time point at which the third threshold voltage correction period E_3 of time has been completed, the voltage $V_{x3}$ is written to the hold capacitor 120. Just before a next fourth threshold voltage correction period E_4 of time, the drain current $I_{ds}$ corresponding to the voltage $V_{x3}$ held in the hold capacitor 120 is caused to flow through the organic EL element 127, whereby the source electric potential $V_s$ becomes equal to "$V_{ofs}-V_{x3}+V_{a3}$," and the gate electric potential $V_g$ becomes equal to "$V_{ofs}+V_{a3}$."

Also, for a next fourth threshold voltage correction period E_4 of time, the drain current $I_{ds}$ is caused to flow until the electric potential $V_s$ at the source terminal S of the drive transistor 121 rises to cut off the drive transistor 121. When the drive transistor 121 is cut off, the source electric potential $V_s$ at the source terminal S of the drive transistor 121 becomes equal to "$V_{ofs}-V_{th}$," and the gate-to-source voltage $V_{gs}$ becomes the same state as that of the threshold voltage $V_{th}$. At a time point at which the fourth threshold voltage correction period E_4 of time has been completed, the threshold voltage $V_{th}$ of the drive transistor 121 is held in the hold capacitor 120.

The pixel circuit 10 includes the mobility correcting function in addition to the threshold voltage correcting function. That is to say, in order that the sampling transistor 125 may be made the conduction state in a time zone for which the electric potential of the video signal line 106HS is held at the signal electric potential "$V_{ofs}+V_{in}$" of the video signal $V_{sig}$ in the valid period of time, the vertical driving portion 103 makes the write drive pulse WS, which is supplied to the write scanning line 104WS, at the active H level only for a period of time shorter than that period of time described above. For this period of time, in a state in which the signal electric potential ($V_{ofs}+V_{in}$) is supplied to the control input terminal of the drive transistor 121, both of the parasitic capacitance $C_{el}$ of the organic EL element 127 and the hold capacitor 120 are charged with the electricity through the drive transistor 121 (refer to FIG. 7E). An active period of time (corresponding not only to a sampling period of time, but to a mobility correction period of time) of the write drive pulse WS is suitably set, whereby when the information on the signal amplitude $V_{in}$ is held in the hold capacitor 120, at the same time, it is possible to correct the mobility μ of the drive transistor 121. The signal electric potential ($V_{ofs}+V_{in}$) is actually supplied to the video signal line 106HS by the horizontal driving portion 106, whereby a period of time for which the write drive pulse WS is made at the active H level is set as a period of time for which the information on the signal amplitude $V_{in}$ is written to the hold capacitor 120 (referred to as "the sampling period of time" as well).

In particular, at the drive timing in the pixel circuit 10, in a time zone for which the electric potential of the power source supply line 105DSL is held at the first electric potential $V_{cc\_H}$ as the high electric potential side, and the video signal $V_{sig}$ is held in the valid period of time (a period of time of the signal amplitude $V_{in}$), the write drive pulse WS is made at the active H level. In a word, as a result, the mobility correction time (and the sampling period of time as well) is determined depending on a region in which a time width for which both of the electric potential of the video signal line 106HS is held at the signal electric potential ($V_{ofs}+V_{in}$) of the video signal $V_{sig}$ in the valid period of time, and the active period of time of the write drive pulse WS overlap each other. In particular, a width of the active period of time of the write drive pulse WS is narrowly determined so as to fall in a time width in which the electric potential of the video signal line 106HS is held at the signal electric potential, which results in that the mobility correction time is determined depending on the write drive pulse WS. Exactly, the mobility correction time (and the sampling period of time as well) becomes a time ranging from a time point at which the write drive pulse WS rises to turn ON the sampling transistor 125 to a time point at which the write drive pulse WS falls to turn OFF the sampling transistor 125. By the way, although in FIG. 6, after completion of the fourth threshold voltage correction period E_4 of time, the electric potential of the write drive pulses WS is temporarily made at the inactive L level, this is not essential to the present disclosure. For example, the electric potential of the video signal $V_{sig}$ may also be switched from the reference electric potential ($V_{ofs}$) over to the signal electric potential ($V_{ofs}+V_{in}$) in the valid period of time with the electric potential of the write drive pulses WS being held at the active H level.

Specifically, for the sampling period of time, in a state in which the gate electric potential $V_g$ at the gate terminal G of the drive transistor 121 is held at the signal electric potential ($V_{ofs}+V_{in}$), the sampling transistor 125 becomes the conduction (ON) state. Therefore, for the write & mobility correction period H of time, in a state in which the gate electric potential $V_g$ at the gate terminal G of the drive transistor 121 is fixed to the signal electric potential ($V_{ofs}+V_{in}$), the drive current $I_{ds}$ is caused to flow through the drive transistor 121. The information on the signal amplitude $V_{in}$ is held in the form of being added to the threshold voltage $V_{th}$ of the drive transistor 121. As a result, since the change in the threshold voltage $V_{in}$ of the drive transistor 121 is usually canceled, the threshold voltage correction is carried out. By carrying out the threshold voltage correction, the gate-to-source voltage $V_{gs}$ held in the hold capacitor 120 becomes equal to "$V_{sig}+V_{th}$"="$V_{in}+V_{th}$." In addition, at the same time, since the mobility correction is carried out for the sampling period of time, the sampling period of time serves as the mobility correction period of time as well (the write & mobility correction period H of time).

Here, when let $V_{thEL}$ be a threshold voltage of the organic EL element 127, the threshold voltage $V_{thEL}$ is set so as to fulfill an electric potential relationship of "$V_{ofs}-V_{th}<V_{thEL}$." As a result, since the organic EL element 127 is held in a reverse state and thus held in a cut-off state (high impedance state), the organic EL element 127 is prevented from emitting a light, and thus does not offer diode characteristics, but offers simple capacitance characteristics. Therefore, the drain current (the drive current $I_{ds}$) caused to flow through the drive transistor 121 is written to a capacitance "$C=C_{cs}+C_{el}$" which is obtained by adding the electrostatic capacitance $C_{cs}$ of the hold capacitor 120 to the parasitic capacitance (equivalent capacitance) $C_{el}$ of the organic EL element 127. As a result, the drain current of the drive transistor 121 is caused to flow into the parasitic capacitance $C_{el}$ of the organic EL element 127 to start the changing operation. As a result, the source electric potential $V_s$ of the drive transistor 121 rises.

In the timing chart shown in FIG. 6, a rise amount of the source electric potential $V_s$ is represented by ΔV. The rise amount of the source electric potential $V_s$, that is, an electric potential correction value ΔV as a mobility correction parameter is subtracted from the gate-to-source voltage "$V_{gs}=V_{in}+V_{th}$" held in the hold capacitor 120 through the threshold voltage correction to become "$V_{gs}=V_{in}+V_{th}-\Delta V$," which results in that the negative feedback is carried out. At this time, the source electric potential $V_s$ at the source terminal S of the drive transistor 121 becomes equal to "$-V_{th}+\Delta V$" which is obtained by subtracting the voltage "$V_{gs}=V_{in}+V_{th}-\Delta V$" held in the hold capacitor 120 from the gate electric potential $V_g$ ($=V_{in}$).

In such a manner, at the driving timing in the pixel circuit 10, for the write & mobility correction period H of time, both of the sampling of the signal amplitude $V_{in}$, and the rise amount $\Delta V$ of source electric potential $V_s$ (the amount of negative feedback or the mobility correction parameter) with which the mobility μ is corrected are adjusted. The write scanning portion 104 can adjust a time width of the write & mobility correction period H of time. As a result, it is possible to optimize the amount of negative feedback of the drive current $I_{ds}$ for the hold capacitor 120.

The voltage correction value $\Delta V$ is expressed by Expression (7):

$$\Delta V \approx I_{ds} \times t / C_{el} \quad (7)$$

As apparent from Expression (7), the voltage correction value $\Delta V$ becomes large as the drive current $I_{ds}$ as the drain-to-source current of the drive transistor 121 is larger. Contrary to this, when the drive current $I_{ds}$ of the drive transistor 121 is small, the voltage correction value $\Delta V$ becomes small. In such a manner, the voltage correction value $\Delta V$ is determined depending on the drive current $I_{ds}$. As the signal amplitude $V_{in}$ is larger, the drive current $I_{ds}$ becomes large and an absolute value of the voltage correction value $\Delta V$ also becomes large. Therefore, it is possible to realize the mobility correction corresponding to the emission luminance level. In this case, the write & mobility correction period H of time is not necessarily constant, but contrary is preferably adjusted in accordance with the drive current $I_{ds}$ in some cases. For example, it is only necessary that when the drive current $I_{ds}$ is large, a mobility correction period, t, of time is set short. Contrary to this, it is only necessary that when the drive current $I_{ds}$ becomes small, the write & mobility correction period H of time is set long.

In addition, the electric potential correction value $\Delta V$ is expressed by $I_{ds} \times t/C_{el}$. Thus, even when the drive current $I_{ds}$ is dispersed due to the dispersion of the mobilities μ in the pixel circuits 10, the electric potential correction values $\Delta V$ are obtained so as to correspond to the respective cases. Therefore, it is possible to correct the dispersion of the mobilities μ in the pixel circuits 10. In a word, when the signal amplitude $V_{in}$ is made constant, the absolute value of the electric potential correction value $\Delta V$ becomes large as the mobility μ of the drive transistor 121 is larger. In other words, since the electric potential correction value $\Delta V$ becomes large as the mobility μ is larger, it is possible to remove the dispersion of the mobilities μ in the pixel circuits 10.

The pixel circuit 10 includes the bootstrap function as well. That is to say, in a stage in which the information on the signal amplitude $V_{in}$ is held in the hold capacitor 120, the write scanning portion 104 releases the application of the write drive pulse WS to the write scanning line 104WS (that is, sets the electric potential of the write drive pulse WS to the inactive L level) to set the sampling transistor 125 in the non-conduction state, thereby electrically separating the gate terminal G of the drive transistor 121 from the video signal line 106HS (a light emission period I of time: refer to FIG. 7G). When the operation proceeds to the light emission period I of time, the horizontal driving portion 106 returns the electric potential of the video signal line 106HS back to the reference electric potential ($V_{ofs}$) at the following suitable time point.

The light emission state of the organic EL element 127 continues up to an (m+m'−1)-th horizontal scanning period of time. With that, the operation of the light emission of the organic EL element 127 composing the (n, m)-th sub-pixel is completed. After that, the operation is moved to a next frame (or a next field), and the threshold voltage correction preparing operation, the threshold voltage correcting operation, the mobility correcting operation, and the light emitting operation are repetitively carried out again.

For the light emission period I of time, the gate terminal G of the drive transistor 121 is separated from the video signal line 106HS. Since the application of the signal electric potential ($V_{ofs}+V_{in}$) to the gate terminal G of the drive transistor 121 is released, the gate electric potential $V_g$ of the drive transistor 121 can rise. The hold capacitor 120 is connected between the gate terminal G and the source terminal S of the drive transistor 121, and the bootstrap operation is carried out based on the effect by the hold capacitor 120. When the bootstrap gain is assumed to be 1 (ideal value), the gate electric potential $V_g$ is changed in conjunction with the change in the source electric potential $V_s$ of the drive transistor 121, and thus the gate-to-source voltage $V_{gs}$ can be maintained constant. At this time, the drive current $I_{ds}$ caused to flow through the drive transistor 121 is also caused to flow through the organic EL element 127, and thus the anode electric potential of the organic EL element 127 rises in accordance with the drive current $I_{ds}$. Let $V_{el}$ be an amount of anode electric potential thus risen. In a short time, since the reverse bias state of the organic EL element 127 is canceled along with the rise of the source electric potential $V_s$, the organic EL element 127 actually starts to emit the light by the inflow of the drive current $I_{ds}$.

Here, a relationship of the drive current $I_{ds}$ vs. the gate voltage $V_{gs}$ can be expressed in the form of either Expression (8) or (9) by subtracting either "$V_{sig}+V_{th}-\Delta V$" or "$V_{in}+V_{th}-\Delta V$" into Expression (1) expressing the former transistor characteristics:

$$I_{ds}=k \times \mu \times (V_{sig}-V_{ofs}-\Delta V)^2 \quad (8)$$

$$I_{ds}=k \times \mu \times (V_{in}-V_{ofs}-\Delta V)^2 \quad (9)$$

It is understood from both of Expressions (8) and (9) that the term of the threshold voltage $V_{th}$ is canceled, and thus the drive current $I_{ds}$ supplied to the organic EL element 127 is independent of the threshold voltage $V_{th}$ of the drive transistor 121. That is to say, when the reference electric potential $V_{ofs}$, for example, is set to 0 V, the drive current $I_{ds}$ caused to flow through the organic EL element 127 is proportional to a square of a value which is obtained by subtracting the value of the electric potential correction value $\Delta V$ in the second node $ND_2$ (the source terminal of the drive transistor 121) due to the mobility μ of the drive transistor 121 from the value of the video signal $V_{sig}$ in accordance with which the luminance in the organic EL element 127 is controlled. In other words, the current $I_{ds}$ caused to flow through the organic EL element 127 is independent of both of the threshold voltage $V_{thEL}$ of the organic EL element 127, and the threshold voltage $V_{th}$ of the drive transistor 121. That is to say, an amount of light emission (luminance) of the organic EL element 127 does not suffer both of an influence of the threshold voltage $V_{thEL}$ of the organic EL element 127, and an influence of threshold voltage $V_{th}$ of the drive transistor 121. Also, the luminance of the (n, m)-th organic EL element 127 has a value corresponding to the current $I_{ds}$.

In addition thereto, since the electric potential correction value $\Delta V$ becomes large in the drive transistor 121 having the larger mobility p, the value of the gate-to-source voltage $V_{gs}$ becomes small. Therefore, even when the value of the mobility μ is large in both of Expressions (8) and (9), a value of $(V_{sig}-V_{ofs}-\Delta V)^2$ becomes small. As a result, it is possible to correct the drain current $I_{ds}$. That is to say, if the values of the video signals $V_{sig}$ are identical to one another even in transistors 121 different in mobility μ from one another, the values of the drain currents $I_{ds}$ become approximately equal to one another. As a result, the currents $I_{ds}$ which are caused to flow through the respective organic EL elements 127, and in accordance with which the luminances of the organic EL elements 127 are controlled are uniformized. That is to say, it is possible to correct the dispersion of the luminances in the organic EL elements 127 due to the dispersion of the mobilities a (and the dispersion of k).

In addition, the hold capacitor 120 is connected between the gate terminal G and the source terminal S of the drive transistor 121. Thus, the bootstrap operation is carried out in the first part of the light-emission period of time based on the effect by the hold capacitor 120, and both of the gate electric potential $V_g$ and the source electric potential $V_s$ rise while the gate-to-source voltage "$V_{gs}$=$V_{in}$ $V_{th}$−ΔV" of the drive transistor 121 is maintained constant. The source electric potential $V_s$ of the drive transistor 121 becomes equal to "−$V_{th}$ ΔV+$V_{el}$," whereby the gate electric potential $V_g$ becomes equal to "$V_{in}$+$V_{el}$." At this time, since gate-to-source voltage $V_{gs}$ of the drive transistor 121 is held constant, the drive transistor 121 causes the constant current (the drive current $I_{ds}$) to flow through the organic EL element 127. As a result, the electric potential (=the electric potential at the node ND122) at the anode terminal A of the organic EL element 127 continuously rises until a voltage with which a current as the drive current $I_{ds}$ in the saturated state is caused to flow through the organic EL element 127.

Here, when the light emission period of time becomes long, the I-V characteristics of the organic EL element 127 are changed accordingly. For this reason, the electric potential at the node ND122 is also changed with a lapse of time. However, even when the anode electric potential of the organic EL element 127 is changed due to such temporal deterioration of the organic EL element 127, the gate-to-source voltage $V_{gs}$ held in the hold capacitor 120 is usually maintained at a constant voltage of "$V_{in}$+$V_{th}$−ΔV." Since the drive transistor 121 is operated as the constant current source, even when the I-V characteristics of the organic EL element 127 suffer the temporal change and the source electric potential $V_s$ at the source terminal S of the drive transistor 121 is changed so as to follow that temporal change, the gate-to-source voltage $V_{gs}$ of the drive transistor 121 is held at the constant voltage (≈$V_{in}$+$V_{th}$−ΔV) by the hold capacitor 120. Therefore, the current caused to flow through the organic EL element 127 is not changed, and thus the emission luminance of the organic EL element 127 is also held constant. Although since actually, the bootstrap gain is smaller than "1," the gate-to-source voltage $V_{gs}$ becomes smaller than "$V_{in}$+$V_{th}$−ΔV," it is remained that the gate-to-source voltage $V_{gs}$ is held at the gate-to-source voltage $V_{gs}$ corresponding to the bootstrap gain.

As described above, in the pixel circuit 10 in the display device 1 of Example 1, the threshold voltage correcting circuit and the mobility correcting circuit are automatically configured by devising the drive timings. Also, the pixel circuit 10 functions as the drive signal fixing circuit for maintaining the drive current constant by correcting the influences by the threshold voltage $V_{th}$ and the mobility μ in order to prevent the influence exerted on the drive current $I_{ds}$ due to the disposition of the characteristics of the drive transistors 121 (the dispersion of the threshold voltages $V_{th}$ and the mobilities μ in the drive transistors 121 in this case). Since not only the bootstrap operation, but also the threshold voltage correcting operation and the mobility correcting operation are carried out, the gate-to-source voltage $V_{gs}$ maintained by the bootstrap operation is adjusted by both of the voltage corresponding to the threshold voltage $V_{th}$, and the electric potential correction value ΔV for the mobility correction. Therefore, the emission luminance of the organic EL element 127 does not suffer the influence of the dispersions of the threshold voltages $V_{th}$ and the mobilities μ in the drive transistors 121, but also does not suffer the influence of the temporal deterioration of the organic EL element 127. Thus, the image can be displayed with the stable gradation(s) corresponding to the video signal $V_{sig}$ (the signal amplitude $V_{in}$) inputted and thus it is possible to obtain the image having the high image quality.

In addition, since the pixel circuit 10 can be composed of the source follower circuit using the re-channel drive transistor 121, even when the existing organic EL element having the anode and cathode electrodes is used as it is, the driving for the organic EL element 127 becomes possible. In addition, the pixel circuit 10 can be composed by using the transistors each of which is only of the n-channel type, including the drive transistor, and the sampling transistor and the like of the peripheral portion, and thus the cost saving is realized even in the manufacture of the transistors.

[Relationship of Environmental Dependency of Element Characteristics, and Correcting Processing]

As described above, at the driving timings shown in FIG. 6, for the purpose of improving the display nonuniformity due to the nonuniformity of the characteristics of the elements (the dispersion and temporal change in the threshold voltage $V_{th}$ and the mobility μ of the drive transistor 121 in the above case), the display luminance is controlled by controlling the transistors at the timings of the write drive pulse WS and the power source drive pulse DSL.

Here, the characteristics (the threshold voltage $V_{th}$ and the mobility μ) of the drive transistor 121 composing the pixel circuit 10 suffer the influence of the environmental characteristics and thus the threshold voltage $V_{th}$ and the mobility μ of the drive transistor 121, for example, are changed so as to correspond to the temperature change. For this reason, it was found out that when both of the threshold voltage correction and the mobility correction were carried out by using the given write drive pulse WS and the power source drive pulse DSL in spite of the change in the environmental characteristics, it might not be necessarily possible to realize the proper correction. Even when it is possible to suppress the display nonuniformity due to the dispersion of the element characteristics under a certain environmental condition, the environmental condition is changed, which results in that it may be impossible to carry out the proper correction control, and thus there is caused the display nonuniformity phenomenon due to the dispersion of the characteristics of the elements composing the pixel circuit. Hereinafter, this point will be described.

Figure 8A:
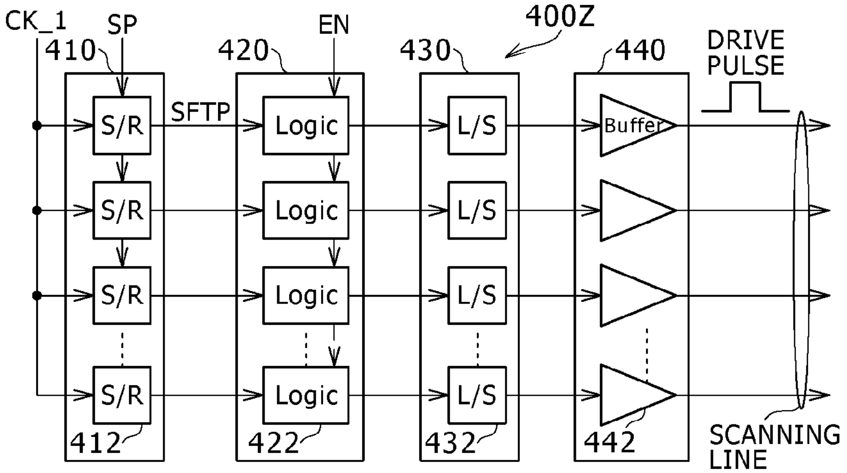
FIGS. 8A, 8B, and 8C are respectively a circuit diagram, a timing chart, and a circuit diagram explaining Comparative Example of a peripheral circuit provided in the periphery of the pixel circuit.
Figure 8B:
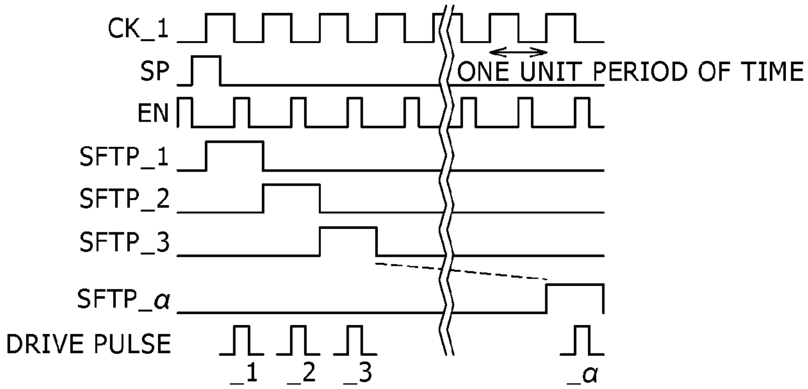
Figure 8C:
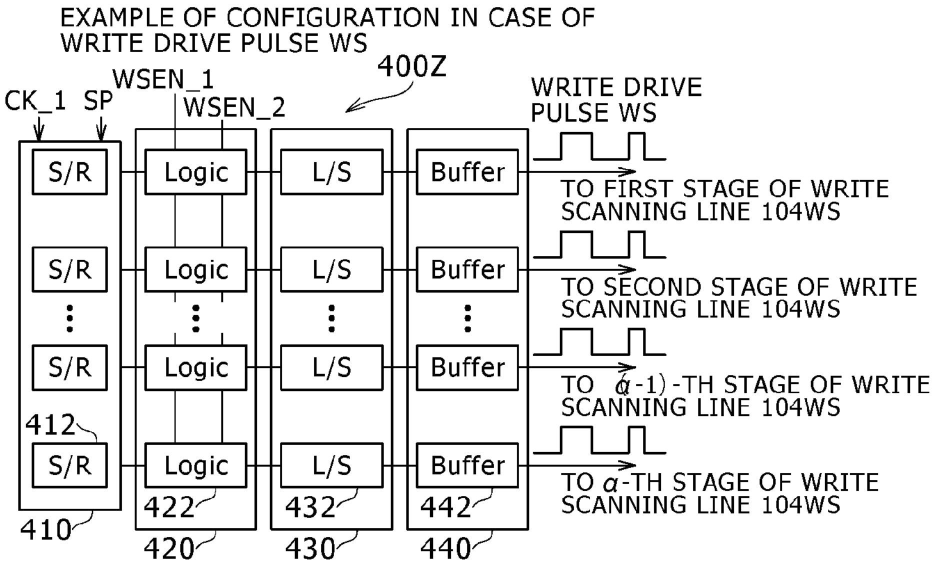

FIGS. 8A, 8B, and 8C are respectively a block diagram, a timing chart, and a block diagram explaining Comparative Example of a circuit (peripheral circuit) provided in the periphery of the pixel circuit 10. Specifically, FIG. 8A is a block diagram showing a general-purpose configuration of a peripheral circuit 400Z of Comparative Example, and FIG. 8B is a timing chart explaining an operation of the peripheral circuit 400Z of Comparative Example. Also, FIG. 8C is a block diagram especially showing a configuration of the peripheral circuit 400Z of Comparative Example in relation to a write drive pulse WS. The peripheral circuit 400Z is a collective form of the circuits for generating the drive signals in accordance with which the various kinds of transistors within the pixel circuit 10 are driven, respectively, and corresponds to the control portion 109 and the interface portions (the vertical IF portion 133 and the horizontal IF portion 136) in terms of correspondence to FIG. 1. In the peripheral circuit 400Z, in outputting the signals, for example, with regard to the signal system, not only the output timings, but also the signal levels thereat are managed, whereas with regard to the signals which may be used to control ON/OFF of the transistors, the output waveforms (of the output timings, the characteristics of transition of the rise or fall, and the like) are managed. As an example, FIGS. 8A, 8B, and 8C respectively show the block diagram, the timing chart, and the block diagram by paying attention to the generation of the drive pulse in accordance with which the transistors are controlled so as to be tuned ON or OFF.

As shown in FIG. 8A, the peripheral circuit 400Z includes a scanning portion having a shift register portion 410, a logic circuit portion 420, a level shift circuit 430, and an output buffer portion 440. Although an illustration is omitted here, an interface portion is provided in a preceding stage of the shift register portion 410. This configuration can also be applied to each of the drive pulses in the vertical scanning system and the horizontal scanning system.

The shift register portion 410 is provided in such a way that plural stages of registers 412 (S/R) (for at least the number of rows or the number of columns) are connected in a cascade manner. Thus, the shift register portion 410 successively selects the pixel circuits 10 of the pixel array portion 102 either in rows or in columns. For example, as shown in FIG. 8B, when a start pulse SP is supplied from an interface portion (not shown) to the first stage of register 412, the start pulse SP is successively shifted in the registers 412 synchronously with a shift clock CK_1 (scanning clock) sent from the interface portion (not shown), and is outputted as shift pulses SFTP each set at the active H level, having one unit time period width, from the respective stages (reference symbol "_n" in FIG. 8B represents the number of stage). One cycle of the shift clock CK_1 inputted to the register 412 is identical to one cycle of the drive pulse. For example, one cycle of the write drive pulse WS is identical to one horizontal cycle.

The logic circuit portion 420 has a logic circuit 422 (Logic) every stage. Thus, the shift pulses SFTP from the respective stages of registers 412 are supplied to the corresponding stages of logic circuits 422, and an enable pulse EN is supplied from the interface portion (not shown) to each of the logic circuits 422. The logic circuit 422 generates a pulse signal causing the drive pulse supplied to the scanning line of the pixel array portion 102 based on both of the shift pulse SFTP and the enable pulse EN in accordance with a regulated logic. As the case may be, the logic circuit 422 generates a window pulse over plural shift clocks CK_1 based on the shift pulse SFTP, and generates a pulse signal causing the drive pulse supplied to the scanning line of the pixel array portion 102 based on both of the window pulse and the enable pulse EN in accordance with a regulated logic in some cases. For example, as shown in FIG. 8B, a logic AND of the shift pulse SFTP and the enable pulse EN is obtained, whereby the pulse signal causing the drive pulse is substantially, successively shifted to be outputted.

The level shift portion 430 has a level converting portion 432 (L/S) every stage. Thus, the level converting portion 432 amplifies an output pulse, having a relatively narrow amplitude (also having a low voltage level as a whole), from the corresponding stage of the logic circuit 422 into an output pulse having a relatively wide amplitude (also having a high voltage level as a whole).

The output buffer portion 440 has a buffer 442 (Buffer) every stage. Thus, the buffer 442 outputs an output pulse, having a relatively wide amplitude (also having a high voltage level as a whole), from the corresponding stage of the level converting portion 432 to the wiring (scanning line) in corresponding column or row.

For example, with regard to the write drive pulse WS, as shown in FIG. 8C, a shift clock CK_1 whose cycle is one horizontal scanning period of time (1 H) is supplied to the shift register portion 410. Also, both of an enable pulse WSEN_1 for threshold voltage correction and an enable pulse WSEN_2 for mobility correction are commonly supplied to the logic circuits 422 of the logic circuit portion 420. The enable pulse WSEN_1 for the threshold voltage correction regulates both of the initialization period D of time, and the threshold voltage correction period E of time, and the enable pulse WSEN_2 for the mobility correction regulates the write & mobility correction period H of time.

Figure 9A:
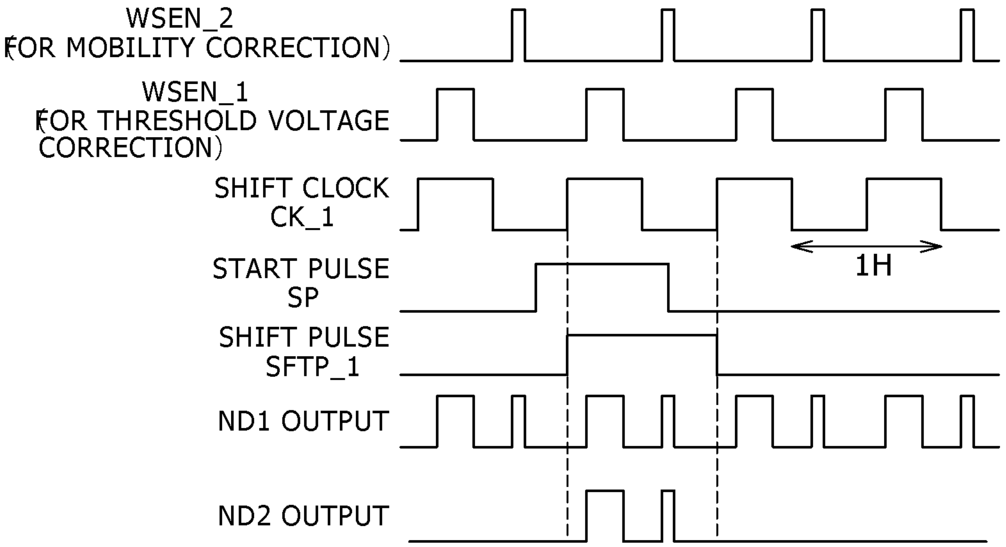
FIGS. 9A and 9B are respectively a timing chart explaining timings in a logic circuit shown in FIG. 8C, and a circuit diagram showing a concrete configuration realizing the timings shown in FIG. 9A.
Figure 9B:
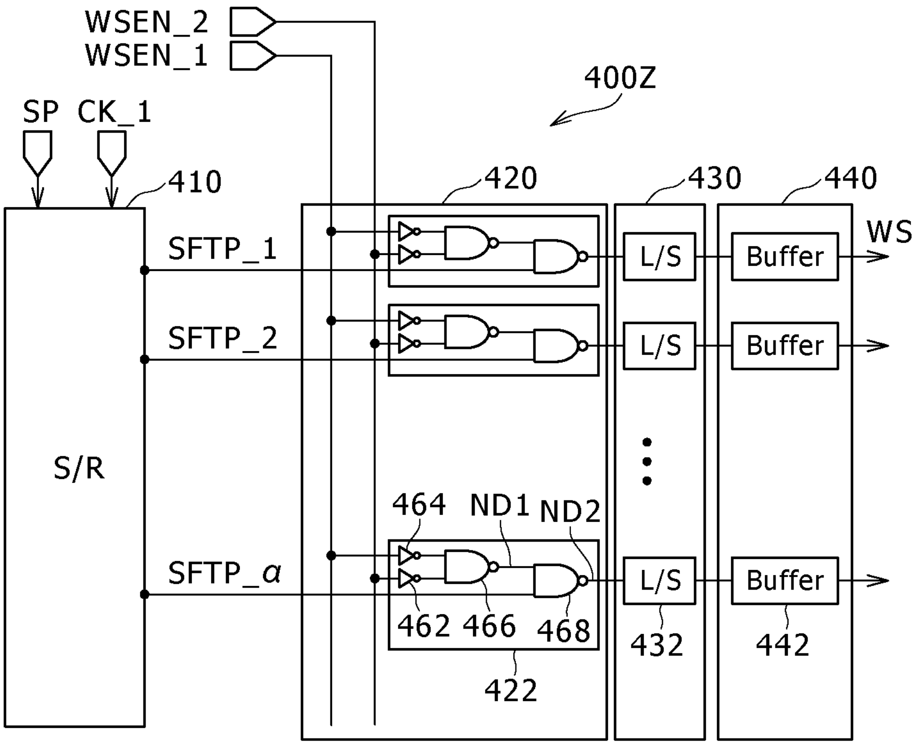

FIGS. 9A and 9B respectively show timings in the logic circuit 422 shown in FIG. 8C, and a detailed configuration realizing the timings shown in FIG. 9A. In the logic circuit portion 420, as shown in FIG. 9A, the logic circuit 422 obtains a logic OR of the enable pulse WSEN_1 and the enable pulse WSEN_2, and also obtains a logic AND of this logic OR and a shift pulse SFTP from the register 412 in corresponding stage, thereby generating a pulse signal causing the write drive pulse WS which is supplied to the write scanning line 104WS. For the purpose of realizing the function concerned, for example, as shown in FIG. 9B, the logic circuit 422 includes an inverter 462 and an inverter 464, and a NAND gate 466 and a NAND gate 468. An OR gate is composed of the inverter 462 and the inverter 464, and the NAND gate 466.

Although FIG. 8C, and FIGS. 9A and 9B show the block diagram, and the timing chart, and the circuit diagram in relation to the write drive pulse WS, with regard to the power source drive pulse DSL, it is only necessary to change both of the enable pulse WSEN_1 for the threshold voltage correction and the enable pulse WSEN_2 for the mobility correction to the enable pulse DSEN for power source supply. In addition, it is only necessary that for example, the level shift portion 430 and the output buffer portion 440 are changed into a power source circuit in such a way that when the enable pulse DSEN is held at the active H level, the first electric potential $V_{cc\_H}$ is outputted, and when the enable pulse DSEN is held at the inactive L level, the second electric potential $V_{cc\_L}$ is outputted.

In the case of the configuration of the peripheral circuit 400Z as shown in FIG. 9B, the logic circuit portion 420 (the logic circuit 422) for generating the pulse signal causing the drive pulse has not such a configuration as to be capable of changing both of the threshold voltage correction period of time and the mobility correction period of time so as to correspond to the environmental change. On the other hand, as shown in the timing chart of FIG. 6, for example, for the mobility correction period of time, the driving is carried out in such a way that the mobility correction is carried out while the signal writing is carried out. Thus, in the mobility correcting operation itself, the pulse width for correction sensitively suffer the influence. For example, when the characteristics of the drive transistor 121 composing the pixel circuit 10 are changed due to the change in the panel environmental temperature, and the like, and thus the optimal mobility correction time is changed, in the logic circuit 422 shown in FIG. 9B, the pulse width of the write device pulse WS regulating the mobility correction period of time is constant independently of the environmental temperature. Therefore, the normal mobility correcting operation is not carried out, which comes to cause the deterioration in the uniformity.

[Technique for Adjustment for Correction Period of Time Corresponding to Environmental Dependency of Element Characteristics]

Since the element characteristics have the environment dependency, when the correction period of time is set constant independently of the environment, it is possible that the proper correcting operation is not provided, which comes to cause the display nonuniformity. For this reason, it is requested to develop the configuration with which the correction period of time can be adjusted so as to correspond to the environment dependency of the element characteristics.

Example 1 provides a configuration with which the correction period of time can be properly adjusted so as to correspond to the environment dependency of the characteristics of an element composing the pixel circuit 10, making use of the environment dependency of the transistor, thereby improving the phenomenon in which the environmental change causes the display nonuniformity.

[Basis of Countermeasure Technique]

Figure 10A:
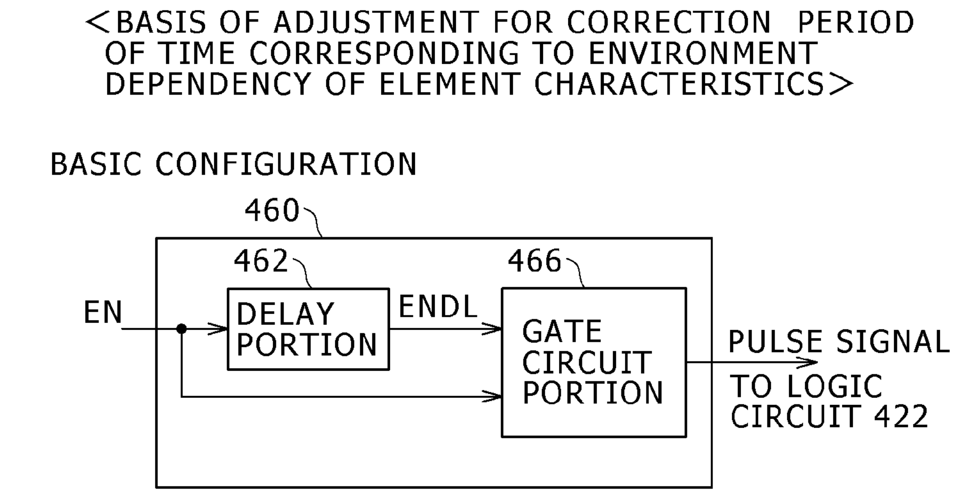
FIGS. 10A, 10B, and 10C are respectively a circuit diagram, and timing charts explaining a basic concept of a technique for automatically adjusting a correction period of time so as to correspond to environment dependency of element characteristics.
Figure 10B:
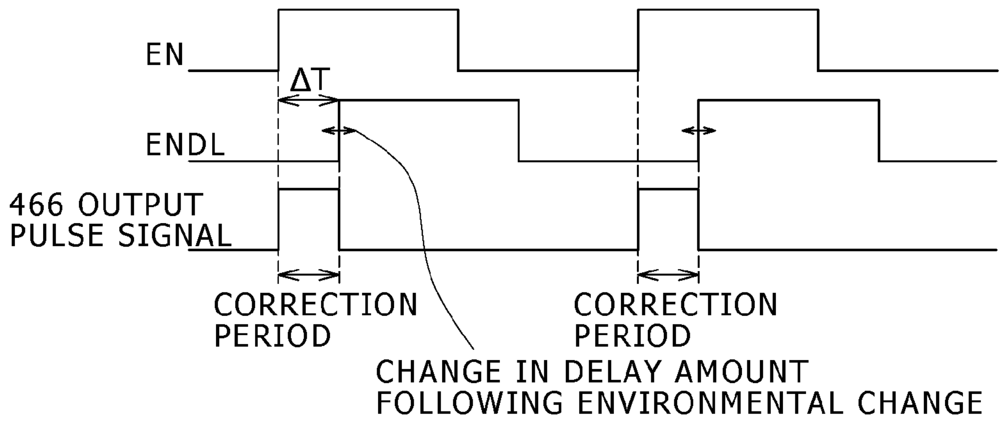
Figure 10C:
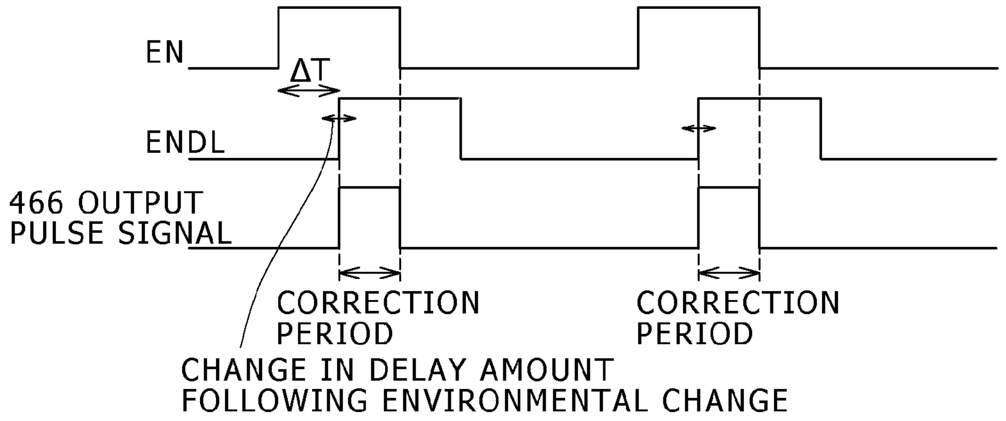

FIGS. 10A, 10B, and 10C are respectively a block diagram, and timing charts explaining a basic concept for automatically adjusting the correction period of time so as to correspond to the environment dependency of the element characteristics. Specifically, FIG. 10A is a circuit diagram showing a basic configuration, and FIGS. 10B and 10C are respectively timing charts explaining an operation.

The technique for automatically adjusting the correction period of time so as to correspond to the environment dependency of the element characteristics, as shown in FIG. 10A, is realized by providing a correction time period adjusting portion 460 on a path of an enable pulse EN which is inputted to the logic circuit portion 420 (the logic circuit 422). The correction time period adjusting portion 460 is an example of a pulse width adjusting portion for adjusting a width of the pulse signal causing the drive pulse used in at least one of the drive transistor 121 and the sampling transistor 125 so as to correspond to the environmental change. By the way, in order that the correction period of time may be properly adjusted so as to correspond to the environment dependency, of the characteristics of the element composing the pixel circuit 10, on the temperature, the humidity, and the like, it is only necessary to dispose the correction time period adjusting portion 460 in a place in as close contact as possible with the element (such as the drive transistor 121 or the sampling transistor 125) composing the pixel circuit 10. For example, even when the correction time period adjusting portion 460 is disposed outside the pixel array portion 102, it is only necessary to dispose the correction time period adjusting portion 460 close to the pixel array portion 102. Or, the correction time period adjusting portion 460 may also be disposed inside the pixel array portion 102.

The correction time period adjusting portion 460 includes a delay portion 462 and a gate circuit portion 466, and adjusts the pulse width by utilizing the environment dependency of the pulse delay in the delay portion 462 on the temperature, the humidity, and the like. As a result, the drive pulse can be generated in accordance with a pulse signal whose pulse width is automatically adjusted by the delay portion 462 in accordance with the environmental change so as to cancel the environment dependency, of the characteristics of the element composing the pixel circuit 10, on the temperature, the humidity, and the like.

For example, it is only necessary for the delay portion 462 to configure so as to include one stage or plural stages of buffers or inverters in order to delay the enable pulse EN. Here, it is supposed that with the buffer or inverter composing the delay portion 462, an amount of delay becomes small when an environment parameter such as the temperature or the humidity is increased. If an amount of delay in the buffer or inverter composing the delay portion 462 becomes large when the environment parameter such as the temperature or the humidity is increased, it is only necessary to reversely grasp a change direction in a description which will be given later. The gate circuit portion 466 generates a pulse signal in accordance with both of the enable pulse EN not delayed, and an enable pulse delayed by the delay portion 462 (a delayed enable pulse ENDL). Thus, it is only necessary for the gate circuit portion 466 to adopt either a configuration using either a NAND gate (or an AND gate) or a NOR gate (or an OR gate), or a configuration using an inverter when logic reversal is required.

Instead of supplying the enable pulse EN, the pulse signal generated in the gate circuit portion 466 is supplied to the logic circuit 422. The enable pulse EN used to regulate the correction period of time is shaped and supplied to the logic circuit 422 through both of the delay portion 462 and the gate circuit portion 466, whereby the pulse width can be automatically adjusted every panel environment temperature.

FIG. 10B shows the timing chart explaining an operation example 1 when a direction of a change in the environment (such as the temperature and the humidity), and a direction of adjustment for the correction period of time are reverse to each other. The wording “the case where directions are reverse to each other” means the case where, for example, when the temperature or the humidity is increased, the optimal correction period of time becomes short in correspondence to the increase, and contrary, when the temperature or the humidity is decreased, the optimal correction period of time becomes long in correspondence to the decrease. As shown in FIG. 10B, the enable pulse EN is delayed in the delay portion 462 by ΔT. Here, as previously stated, it is assumed that for either the buffer or the inverter composing the delay portion 462, the amount of delay is reduced when the environment parameter such as the temperature or the humidity is increased.

Both of the enable pulse EN and the delayed enable pulse ENDL are inputted to the gate circuit portion 466. The gate circuit portion 466 generates a pulse signal with which the direction of the change in the environment (such as the temperature or the humidity), and the direction of the adjustment for the correction period of time are reverse to each other based on the enable pulse EN and the delayed enable pulse ENDL. In the case shown in FIG. 10B, the gate circuit portion 466 generates the pulse signal based on a period of time ranging from a leading edge of the enable pulse EN to a leading edge of the delay enable pulse ENDL. Alternatively, the gate circuit portion 466 may generates the pulse signal based on a period of time ranging from a trailing edge of the enable pulse EN to a trailing edge of the delay enable pulse ENDL.

In shaping the enable pulse EN by the correction time period adjusting portion 460, the delayed enable pulse ENDL is outputted with an amount of delay corresponding to the characteristics of the transistor composing the delay portion 462. If the environment temperature is high and thus the optimal correction time is shifted to the shorter times, the transistor characteristics in the delay portion 462 are also changed, and thus a delay amount ΔT of the delayed enable pulse ENDL becomes less. For this reason, the width of the pulse signal, based on the period of time from the leading edge of the enable pulse EN to the leading edge of the delayed enable pulse ENDL, which is generated in the gate circuit portion 466 becomes narrow. As a result, the pulse width can be automatically adjusted so as to correspond to the panel environment temperature change.

FIG. 10C shows the timing chart explaining an operation example 2 when the direction of the change in the environment (such as the temperature and the humidity), and the direction of the adjustment for the correction period of time are identical to each other. The wording "the case where directions are identical to each other" means the case where when, for example, the temperature or the humidity is increased, the optimal correction period of time becomes long in correspondence to the decrease, and contrary, when the temperature or the humidity is decreased, the optimal correction period of time becomes short in correspondence to the decrease. Both of the enable pulse EN and the delayed enable pulse ENDL are inputted to the gate circuit portion 466. The gate circuit portion 466 generates a pulse signal with which the direction of the change in the environment (such as the temperature or the humidity), and the direction of the adjustment for the correction period of time are identical to each other based on the enable pulse EN and the delayed enable pulse ENDL. In the case shown in FIG. 10C, the gate circuit portion 466 generates the pulse signal based on a period of time ranging from a leading edge of the delay enable pulse ENDL to a trailing edge of the enable pulse EN. Alternatively, the gate circuit portion 466 may generate the pulse signal based on a period of time ranging from a trailing edge of the delayed enable pulse ENDL to a leading edge of the enable pulse EN.

In shaping the enable pulse EN by the correction time period adjusting portion 460, the delayed enable pulse ENDL is outputted with an amount of delay corresponding to the characteristics of the transistor composing the delay portion 462. If the panel environment temperature is high and thus the optimal correction time is shifted to the longer times, the transistor characteristics in the delay portion 462 are also changed, and thus the delay amount ΔT of the delayed enable pulse ENDL becomes less. For this reason, the width of the pulse signal, based on the period of time from the leading edge of the delayed enable pulse ENDL to the trailing edge of the enable pulse EN, which is generated in the gate circuit portion 466 becomes wide. As a result, the pulse width can be automatically adjusted so as to correspond to the panel environment temperature change.

[Example of Application of Countermeasure Technique]

Figure 11A:
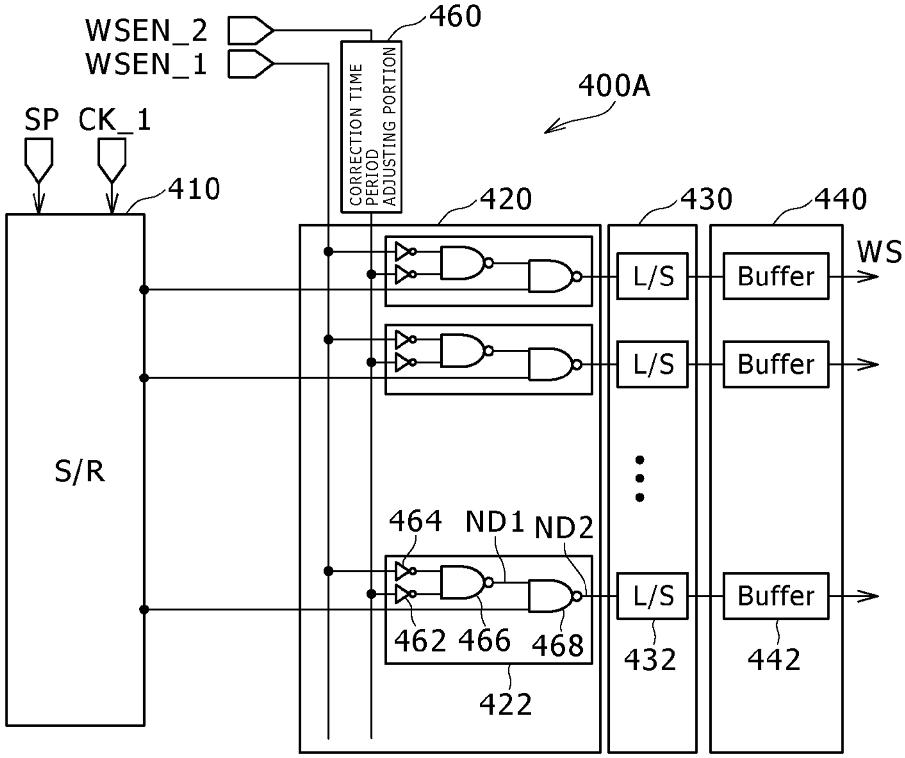
FIGS. 11A, 11B, and 11C are respectively circuit diagrams, and a timing chart explaining a concrete example of application of the technique, shown in FIGS. 10A, 10B, and 10C, for automatically adjusting the correction period of time so as to correspond to the environment dependency of the element characteristics.
Figure 11B:
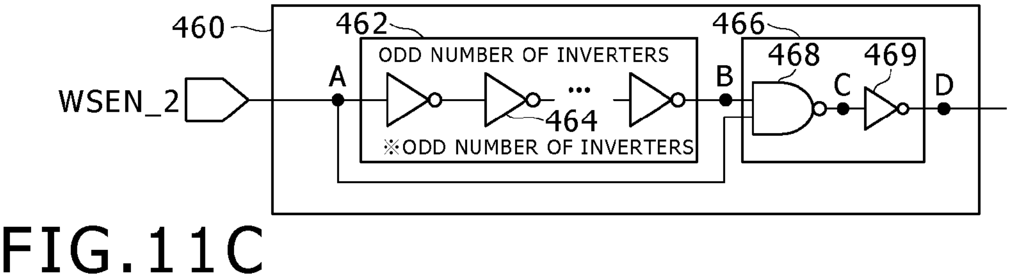
Figure 11C:
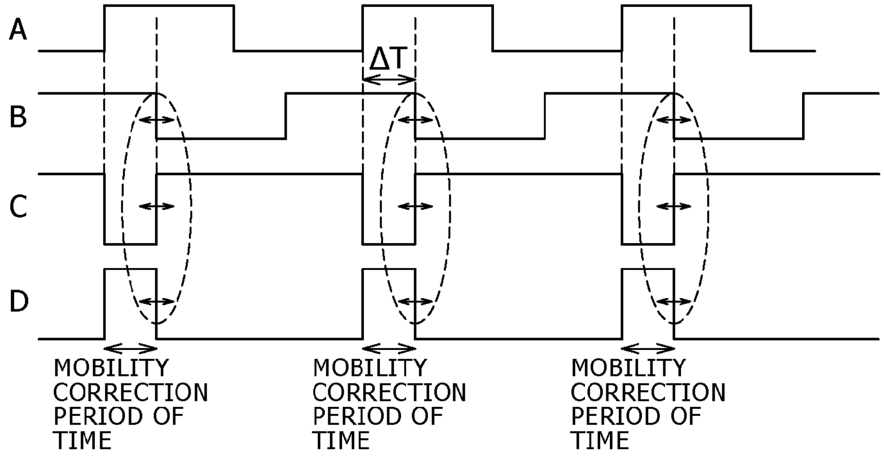

FIGS. 11A, 11B, and 11C are respectively circuit diagrams, and a timing chart explaining a concrete example of application of the technique for automatically adjusting the correction period of time so as to correspond to the environment dependency of the element characteristics. In this case, an example of application to the mobility correction period of time is shown as the example of application of the countermeasure technique to the correction period of time. Specifically, FIG. 11A is a circuit diagram showing a configuration of a peripheral circuit 400A in a display device of Example 1. FIG. 11B is a circuit diagram showing a detailed configuration of the correction time period adjusting portion 460 provided in the peripheral circuit 400A. Also, FIG. 11C is a timing chart explaining an operation of the correction time period adjusting portion 460 shown in FIG. 11B.

As shown in FIG. 11A, in the peripheral circuit 400A, the correction time period adjusting portion 460 is provided on a path for an enable pulse WSEN_2 for the mobility correction. Other configurations are identical to those in the peripheral circuit 400Z of Comparative Example shown in FIG. 9B.

FIG. 11B is a circuit diagram showing a detailed configuration of the correction time period adjusting portion 460. The delay portion 462 is configured by connecting the odd number of inverters 464 in series with one another. The gate circuit portion 466 is composed of a NAND gate 468, and an inverter 469 provided in a subsequent stage of the NAND gate 468.

FIG. 11C is a timing chart explaining an operation of the correction time period adjusting portion 460. Since in the delay portion 462, an odd number of inverters 464 are connected in series with one another, the inputted enable pulse WSEN_2 (having a waveform A) for the mobility correction is delayed by a delay amount ΔT and is reversed in logic. Thus, a reversed delayed enable pulse NWSEN_2 (having a waveform B) is outputted.

The NAND gate 468 generates a pulse signal (having a waveform C) based on a period of time from a leading edge of the enable pulse WSEN_2 to a trailing edge of the reversed delayed enable pulse NWSENDL_2 in accordance with both of the enable pulse WSEN_2 and the reversed delayed enable pulse NWSENDL_2. The inverter 469 supplies a pulse signal (having a waveform D) which is obtained by logic-reversing the output pulse (having the waveform C) from the NAND gate 468 to the logic circuit 422. A period of time for which a waveform D offers the active H level regulates the mobility correction period of time.

In shaping the enable pulse WSEN_2 by the correction time period adjusting portion 460, the reversed delayed enable pulse NWSENDL_2 is outputted with the delay amount ΔT corresponding to the characteristics of the transistor composing the delay portion 462. If the panel environment temperature is high and thus the optimal correction time is shifted to the shorter time, the transistor characteristics in the delay portion 462 are also changed, and thus the delay amount ΔT of the delayed enable pulse ENDL becomes less. For this reason, a width of a pulse signal based on a period of time from a leading edge of the enable pulse EN to a leading edge of the delayed enable pulse ENDL and generated in the gate circuit portion 466 becomes narrow. As a result, the pulse width with which the mobility correction period of time is regulated can be automatically adjusted so as to correspond to the panel environment temperature change. The pulse width is shaped by the delay portion 462, whereby the write drive pulse WS having the optimal pulse width can be automatically supplied to the write scanning line 104WS so as to correspond to the panel environment temperature.

4-2. Example 2

Method of Driving Circuit): Example 1+Countermeasure for Display Nonuniformity Phenomenon Due to Dispersion of Shapes of Drive Pulses (Switch Selection for Same Pulse Signal As described above, at the drive timings shown in FIG. 6, the display luminance is controlled by controlling the transistors 121 in accordance with the timings of the write drive pulse WS and the power source drive pulse DSL in order to improve the display nonuniformity due to the nonuniformity of the characteristics of the elements (the dispersion and temperature change in the threshold voltage $V_{th}$ and mobility μ of the drive transistor 121 in the above case). For this reason, when the shapes (the amplitudes, the levels, the widths, and the like) of the drive pulses are dispersed, it may be impossible to carry out the proper control, which results in the display nonuniformity being caused.

For example, in the mobility correction, as shown in the timing chart of FIG. 6, the driving is adopted in which the mobility correction is carried out while the signal writing is carried out. Thus, the mobility correcting operation sensitively suffers the influence of the pulse width of the write drive pulse WS regulating the write & mobility correction period H of time. Thus, the disposition of the pulse widths in the columns is directly connected with the uniformity deterioration. In addition, in the case of the transistor having the large mobility or the like, in the division threshold voltage correction in which the threshold voltage correction is carried out plural times, the bootstrap during the pause period of time becomes remarkable. In particular, when the pulse shape in the first round of the threshold voltage correction is disposed every row, the dispersion for each row is generated in the correction due to the influence of the bootstrap operation, which results in the uniformity being impaired.

For example, in the case of the configuration of the peripheral circuit 400Z as shown in FIGS. 8A and 8C, with regard to the same kind (same name) of signals in the columns or in the rows, the drive pulses are generated every column or row and are outputted to the wirings (scanning lines) in corresponding columns or rows, respectively. For this reason, the shapes of the drive pulses (the widths, the change characteristics, and the like) of the drive pulses are dispersed every row or column, which causes the display nonuniformity. For example, with regard to the write drive pulse WS which is used in the 2Tr/1C type drive configuration shown in FIG. 8C, both of the enable pulse WSEN_1 for the threshold voltage correction having the predetermined waveform, and the enable pulse WSEN_2 for the mobility correction having the predetermined waveform are inputted to each of the stages of the logic circuits 422 to generate the pulse signal causing the write drive pulse WS. However, when the characteristics of the transistors (not shown) composing each of the stages of the logic circuits 422 are disposed, the shapes of the write drive pulses WS supplied to the respective pixel circuits 10 are dispersed, which causes a transverse streak (a line-like noise) or the like. The dispersion of the mobility correction period of time due to the dispersion of the characteristics of the transistors composed of the logic circuit 422 appears in the form of the luminance nonuniformity (transverse streak), which leads to the deterioration of the image quality.

In addition, with regard to the threshold voltage correction, the first threshold voltage correction period of time is regulated in accordance with both of the leading of the power source drive pulse DSL based on the enable pulse DSEN for the power source supply, and the trailing of the write drive pulse WS based on the enable pulse WSEN_1 for the threshold voltage correction. However, when both of the pulse shapes of the power source drive pulses DSL and the width drive pulses WS are dispersed, the first threshold voltage correction periods of time are dispersed accordingly. As a result, the dispersion is generated in the correction due to the influence of the following bootstrap, which results in the uniformity being impaired.

In FIG. 8C, the description was given by paying attention to the write drive pulses WS used in the 2Tr/1C type drive configuration. Even in other three type drive configurations, such as the 5Tr/1C type drive configuration, the 4Tr/1C type drive configuration, and the 3Tr/1C type drive configuration, when the pulse shapes of the drive pulses in accordance with which the transistors of the pixel circuit 10 are controlled are disposed every row (or every column), the display nonuniformity is generated. For example, in the mobility correction with the 5Tr/1C type drive configuration, the mobility correction period of time is regulated in accordance with the active periods of time for both of the drive pulse used to drive the first transistor $TR_1$ (the control pulse in accordance with which the power source voltage is applied to the drive transistor $TR_D$: referred to as "the power source scanning pulse DS"), and the write drive pulse WS used to drive the write transistor $TR_W$ in some cases. In such cases, the pulse shapes of the power source scanning pulses DS, and the write drive pulses WS are disposed every row, which results in the mobility correction periods of time being dispersed every row. This also applies to each of the 4Tr/1C type drive configuration and the 3Tr/1C type drive configuration each including the first transistor $TR_1$. In addition, with regard to the threshold correction, in any of the 5Tr/1C type drive configuration, the 4Tr/1C type drive configuration, and the 3Tr/1C type drive configuration, the threshold correction period of time is regulated in accordance with the active period of time of the power source scanning pulse DS used to drive the first transistor $TR_1$ in some cases. In such cases, when the pulse shapes of the power source scanning pulses DS are disposed every row, the first threshold correction periods of time are disposed accordingly, and thus the dispersion is generated in the correction due to the influence of the following bootstrap operation, which results in the uniformity being impaired.

From the foregoing, in the case of the peripheral circuit 400Z having the configuration in which with regard to the same kind (same name) of signals in the columns or in the rows, the drive pulses are generated every column or row and are outputted to the wirings (scanning lines) in corresponding columns or rows, respectively, it is possible that the shapes (the width, the change characteristics, and the like) of the drive pulses are dispersed every row or every column, which causes the display nonuniformity. For this reason, the development of a system for suppressing the luminance change due to the dispersion of the characteristics of the transistors composing the logic circuits 422 is requested.

The feature of Example 2 and Example 3 which will be described later is that while Example 1 is applied to this request, with regard to the same kind (same name) of signals in columns and in rows, the pulse signals causing the drive pulses are generated preferably in one portion with plural columns or plural rows as one unit. As a result, the extent to that the shapes (the widths, the change characteristics, and the like) of the drive pulses are dispersed either every row or every column is relaxed, and the phenomenon is improved in which the dispersion of the correction periods of time due to the dispersion of the shapes of the drive pulses resulting from the dispersion of the characteristics of the transistors composed of the logic circuit 422 appears in the form of the luminance nonuniformity (the color nonuniformity in the case of the color image display).

Figure 12A:
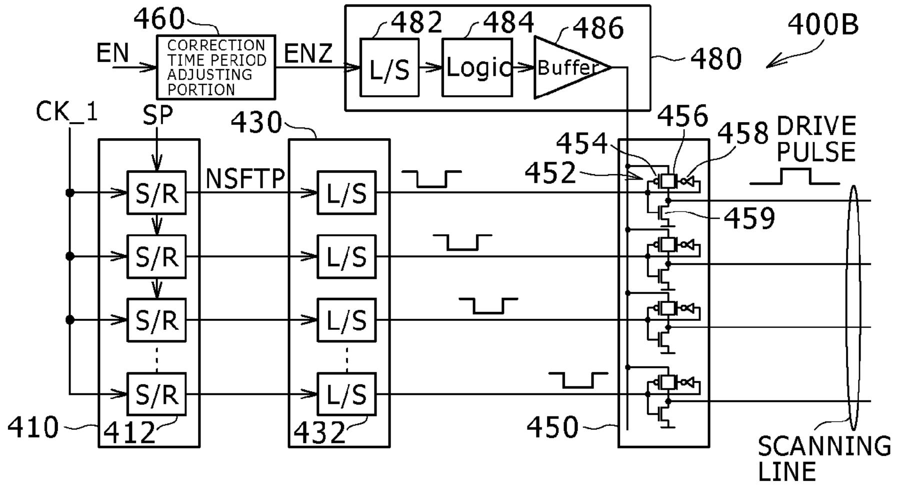
FIGS. 12A, 12B, and 12C are respectively a block diagram, partly in circuit, a timing chart, and a block diagram, partly in circuit, explaining a method of driving a pixel circuit according to Example 2 of the first embodiment of the present disclosure by paying attention to measures taken to cope with display nonuniformity due to a dispersion of characteristics of transistors composing a logic circuit for generating a pulse signal causing a drive pulse.
Figure 12B:
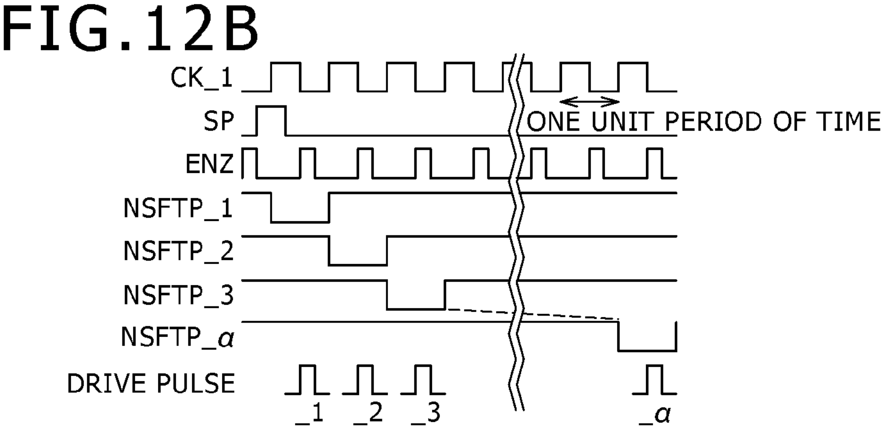
Figure 12C:
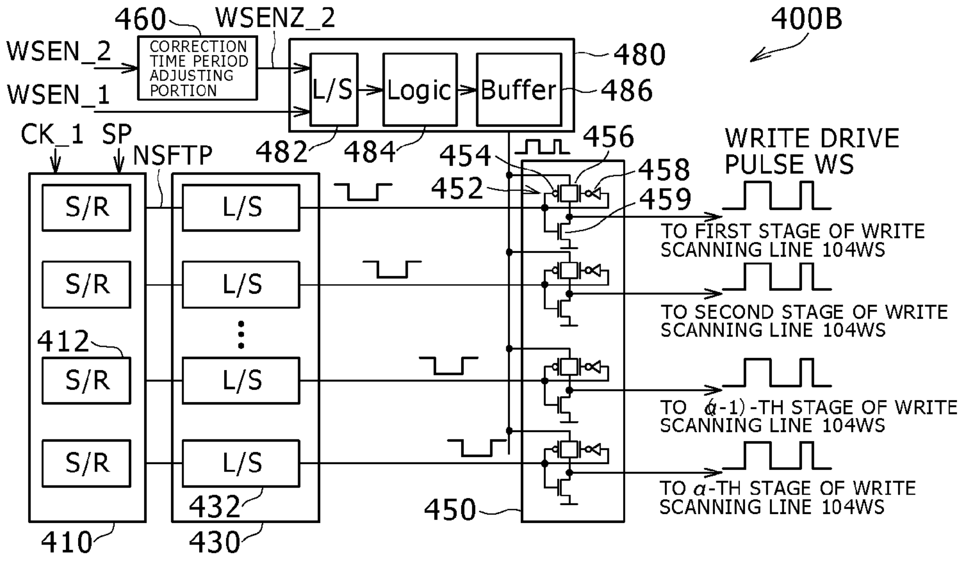

FIGS. 12A, 12B, and 12C are respectively a block diagram, a timing chart, and a block diagram explaining a method of driving a pixel circuit in the display device of Example 2 in which attention is paid to the display nonuniformity countermeasure due to the dispersion of the characteristics of the transistors composing the logic circuit for generating the pulse signal causing the drive pulse. Specifically, FIG. 12A is a block diagram, partly in circuit, showing a general-purpose configuration of a peripheral circuit 400B in the display device of Example 2. FIG. 12B is a timing chart explaining an operation of the peripheral circuit 400B. Also, FIG. 12C is a block diagram, partly in circuit, especially showing a configuration of the peripheral circuit 400B in relation to the write drive pulse WS. Example 2 is a case where it is solved that the shapes (the widths, the change characteristics, and the like) of the drive pulses regulating the mobility correction period of time are dispersed every row due to the dispersion of the characteristics of the transistors composing the logic circuit.

In particular, in Example 2, the pulse signals are outputted to the wirings (scanning lines) of corresponding plural columns or plural rows every one unit through the switches, respectively. In particular, Example 2 is a case suitable for the case where a series of correcting processing is completed for one unit period of time (one scanning period of time in this case). The wording "the pulse signals are outputted to the wirings (scanning lines) of corresponding plural columns or plural rows every one unit through the switches, respectively" means that in a relationship with other units, the connection to the scanning line is not complicated (for example, not alternately carried out). The reason for this is because even when the pulse signals are generated every one unit, the output pulses are supplied to the scanning lines so as to become complicated in a relationship with other units, which results in that the drive pulses having the different pulse shapes are substantially supplied so as to correspond to the scanning lines, respectively. When "the pulse signals are outputted to the wirings (scanning lines) of corresponding plural columns or plural rows every one unit through the switches, respectively," at least the drive pulses having the different pulse shapes are prevented from being supplied so as to correspond to the scanning lines, respectively.

However, the influence due to the dispersion of the pulse shapes of the pulse signals for each unit can appear in adjacent portions of the units. In this point, it is only necessary that the number of units is as small as possible. Therefore, preferably, all it takes is that the pulse signals causing the drive pulses are generated on both sides of the pixel array portion 102. Most preferably, all it takes is that the pulse signals causing the drive pulses are generated in one portion, and are then outputted to the wirings (scanning lines) of either the rows or the columns through the switches, respectively.

For example, in Example 2, as shown in FIG. 12A, the peripheral circuit 400B has a configuration in which firstly, both of the logic circuit portion 420 and the output buffer portion 440 are removed from the peripheral circuit 400Z of Comparison Example, and the peripheral circuit 400B includes a switch portion 450 having switches 452 provided either every row or every column in a subsequent stage of the level shift portion 430. Thus, the configuration is adopted in which the output signals from the shift register portion 410 are inputted to the level shifting portion 430, and shift pulses obtained through the level conversion are supplied to control input terminals of the switches 452, respectively, either every row or every column.

All it takes is that preferably, the switch circuit 452 has a configuration of utilizing a switch circuit (a typical example is a CMOS switch) having a transfer gate structure. For example, as shown in FIG. 12A, in the switch circuit 452, an n-channel MOSFET (NMOS) 454 and a p-channel MOSFET (PMOS) 456 are connected to each other in a complementary manner. An inverter 458 is provided on a control input terminal side of the NMOS 454. In addition, an NMOS 459 for setting the electric potential of the scanning line to the low level is connected to each of an output terminal of the switch circuit 452, and the scanning line.

In the switch circuit 452, each of a control input terminal of the PMOS 456, and an input terminal of the inverter 458 is a control input terminal of the switch circuit 452, and the pulse signal is supplied from the level converting portion 432 to the control input terminal concerned. In this case, when the electric potential of the pulse signal concerned is set at the L level, the switch circuit 452 fetches in the signal at the input terminal thereof, and outputs the signal thus fetched therein to the scanning line on the output terminal side. For this reason, as shown in FIG. 12B, when a start pulse SP is supplied from an interface portion (not shown) to the shift register portion 410, the shift register portion 410 successively shifts the start pulse SP in the shift registers 412 synchronously with a shift clock CK_1 supplied from the interface portion (not shown). Thus, the start pulses SP are outputted as shift pulses NSFTP each set at the inactive L level and having one unit time period width from the respective stages. After that, the shift pulses NSFTP each having a relatively narrow amplitude (also having a low voltage level as a whole) are amplified into pulse signals each having a relatively wide amplitude (also having a high voltage level as a whole) which are in turn inputted to the control input terminals of the switch circuits 452, respectively. Although not illustrated, a complementary connection can also be adopted in which the PMOS 456 is disposed on the output terminal side of the inverter 458. In this case, all it takes is that in the shift register portion 410, the shift pulses SFTP each set at the active H level are outputted from the respective stages, and an inverter is provided on the control input terminal of the NMOS 459 so as to correspond to this change.

The peripheral circuit 400B includes a pulse generating portion 480 having a level converting portion 482 (corresponding to the level converting portion 432), a logic circuit 484 (corresponding to the logic circuit 422), and a buffer 486 (corresponding to the buffer 442) in order to generate the drive pulse in the outside (in one portion in this case) of the pixel array portion 102 in addition to the scanning portion. The correction time period adjusting portion 460 described in Example 1 is provided in the preceding stage of the pulse generating portion 480. Thus, with regard to the enable pulse EN, an adjusted enable pulse ENZ which is adjusted for the correction period of time corresponding to the environment dependency of the characteristics of the drive transistor 121 composing the pixel circuit 10 is supplied to the pulse generating portion 480. In particular, the feature of the peripheral circuit 400B of Example 2 is that the pulse generating portion 480 is disposed most outside the scanning lines. The logic circuit 484 generates a pulse signal set at the active H level, and supplies the pulse signal thus generated to an input terminal of a switch circuit 452 through the buffer 486. Although not illustrated, the buffer 486 either may be provided every one unit with plural columns or plural rows (in the extent to that either all of the rows or all of the columns are prohibited) as one unit, or may be provided every column or every row. In the pulse generating portion 480, the adjusted enable pulse ENZ having a predetermined pulse waveform, having a relatively narrow amplitude (also having a low voltage as a whole), and inputted from the correction time period adjusting portion 460 is amplified into a pulse signal having a relatively wide amplitude (also having a high voltage level as a whole) through a level converting portion 482 provided in one portion. Also, the resulting pulse signal is then inputted to the logic circuit 484 in one portion, thereby generating a pulse signal having a relatively wide amplitude (also having a high voltage level as a whole) and causing the drive pulse. It is noted that although the description is given with respect to the simplest configuration based on the adjusted enable pulse ENZ about one kind of drive pulse (for itself especially specified) in this case, a pulse signal causing a new kind of drive pulse utilizing the enable pulse EN about another drive pulse is generated as the case may be.

The peripheral circuit 400B inputs the pulse signal generated in the logic circuit 484 to each of the input terminals of the switch circuits 452 provided either every column or every row, and extracts the desired pulses in accordance with shift pulses NSFTP supplied from the level converting portions 432 either in the rows or the columns from the control input terminals of the switch circuits 452. That is to say, when the shift pulse NSFTP is held at the active H level, the CMOS switch composed of the NMOS 454 and the PMOS 456 is turned OFF, and the NMOS 459 is turned ON, whereby the electric potential of the scanning line becomes the low level. On the other hand, when the shift pulse NSFTP is held at the inactive L level, the CMOS switch composed of the NMOS 454 and the PMOS 456 is turned ON, and the NMOS 459 is turned OFF, whereby the electric potential of the scanning line becomes approximately equal to the output electric potential of the buffer 486. As a result, the pulse signal generated in the pulse generating portion 480 is outputted as the drive pulse to the scanning line. Even when the characteristics of the transistors composing the logic circuit 484 are dispersed in the respective pulse generating portions 480, the influence of the dispersion appears either in all of the rows or in all of the columns in the same fashion. For this reason, it is possible to suppress that the waveform shapes of the drive pulses due to the dispersion of the characteristics of the transistors composing the logic circuit 484 are dispersed either every row or every column. Thus, it is also possible to suppress the luminance change (display nonuniformity).

Although not illustrated, the order of the disposition of the level converting portion 482 and the logic circuit 484 may be reversed. In this case, there is offered an advantage that the logic circuit 484 can be composed of a low voltage circuit in terms of the configuration. In this case, in the pulse generating portion 480, the adjusted enable pulse ENZ having a predetermined pulse waveform, having a relative narrow amplitude (also having a low voltage level as a whole), and inputted thereto from the correction time period adjusting portion 460 is inputted to the logic circuit 484 in one portion, thereby generating a pulse signal having a relative narrow amplitude (also having a low voltage level as a whole) and causing the drive pulse. After that, the pulse signal having the relative narrow amplitude thus generated is amplified into a pulse signal having a relatively wide amplitude (also having a high voltage level as a whole) through the level converting portion 482 in one portion, and is inputted to each of the input terminals of the switch circuits 452 provided either every column or every row, and the desired pulses are extracted in accordance with the shift pulses NSFTP supplied from the level converting portions 432 either in the rows or in the columns from the control input terminals of the switch circuits 452.

For example, with regard to the write drive pulse WS used in the 2Tr/1C type drive configuration, as shown in FIG. 12C, both of the enable pulse WSEN_1 for the threshold correction, and the adjusted enable pulse WSENZ_2 which is obtained based on the enable pulse WSEN_2 for the mobility correction and which is adjusted in pulse width thereof in the correction time period adjusting portion 460 are supplied to the level converting portion 482, and are then amplified into the pulse signal having the relatively wide amplitude (also having the high voltage level as a whole) which is in turn supplied to the logic circuit 484. The logic circuit 484 obtains a logic OR of the enable pulse WSEN_1 and the enable pulse WSEN_2 each having the relatively wide amplitude (also having the high voltage level as a whole), thereby generating the pulse signal causing the write drive pulse WS which is to be supplied to the write scanning line 104WS.

Although FIG. 12C shows the periphery circuit 400B in relation to the write drive pulse WS in the 2TR/1C type drive configuration, with regard to the power source drive pulse DSL, it is only necessary to change both of the enable pulse WSEN_1 for the threshold voltage correction, and the enable pulse WSEN_2 for the mobility correction into the enable pulse DSEN for the power source supply. In addition, either the level shifting portion 430 or the output buffer portion 440, for example, has only to be changed into a power source circuit. Then, the change has only to be carried out in such a way that when the enable pulse DSEN is held at the active H level, the first electric potential $V_{cc\_H}$ is outputted, while when the enable pulse DSEN is held at the inactive L level, the second electric potential $V_{cc\_L}$ is outputted. This point is identical to the case of Comparative Example.

In the case of the configuration of the peripheral circuit 400B as shown in FIGS. 12A and 12C, with regard to the same kind (same name) of signals either in the columns or in the rows, the enable pulse EN having the predetermined pulse waveform and inputted thereto from the outside of the pixel array portion 102 is inputted to the logic circuit 422 in one portion, thereby generating the pulse signal causing the drive pulse. After that, the pulse signal generated in the logic circuit 422 is inputted to each of the input terminals of the switch circuits 452 provided either every column or every row through the buffer 486, and the desired pulses are extracted in accordance with the pulses NSFTP supplied from the level converting portions 432 from the control input terminals of the switch circuits 452. BY adopting such a configuration, the pulse width can be automatically adjusted in accordance with the panel environmental temperature change. Also, the stable pulse waveforms which are free from the dispersion of the shapes of the drive pulses can be supplied either to the rows or to the columns. Thus, it is possible to suppress the luminance nonuniformity due to the dispersion of the correction periods of time resulting from the dispersion of the characteristics of the transistors composing the logic circuit 422. As far as the write drive pulse WS shown in FIG. 12C is concerned, it is possible to supply the pulse for the threshold voltage correction, and the pulse for the mobility correction each of which has the stable waveform free from the dispersion to each of the rows. Also, the panel having the excellent uniformity and being free from the transverse streak is obtained independently of the environment temperature change.

In FIG. 12C, the description was given by paying attention to the write drive pulses WS used in the 2Tr/1C type drive configuration. Even in other three type drive configurations, such as the 5Tr/1C type drive configuration, the 4Tr/1C type drive configuration, and the 3Tr/1C type drive configuration, the pulse shapes of the drive pulses, either for the rows or for the columns, in accordance with which the transistors of the pixel circuit 10 are controlled can be made the stable pulse shapes free from the dispersion. For example, in the mobility correction with the 5Tr/1C type drive configuration, the mobility correction period of time is regulated in accordance with the active periods of time for both of the power source scanning pulse DS used to drive the shift transistor $TR_1$, and the write drive pulse WS used to drive the write transistor $TR_W$ in some cases. In such cases, with regard to the power source scanning pulse DS, and the write drive pulse WS, the pulse shapes of the drive pulses for the rows can be made the stable pulse waveforms free from the dispersion. Since it is possible to suppress the dispersion of the mobility correction periods of time for each row, it is possible to display the excellent image free from the luminance nonuniformity. This also applies to each of the 4Tr/1C type drive configuration and the 3Tr/1C type drive configuration each including the first transistor $TR_1$. In addition, with regard to the threshold correction in any of the 5Tr/1C type drive configuration, the 4Tr/1C type drive configuration, and the 3Tr/1C type drive configuration, the threshold correction period of time is regulated in accordance with the active period of time of the power source scanning pulse DS used to drive the first transistor $TR_1$ in some cases. In such cases, the pulse shapes of the power source scanning pulses DS for the rows can be made the stable pulse waveforms free from the dispersion. Since it is possible to suppress that the pulse shapes of the power source scanning pulses DS are dispersed every row, it is possible to suppress that the first threshold voltage correction periods of time are dispersed every row. Therefore, it is possible to display the excellent image free from the luminance nonuniformity.

Modification Examples

Although in the peripheral circuit 400B in the display device of Example 2, the pulse generating portion 480 is disposed most outside the scanning lines, the present disclosure is by no means limited thereto. For example, although not illustrated, the pulse generating portion 480 may also be disposed in an intermediate portion in the direction of the disposition of the scanning lines. The buffers 486 may also be provided so as to correspond to areas (for example, for a half on a preceding stage side in the scanning direction, and for a half on a subsequent stage side in the scanning direction) of the scanning lines divided by the intermediate portion. Other points in configuration are identical to those in Example 2. By adopting such a configuration, it is possible to reduce a disadvantage due to a difference in delay amount between the pulse signals outputted from the buffers 486. Or, one pulse generating portion 480 is by no means limited to the configuration of being disposed in the vicinity of the just middle in the direction of the disposition of the scanning lines, and thus even when plural pulse generating portions 480 are provided, the same technique can also be applied thereto. For example, although not illustrated, when N (two in the figures) pulse generating portions 480 are provided, it is only necessary that the direction of the disposition of the scanning lines is partitioned into N areas, and the pulse generating portion 480 is disposed in the vicinity of the just middle in the direction of the disposition of the scanning lines every partition. Also, the buffers 486 may be provided so as to correspond to areas (for example, for a half on a preceding stage side in the scanning direction in each of the partitions, and for a half on a subsequent stage side in the scanning direction in each of the partitions) of the scanning lines divided in the middle portion for each partition.

4-3. Example 3

(Method of Driving Circuit): Example 1+Countermeasure for Display Nonuniformity Phenomenon Due to Dispersion of Shapes of Drive Pulses (Pulse Signal Generated in Pulse Generating Portion is Shifted)

Figure 13A:
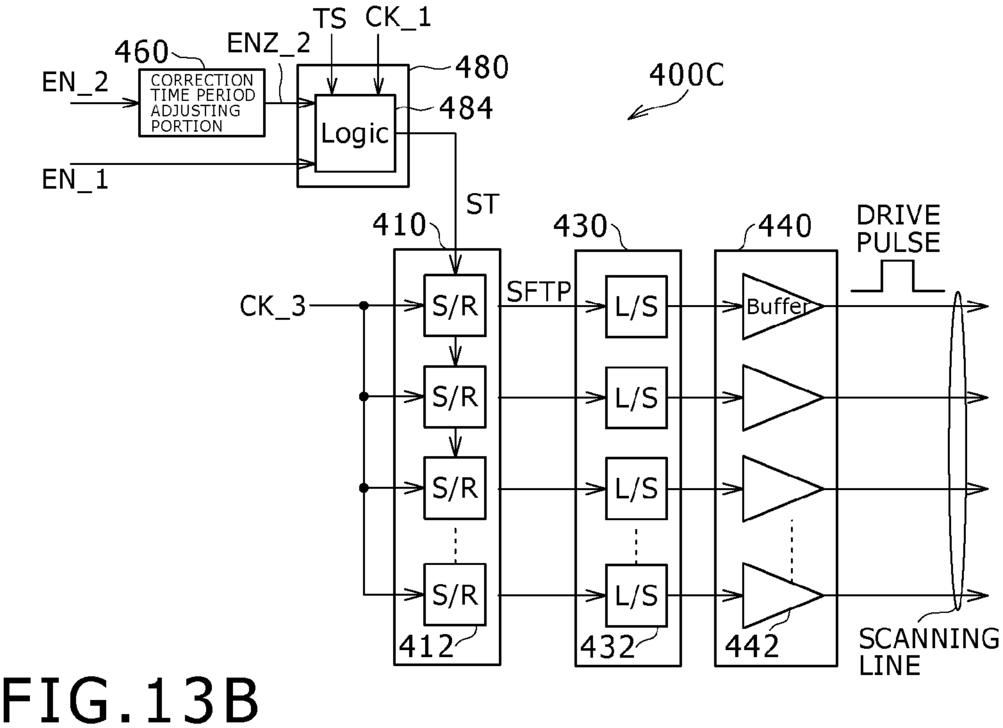
FIGS. 13A and 13B are respectively a block diagram, partly in circuit, a timing chart explaining a method of driving a pixel circuit according to Example 3 of the first embodiment of the present disclosure by paying attention to the measures taken to cope with the display nonuniformity due to the dispersion of the characteristics of the transistors composing the logic circuit for generating the pulse signal causing a drive pulse.
Figure 13B:
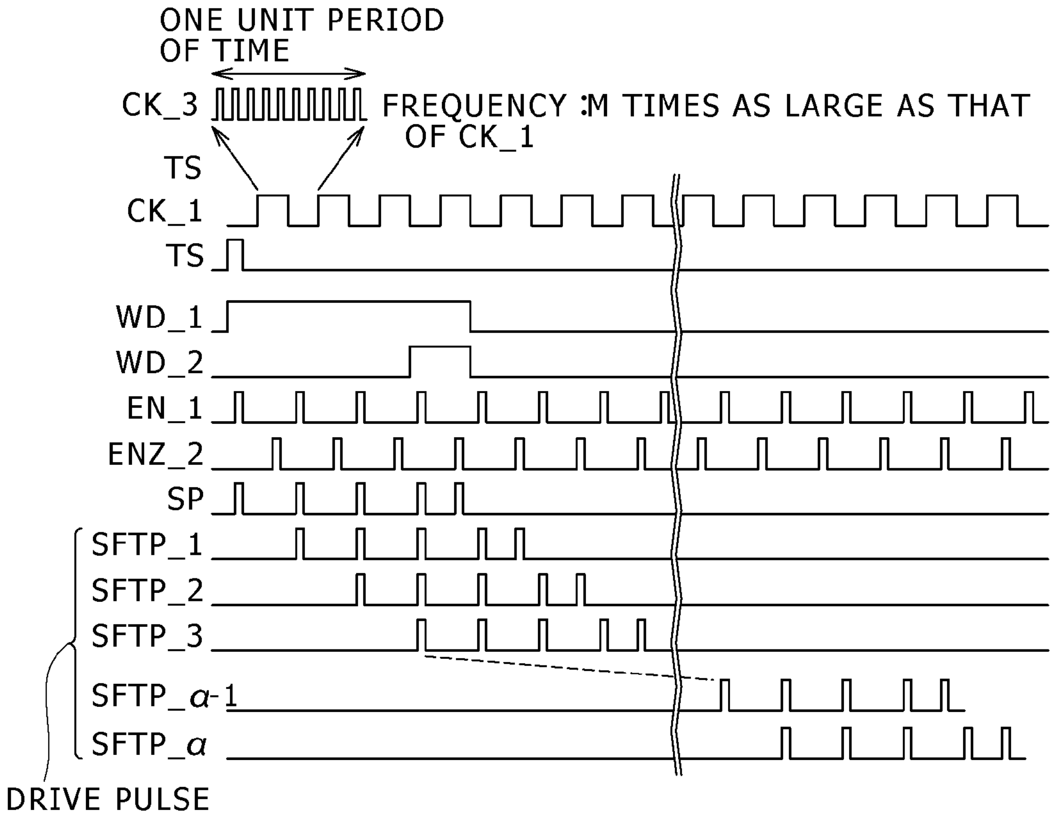

FIGS. 13A and 13B are respectively a block diagram and a timing chart explaining a method of driving a pixel circuit in a display device according to Example 3 of the first embodiment of the present disclosure by paying attention to a countermeasure for display nonuniformity due to the dispersion of the characteristics of the transistors composing the logic circuit for generating the pulse signal causing the drive pulse. Specifically, FIG. 13A is a block diagram, partly in circuit, showing a general-purpose configuration of a peripheral circuit 400C in the display device of Example 3, and FIG. 13B is a timing chart explaining an operation of the peripheral circuit 400C.

In Example 3, with regard to the same kind (the same name) of signals either in columns or in rows, the pulse signal causing the drive pulse is generated, preferably, in one portion with either plural columns or plural rows as one unit. Also, the pulse signal is successively shifted either every row or every column to be supplied as the drive pulse to the scanning lines. The extent to that the shapes (the widths, the change characteristics, and the like) of the drive pulses are dispersed either every row or every column is relaxed, and the phenomenon is improved in which the dispersion of the correction periods of time due to the dispersion of the shapes of the drive pulses resulting from the dispersion of the characteristics of the transistors composed of the logic circuit 422 appears in the form of the luminance nonuniformity (the color nonuniformity in the case of the color image display). As a result, the present disclosure is by no means limited to the case where a series of correcting processing is completed for one unit period of time, and thus even when a series of correcting processing is executed over plural unit periods of time, the extent to that the shapes (the widths, the change characteristics, and the like) of the drive pulses are dispersed either every row or every column is relaxed. Thus, the phenomenon is improved in which dispersion of the correction periods of time due to the dispersion of the shapes of the drive pulses resulting from the dispersion of the characteristics of the transistors composing the logic circuit 422 appears in the form of the luminance nonuniformity (the color nonuniformity in the case of the color image display).

For example, when the division threshold voltage correction and the mobility correction are used together with each other, as can be understood from the timing chart shown in FIG. 6, the initialization period D of time, the threshold voltage correction period E of time, and the write & mobility correction period H of time all exist in one cycle of the write drive pulse WS. Also, one cycle of the write drive pulse WS extends over plural horizontal scanning period of time (an example of unit period of time). The line for which the write & mobility correction is carried out, and another line for which the division threshold voltage correction is carried out are different in write drive pulse WS from each other. Thus, with the configuration of either Example 1 or Example 2 in which the same drive pulse is supplied from one portion to all of the lines, and the switch selection is carried out in each of the lines, it may be impossible to improve the problem about the dispersion of the waveforms of the drive pulses.

In Example 3, with regard to the measures taken to cope with the above problem, a configuration in which the pulse signal causing the drive pulse with which the entire processing cycle extends over plural horizontal scanning period of time is previously generated, and is then successively shifted to be outputted to the scanning lines is adopted, thereby coping with the above problem. In Example 1 or the like, one cycle of the shift clock CK_1 inputted to the register 412 is identical to one cycle of the drive pulse and, for example, is identical to one horizontal cycle with respect to the write drive pulse WS. On the other hand, in Example 3, in order to secure the resolution (M times as large as that of one horizontal cycle) of the initialization period D of time, the threshold voltage correction period E of time, or the write & mobility correction period H of time within one horizontal cycle, there is used a shift clock CK_3 whose cycle is H/M times as large as that of the shift clock CK_1 in Example 1 or the like. In other words, a frequency of the shift clock CK_3 is M times as large as that of the shift clock CK_1.

Specifically, a peripheral circuit 400C in the display device of Example 3 includes a pulse generating portion 480 including a logic circuit 484 in a preceding stage of a shift register portion 410. Also, the peripheral circuit 400C of Example 3 includes the shift register portion 410, a level shift portion 430, and an output buffer portion 440. Both of the level converting portion 482 and the buffer 486 are unnecessary for the pulse generating portion 480. When contrasted with the peripheral circuit 400Z of Comparative Example, the peripheral circuit 400C has a configuration in which the logic circuit portion 420 provided between the shift register portion 410 and the level shifting portion 430 is removed away, and a logic circuit 422 common to all of the stages is provided in a preceding stage of the shift register portion 410.

The correction time period adjusting portion 460 described in Example 1 is provided in the preceding stage of the pulse generating portion 480. In the case shown in FIG. 13A, the correction time period adjusting portion 460 is disposed in a system of one enable pulse EN_1 corresponding to one kind of processing period of time (such as the initialization period D of time or the threshold voltage correction period E of time) and the enable pulse EN_2 within another enable pulse EN_2 corresponding to another kind of processing period of time (such as the write & mobility correction period H of time).

The enable pulse EN_1, the adjusted enable pulse ENZ_2, the shift clock CK_1, and the timing signal TS are all supplied to the logic circuit 484. In this case, the adjusted enable pulse ENZ_2 is adjusted for the correction period of time corresponding to the environment dependency of the characteristics of the drive transistor 121 composing the pixel circuit 10 regarding the enable pulse EN_2. The shift clock CK_1 regulates one unit period of time. Also, the timing signal TS becomes the reference either for all of the rows or for all of the columns. The logic circuit 484 generates both of one kind of window pulse WD_1 used for the gate processing for one enable pulse EN_1, and another kind of window pulse WD_2 used for the gate processing for the adjusted enable pulse ENZ_2 in accordance with the shift clock CK_1. The logic circuit 484 generates a pulse signal extending over plural unit periods of time and causing the drive pulse extending over plural unit periods of time in accordance with the enable pulse EN_1, the adjusted enable pulse ENZ_2, the window pulse WD_1, and the window pulse WD_2.

The pulse generating portion 480 supplies the pulse signal generated in the logic circuit 484 as a start pulse SP to a first stage of the register 412. For example, as shown in FIG. 13B, when the pulse signal generated in the pulse generating portion 480 is supplied to the first stage of the register 412, the shift register portion 410 successively shifts that pulse signal in increments of one cycle of the shift clock CK_1 synchronously with the shift clock CK_3, and outputs these pulse signals as the shift pulses SFTP each set at the active H level from the respective stages (reference symbol "_n" in FIG. 13B represents the number of stage). The shift pulse SFTP having the relatively narrow amplitude (also having the low voltage level as a whole) outputted from the shift register portion 410 is amplified into the output pulse having the relatively wide amplitude (also having the high voltage level as a whole) in the level shift portion 430, and is then outputted to the scanning line in corresponding stage through the buffer 442 of the output buffer portion 440.

When the peripheral circuit 400C in the display device of Example 3, for example, is applied to the pixel circuit 10 having the 2Tr/1C type drive configuration, the pulse width can be automatically adjusted so as to correspond to the panel environment temperature change. Also, even when the division threshold voltage correction and the mobility correction are used together with each other, the pulse signal causing the write drive pulse WS is generated in one portion, and that pulse signal is successively shifted and these pulse signals can be supplied to the write scanning lines 104WS, respectively. For this reason, even in the case where a series of processing cycles extends over plural horizontal scanning period of time when both of the division threshold voltage correction and the mobility correction are carried out, it is possible to suppress that the waveform shapes of the write drive pulses WS are dispersed due to the dispersion of the characteristics of the transistors composing the logic circuit 484. Thus, it is possible to suppress the luminance change (display nonuniformity) independently of the environment temperature change.

5. Examples of Application

FIG. 14 to FIG. 18 are respectively views explaining Examples of application in each of which the display device according to the first embodiment of the present disclosure is applied to the electronic apparatus according to the fourth embodiment of the present disclosure. Specifically, FIG. 14 to FIG. 18 are respectively cases of electronic apparatuses each loaded with the display device to which the technique for the correction time period adjustment corresponding to the environment dependency of the element characteristics described above is applied. The display nonuniformity suppressing processing in the display device of the first embodiment can be applied to a display device including a current drive type display element used in various kinds of electric apparatus such as a game machine, an electronic book, an electronic dictionary, and a mobile phone.

5-1. Example 1 of Application

Figure 14:
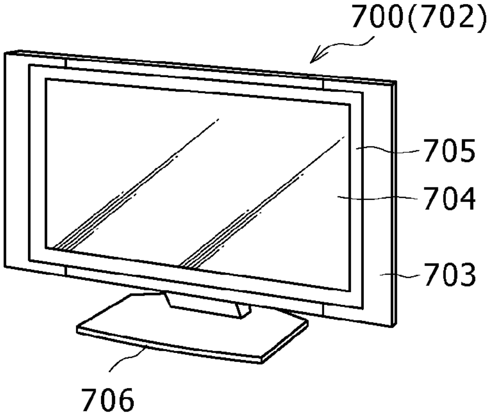
FIG. 14 is a perspective view showing an external appearance of a television receiver as Example 1 of application to which the display device shown in FIG. 1 of the first embodiment is applied.

For example, FIG. 14 is a perspective view showing an external appearance of a television receiver 702, as Example 1 of application, in which an electronic apparatus 700 utilizes a display module 704 as an example of a display module 704. The television receiver 702 has a construction in which the display module 704 is disposed on a front surface of a front panel 703 supported by a base 706. Also, a filter glass 705 is provided on a display surface. In this case, the display module 704 is manufactured by using the display device 1 according to the first embodiment of the present disclosure.

5-2. Example 2 of Application

Figure 15:
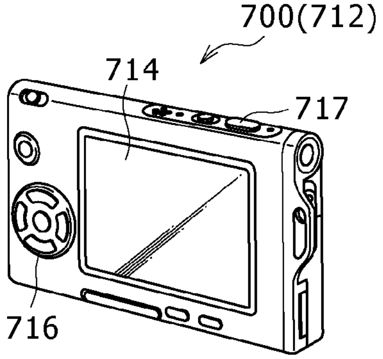
FIG. 15 is a perspective view showing an external appearance of a digital camera as Example 2 of application, when viewed from a back side, to which the display device shown in FIG. 1 of the first embodiment is applied.

FIG. 15 is a perspective view showing an external appearance of a digital camera, as Example 2 of application, when the electronic apparatus 700 is the digital camera 712. The digital camera 712 includes a display module 714, a control switch 716, a shutter button 717, and others. In this case, the display module 714 is manufactured by using the display device 1 according to the first embodiment of the present disclosure.

5-3. Example 3 of Application

Figure 16:
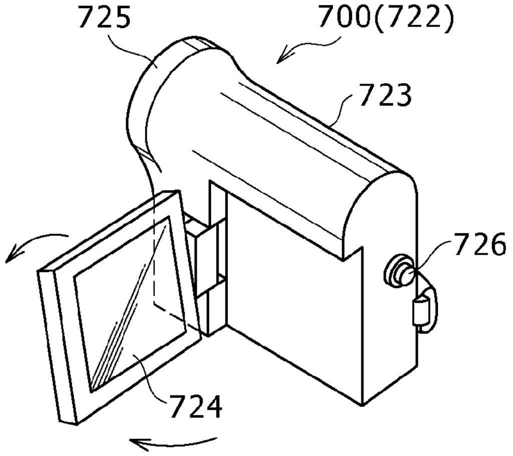
FIG. 16 is a perspective view showing an external appearance of a video camera as Example 3 of application to which the display device shown in FIG. 1 of the first embodiment is applied.

FIG. 16 is a perspective view showing an external appearance of a video camera, as Example 3 of application, when the electronic apparatus 700 is the video camera 722. The video camera 722 includes an image capturing lens 725 for capturing an image of a subject in front of a main body 723. In addition, a display module 724, a start/stop switch 726 which is manufactured when an image of a subject is captured, and the like are disposed in the video camera 722. In this case, the display module 724 is manufactured by using the display device 1 according to the first embodiment of the present disclosure.

5-4. Example 4 of Application

Figure 17:
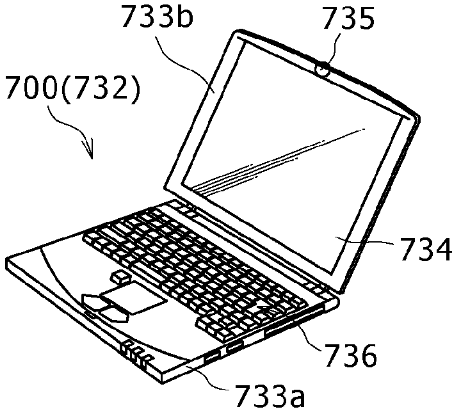
FIG. 17 is a perspective view showing an external appearance of a computer as Example 4 of application to which the display device shown in FIG. 1 of the first embodiment is applied.

FIG. 17 is a perspective view showing an external appearance of a computer, as Example 4 of application, when the electronic apparatus 700 is the computer 732. The computer 732 includes a lower side chassis 733*a*, an upper side chassis 733*b*, a display module 734, a Web camera 735, a keyboard 736, and the like. In this case, the display module 734 is manufactured by using the display device 1 according to the first embodiment of the present disclosure.

5-5. Example 5 of Application

Figure 18:
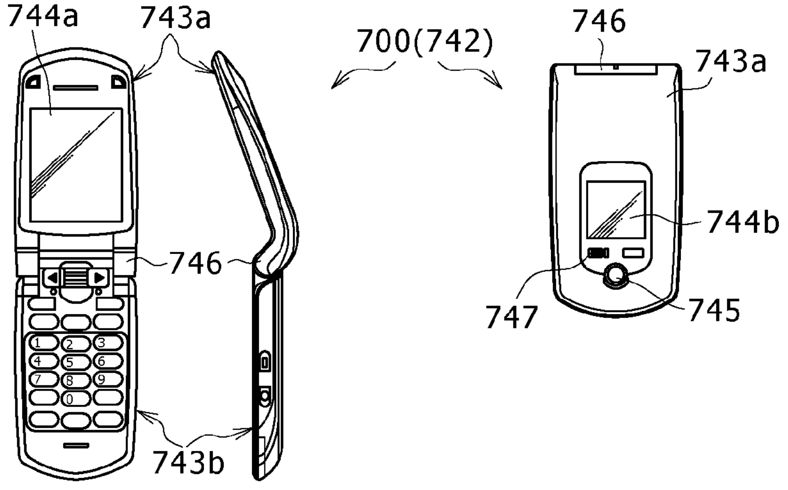
FIG. 18 is a front view of a mobile phone as Example 5 of application, in an open state, to which the display device shown in FIG. 1 of the first embodiment is applied, a side elevational view thereof in the open state, and a front view thereof in a close state.

FIG. 18 is a front view of a mobile phone as Example 5 of application, in an open state, in which the electronic apparatus 700 is the mobile phone 742, a side elevational view thereof in the open state, and a front view thereof in a closed state. The mobile phone 742 is foldable and includes an upper side chassis 743*a*, a lower side chassis 743*b*, a display module 744*a*, a sub display portion 744*b*, a camera 745, a coupling portion 746 (a hinge portion in this case), a picture light 747, and the like. In this case, the display module portion 744*a* and the sub display portion 744*b* are manufactured by using the display device 1 according to the first embodiment of the present disclosure.

As a result, in each of the electronic apparatus 700 in Example 1 of application to Example 5 of application, not only the dispersion of the luminances due to the dispersion of the threshold voltages and the mobilities (and the dispersion of k) of the drive transistors 121 can be corrected, but also the display nonuniformity due to the dispersion of the characteristics of the drive transistors 121 composing the pixel circuit 10 can be suppressed and solved independently of the change in the environment (for example, the temperature and the humidity). As a result, it is possible to display the high-quality image.

Although the technique disclosed in this specification has been described so far based on the embodiments, Examples, and the like, the technical scope of the contents described in the appended claims is by no means limited to the scope of the description of the embodiments, Examples, and the like. Various kinds of changes and improvements can be made in the embodiments described above without departing from the subject matter of the technique disclosed in this specification, and the forms in which such changes and improvements are made are also contained in the technique disclosed in this specification. The embodiments described above do not limit the technique according to the appended claims and all of combinations of the features explained in the embodiments described above are not necessarily essential to the means for solving the problems that the technique disclosed in this specification is to solve. Various stages of techniques are contained in the embodiments described above and the various kinds of techniques can be extracted based on suitable combinations in plural constituent requirements shown in the embodiments described above. Even when some constituent requirements are deleted from all of the constituent requirements shown in the embodiments described above, the constitutions obtained by deleting some constituent requirements from all of the constituent requirements can also be extracted as the techniques described in this specification as long as the effect corresponding to the problems that the technique disclosed in this specification is to solve can be offered.

For example, although in Example 1 and Example 2, the configuration is adopted in which the pulse signal causing the drive pulse is generated in one portion provided outside the pixel array portion 102 and is then outputted to each of the wirings (scanning lines) either in the columns or in the rows through the switch circuits, the techniques disclosed in the embodiments described above are by no means limited thereto. For example, both of the switch portion 450 and the pulse generating portion 480 are by no means limited to the configuration of being disposed outside the pixel array portion 102, and thus may also be disposed inside (for example, in the peripheral portion) the pixel array portion 102.

In suppressing the display nonuniformity due to the dispersion of the characteristics of the transistors composing the logic circuit, it is also possible to adopt a technique which is intermediate in configuration between the technique of either Example 1 or Example 2, and the technique of Example 3. As described above, with the technique of either Example 1 or Example 2, the pulse signal generated in the pulse generating portion 480 is supplied to each of the scanning lines through the switch selection based on the shift pulse supplied from the shift register 410. Also, with the technique of Example 3, the pulse signal generated in the pulse generating portion 480 is successively shifted. In this case, firstly, the pulse signal causing the drive pulse is generated in the pulse generating portion 480 by utilizing the technique of either Example 1 or Example 2. Then, the pulse signal generated in the pulse generating portion 480 is shifted in increments of one unit period of time in a shift register portion (different from the shift register portion 410) to be supplied to the switch portion 450. Also, the pulse signals outputted from the shift register portion are fetched in the switch circuits 452 of the switch portion 450, and are then supplied to the drive lines in accordance with the selection for the drive lines by the selecting portion (in a word, in accordance with the shift pulses outputted from the shift register portion 410). In this case, it is only necessary to adopt such a configuration. With such a modified configuration, the circuit scale is increased because two shift register portions become necessary.

It goes without saying that a complementary configuration can be adopted in which for the transistors, the n-channel and the p-channel are replaced with each other, the polarities of the power source and the signals are reversed in accordance with the replacement of the conductivity type, and so forth.

6. Constitutions of the Present Disclosure

In the light of the description of the embodiments, the techniques according to claims disclosed in the scope of the appended claims are merely an example and, for example, the following techniques will be extracted as the constitutions of the present disclosure. Hereinafter, the constitutions of the present disclosure will be listed up as follows.

(1) A display device including: a display portion; a hold capacitor; a write transistor writing a drive voltage corresponding to a video signal to the hold capacitor; a drive transistor driving the display portion in accordance with the drive voltage written to the hold capacitor; and a pulse width adjusting portion adjusting a width of a pulse signal causing a drive pulse used to drive at least one of the write transistor and the drive transistor so as to correspond to an environmental change.

(2) The display device described in the paragraph (1), further including:

a pixel portion in which pixel circuits each having the display portion, the hold capacitor, the write transistor and the drive transistor are disposed in a predetermined direction;

drive lines through which the drive pulses are supplied to at least ones of the write transistors and the drive transistors disposed in the predetermined direction being disposed in the pixel portions;

a selecting portion selecting the drive lines; and a pulse generating portion generating the pulse signal causing the drive pulse based on the pulse signal inputted from the pulse width adjusting portion, in which the selecting portion supplies the drive pulses to the drive lines, respectively, in accordance with the pulse signal generated in the pulse generating portion.

(3) The display device described in the paragraph (1) or (2), in which the pulse width adjusting portion is disposed in a vicinity of either the write transistor or the drive transistor.

(4) The display device described in the paragraph (2), in which the pulse width adjusting portion is disposed in a vicinity of the pixel portion and outside the pixel portion.

(5) The display device described in any one of the paragraphs (1) to (4), in which the pulse width adjusting portion includes a delay portion delaying the pulse signal inputted thereto, and a gate circuit portion generating a pulse signal based on the pulse signal outputted from the delay portion.

(6) The display device described in any one of the paragraphs (1) to (5), in which the selecting portion includes a pulse generating portion provided every drive line.

(7) The display device described in any one of the paragraphs (1) to (5), further including:

pulse generating portions the number of which is smaller than the number of drive lines, in which the selecting portion supplies the drive pulses to the plural drive lines in accordance with pulse signals generated in the pulse generating portions.

(8) The display device described in the paragraph (7), in which the one clock generating portion is provided for all of the drive lines.

(9) The display device described in the paragraph (7), in which the pulse generating portion is provided every one unit with a part of the plural drive lines of all of the drive lines as one unit.

(10) The display device described in any one of the paragraphs (7) to (9), further including:

a switch portion having a switch circuit fetching in the pulse signal generated in the pulse generating portion to supply the pulse signal to the drive line in accordance with the selection for the drive lines by the selecting portion every drive line.

(11) The display device described in the paragraph (10), in which the switch circuit has a transfer gate structure.

(12) The display device described in the paragraph (10) or (11), in which the pulse generating portions generate the pulse signals at the same timing for the drive lines.

(13) The display device described in any one of the paragraphs (7) to (9), in which the selecting portion includes a shift register portion shifting the pulse signal generated in the pulse generating portion in increments of one unit period of time to successively supply the pulse signals to the drive lines, respectively.

(14) The display device described in any one of the paragraphs (1) to (12), in which the drive pulse is used for processing as well supplying a current to the hold capacitor through the drive transistor while a video signal is supplied to one terminal of the hold capacitor through the write transistor.

(15) The display device described in any one of the paragraphs (1) to (14), in which the drive pulse is also used to correct a dispersion of the threshold voltages of the drive transistors.

(16) The display device described in any one of the paragraphs (1) to (15), in which in the pixel portion, the pixel circuits are disposed in a matrix.

(17) The display device described in any one of the paragraphs (1) to (16), in which the display portion is of a self-emission type.

(18) A pixel circuit including:

a display portion;

a hold capacitor;

a write transistor writing a drive voltage corresponding to a video signal to the hold capacitor; and a drive transistor driving the display portion in accordance with the drive voltage written to the hold capacitor, in which a pulse width of a drive pulse used in at least one of the write transistor and the drive transistor is adjustably formed so as to correspond to an environment dependency.

(19) An electronic apparatus including:

a pixel portion in which display elements each including a display portion, a hold capacitor, a write transistor writing a drive voltage corresponding to a video signal to the hold capacitor, and a drive transistor driving the display portion in accordance with the drive voltage written to the hold capacitor are disposed;

a signal generating portion generating a video signal which is to be supplied to the pixel portion;

drive lines disposed in the pixel portion and supplying drive pulses used to drive at least ones of the write transistors and the drive transistors disposed in a predetermined direction;

a selecting portion selecting the drive lines; and a pulse width adjusting portion adjusting a width of a pulse signal causing the drive pulse used to drive at least one of the write transistor and the drive transistor so as to correspond to an environmental change; and a pulse generating portion generating the pulse signal causing the drive pulse in accordance with a pulse signal outputting the pulse width adjusting portion, in which the selecting portion supplies the drive pulses to the drive lines, respectively, in accordance with the pulse signal generated in the pulse generating portion.

(20) A method of driving a display device including a pixel portion in which display elements each including a display portion, a hold capacitor, a write transistor writing a drive voltage corresponding to a video signal to the hold capacitor, and a drive transistor driving the display portion in accordance with the drive voltage written to the hold capacitor are disposed, in which a width of a pulse signal causing a drive pulse used to drive at least one of the write transistor and the drive transistor is adjusted so as to correspond to an environmental change.

The present disclosure contains subject matter related to that disclosed in Japanese Priority Patent Application JP 2011-128239 filed in the Japan Patent Office on Jun. 8, 2011, the entire content of which is hereby incorporated by reference.

What is claimed is:

1. A display device, comprising:
- a display portion;
- a hold capacitor;
- a write transistor for writing a drive voltage corresponding to a video signal to the hold capacitor;
- a drive transistor for driving the display portion in accordance with the drive voltage written to the hold capacitor; and
- a pulse width adjusting portion including a delay portion and a gate circuit portion,
- wherein,
  - the delay portion is configured to delay a pulse signal input into the delay portion based on an environmental change and output a delayed pulse signal,
  - a delay amount between the pulse signal input into the delay portion and the delayed pulse signal corresponds to the environmental change,
  - the gate circuit portion is configured to adjust a width of a pulse signal causing a drive pulse based on the delay amount between the pulse signal input into the delay portion and the delayed pulse signal output from the delay portion,
  - a width of the drive pulse is based on the delay amount between the pulse signal input into the delay portion and the delayed pulse signal output from the delay portion, and
  - the drive pulse drives at least one of the write transistor and the drive transistor so as to correspond to the environmental change.

2. The display device according to claim 1, further comprising:
- a pixel portion in which pixel circuits each having the display portion, the hold capacitor, the write transistor, and the drive transistor are disposed in a predetermined direction;
- drive lines through which drive pulses are supplied to at least ones of the write transistors and the drive transistors disposed in the predetermined direction being disposed in the pixel portion;
- a selecting portion for selecting the drive lines; and
- a pulse generating portion configured to generate a pulse signal causing the drive pulse based on the pulse signal provided from the pulse width adjusting portion,
- wherein the selecting portion supplies the drive pulses to the drive lines, respectively, in accordance with the pulse signal generated in the pulse generating portion.

3. The display device according to claim 2, wherein the pulse width adjusting portion is disposed in a vicinity of the pixel portion and outside the pixel portion.

4. The display device according to claim 1, wherein the pulse width adjusting portion is disposed in a vicinity of either the write transistor or the drive transistor.

5. The display device according to claim 2, wherein the selecting portion includes a pulse generating portion provided at every drive line.

6. The display device according to claim 1, further comprising:
- pulse generating portions, wherein the number of pulse generating portions is smaller than the number of drive lines,
- wherein the selecting portion supplies the drive pulses to plural drive lines in accordance with pulse signals generated in the pulse generating portions.

7. The display device according to claim 6, wherein the one pulse generating portion is provided for all of the drive lines.

8. The display device according to claim 6, wherein the pulse generating portion is provided every one unit with a part of the plural drive lines of all of the drive lines as one unit.

9. The display device according to claim 6, further comprising:
- a switch portion having a switch circuit fetching in the pulse signals generated in the pulse generating portion to supply the pulse signals to the drive line in accordance with the selection for the drive lines by the selecting portion at every drive line.

10. The display device according to claim 9, wherein the pulse generating portions generate the pulse signals at the same timing for the drive lines.

11. The display device according to claim 6, wherein the selecting portion includes a shift register portion shifting the pulse signals generated in the pulse generating portion in increments of one unit period of time to successively supply the pulse signals to the drive lines, respectively.

12. The display device according to claim 1, wherein the drive pulse is used for processing and supplying a current to the hold capacitor through the drive transistor while the video signal is supplied to one terminal of the hold capacitor through the write transistor.

13. The display device according to claim 1, wherein the drive pulse is also used to correct a dispersion of threshold voltages of a plurality of drive transistors.

14. The display device according to claim 2, wherein in the pixel portion, pixel circuits are disposed in a matrix.

15. The display device according to claim 1, wherein the display portion is of a self-emission type.

16. The display device according to claim 1, wherein the drive pulse having a width based on the delayed pulse signal output from the delay portion and the pulse signal input into the delay portion is provided to a gate of the write transistor.

17. The display device according to claim 1, wherein the delay amount decreases as a temperature of one or more transistors in the delay portion increases.

18. A pixel circuit, comprising:
- a display portion;
- a hold capacitor;
- a write transistor for writing a drive voltage corresponding to a video signal to the hold capacitor; and
- a drive transistor for driving the display portion in accordance with the drive voltage written to the hold capacitor, wherein a pulse width of a drive pulse used in at least one of the write transistor and the drive transistor is based on a period of time between at least one of a leading edge of an enable pulse and a trailing edge of the enable pulse and at least one of a leading edge of a delayed enable pulse and a trailing edge of the delayed enable pulse, the pulse width of the drive pulse being adjustably formed so as to correspond to an environmental dependency, and wherein the period of time between the at least one of a leading edge of an enable pulse and a trailing edge of the enable pulse and the at least one of a leading edge of a delayed enable pulse and a trailing edge of the delayed enable pulse at least one of increases or decreases in accordance with an environmental change.

19. An electronic apparatus, comprising:

a pixel portion in which display elements each including a display portion, a hold capacitor, a write transistor for writing a drive voltage corresponding to a video signal to the hold capacitor, and a drive transistor for driving the display portion in accordance with the drive voltage written to the hold capacitor are disposed;

a signal generating portion for generating a video signal to be supplied to the pixel portion;

drive lines disposed in the pixel portion and for supplying drive pulses in order to drive one or more of the write transistors and the drive transistors disposed in a predetermined direction;

a selecting portion selecting the drive lines;

a pulse width adjusting portion including a delay portion and a gate circuit portion, the delay portion configured to delay a pulse signal input into the delay portion based on an environmental change and output a delayed pulse signal, the gate circuit portion configured to adjust a width of a pulse signal causing a drive pulse based on a delay amount between the pulse signal input into the delay portion and the delayed pulse signal output from the delay portion, wherein a width of the drive pulse is based on the delay amount between the pulse signal input into the delay portion and the delayed pulse signal output from the delay portion, and the pulse signal input into the delay portion drives at least one of the write transistor and the drive transistor so as to correspond to the environmental change; and a pulse generating portion configured to generate the pulse signal causing the drive pulse in accordance with a pulse signal provided from the pulse width adjusting portion, wherein the selecting portion supplies the drive pulses to the drive lines, respectively, in accordance with the pulse signal generated in the pulse generating portion.

20. A method of driving a display device including a pixel portion in which display elements each including a display portion, a hold capacitor, a write transistor writing a drive voltage corresponding to a video signal to the hold capacitor, and a drive transistor driving the display portion in accordance with the drive voltage written to the hold capacitor are disposed, wherein a width of a pulse signal causing a drive pulse used to drive at least one of the write transistor and the drive transistor is adjusted, based on a period of time between at least one of a leading edge of an enable pulse and a trailing edge of the enable pulse and at least one of a leading edge of a delayed enable pulse and a trailing edge of the delayed enable pulse, and wherein the period of time between the at least one of a leading edge of an enable pulse and a trailing edge of the enable pulse and the at least one of a leading edge of a delayed enable pulse and a trailing edge of the delayed enable pulse at least one of increases or decreases in accordance with an environmental change.

* * * * *